United States Patent [19]

Sugimoto et al.

[11] Patent Number: 4,495,560
[45] Date of Patent: Jan. 22, 1985

[54] FLUCTUATING DRIVE SYSTEM

[75] Inventors: Gunji Sugimoto, Okazaki; Hideo Arakawa; Toshikazu Ishihara, both of Nagoya; Masahiro Sugiura, Aichi; Katsuhiko Takahashi, Nagoya, all of Japan

[73] Assignee: Kabushiki Kaisha Toyota Chuo Kenkyusho, Aichi, Japan

[21] Appl. No.: 281,176

[22] Filed: Jul. 7, 1981

[30] Foreign Application Priority Data

Jul. 9, 1980 [JP] Japan ................. 55-94137

[51] Int. Cl.$^3$ .............. G05B 11/14; G05B 11/36; G05B 15/02; G05D 23/00
[52] U.S. Cl. .................. 364/154; 62/231; 62/244; 137/624.11; 137/624.18; 364/152; 364/510; 364/717
[58] Field of Search ............... 364/152, 154, 155, 158, 364/717, 718; 318/313, 314, 326, 327, 334; 73/116, 117, 379, 664; 62/226, 228, 231, 232, 234, 239, 244; 137/624.11, 624.18

[56] References Cited

U.S. PATENT DOCUMENTS

| 3,015,229 | 1/1962 | Maki | 73/664 |
|---|---|---|---|
| 3,068,418 | 12/1962 | Hajian | 73/664 |
| 3,157,045 | 11/1964 | Maki | 73/664 |
| 3,241,023 | 3/1966 | Eby | 318/314 |
| 3,488,999 | 1/1970 | Catania | 73/664 |
| 3,710,082 | 1/1973 | Sloane et al. | 73/664 |
| 3,712,126 | 1/1973 | Campbell | 73/117 |
| 3,767,195 | 10/1973 | Dimick | 73/379 X |
| 3,794,899 | 2/1974 | Breslow | 318/314 X |
| 3,843,914 | 10/1974 | Carlson et al. | 318/327 |
| 3,845,756 | 11/1974 | Olsson | 73/379 X |
| 3,848,115 | 11/1974 | Sloane et al. | 73/664 X |
| 4,007,605 | 2/1977 | Denny | 318/334 X |
| 4,032,763 | 6/1977 | Glitz | 364/717 |
| 4,125,898 | 11/1978 | DeHart et al. | 364/718 |
| 4,218,749 | 8/1980 | Babaud et al. | 364/717 |
| 4,250,956 | 2/1981 | Ohtani | 62/239 |
| 4,303,873 | 12/1981 | Hawkins | 318/327 X |
| 4,306,449 | 12/1981 | Hoffman | 73/116 |
| 4,358,105 | 11/1982 | Sweeney, Jr. | 73/379 X |
| 4,417,182 | 11/1983 | Weber | 315/210 |

Primary Examiner—Felix D. Gruber
Attorney, Agent, or Firm—Oblon, Fisher, Spivak, McClelland & Maier

[57] ABSTRACT

A fluctuating drive system comprises: random generating means for generating a randomly varying physical quantity; control means for controlling the randomly varying physical quantity; amplifying means for amplifying the controlled physical quantity; and driving means for driving an energy generating means in accordance with the amplified physical quantity, thereby to generate the randomly varying energy from the energy generating means. With this system, the environment or stimulus is positively fluctuated at random with 1/f characteristics or the like.

51 Claims, 38 Drawing Figures

F I G. 29 (a)
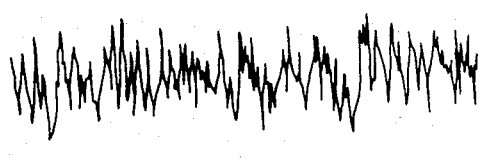
F I G. 30 (a)
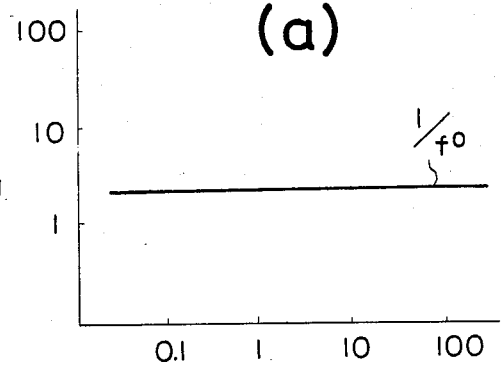
(b)
(b)
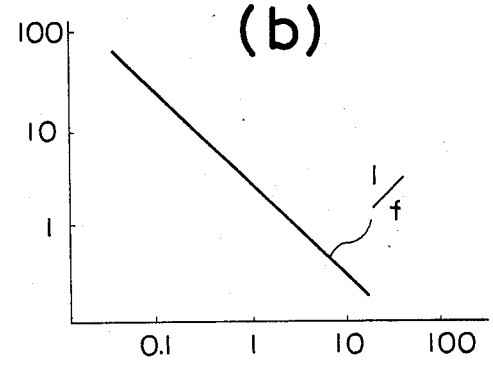
(c)
(c)
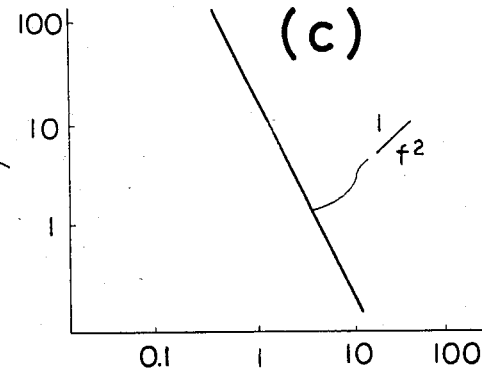

FLUCTUATING DRIVE SYSTEM

BACKGROUND OF THE INVENTION

1. Field of the Invention

The present invention relates to a fluctuating drive system for liberating a randomly varying energy.

2. Description of the Prior Art

It is customary that a variety of systems to be used in industry and at each home according to the prior art are held under a predetermined control throughout the operation or under a predetermined stepwise control. Those various systems are classified into those in which such control is essential and not necessarily essential.

Some of the aforementioned systems in which the predetermined control is not essential may exert evil influence if they are held under the predetermined or steady control.

Of those systems, a variety of environment controlling or health promoting systems, amusement devices, sport practising machines or the like artificially stimulate human beings, create artificial environments or control the senses of human beings thereby to make the daily lives of human beings comfortable or to amuse human beings. There can be enumerated, for example, fragrance emitter for deodorizing a bad smell, air conditioners for creating comfortable environments, shoulder massagers or shoulder patting machines, game machines or pitching machines.

In the devices according to the prior art thus far described, it is customary that the stimulus or artificial environment to be imparted to human beings is controlled under a steady condition which is invariable for lapse of time. Since, in this case, the human beings are always receiving a predetermined stimulus or held under a predetermined environment, they have fresh senses and impressions at first when they are brought to such predetermined environmental or stimulative condition from another but their senses become familiar and dull as the time elapses. As a result, the freshness disappears and the comfortableness and amusement decline. In case that steady control is not only improper but also extreme, the health of human beings may be impaired.

As a control other than the steady control, moreover, there is such a control that the output monotonously increases or decreases or the output varies regularly or periodically.

In the case of such control, the human beings memorize either the monotonous increase or decrease or the regular variation and predict the next coming condition because of their predicting capacities. This invites the problems that their senses also become familiar and dull to the new condition so that the freshness disappears and the comfortableness and amusement decline, although at a delayed time as compared with the aforementioned case of a steady control.

Moreover, when the human beings are brought from the aforementioned environment under the various controls to another in the natural world, the abrupt change in environment, the difference between the environments and the repetition thereof cause a problem that the health may be impaired.

SUMMARY OF THE INVENTION

The present invention has been conceived as a result that the inventors have repeated the systematic experiments and analyses in order to solve the problems thus far described.

It is, therefore, an object of the present invention to provide a fluctuating drive system which can control a variety of systems the most properly.

Another object of the present invention is to provide a fluctuating drive system, in which the environment and stimulus are positively fluctuated at random for the time lapse, while taking such fundamental characteristics into consideration as exist in the natural world and as are intrinsically owned by human beings as living creatures, so that the fresh senses may always be maintained to promote the comfortableness and amusement.

A fluctuating drive system according to the present invention comprises as shown in FIG. 28, random generating means I for generating a randomly varying physical quantity, control means II for controlling the randomly varying physical quantity, amplifying means III for amplifying the controlled physical quantity, and drive means IV for driving energy generating means in accordance with the amplified physical quantity, whereby the randomly varying energy is liberated from the energy generating means.

The fluctuating drive system having the aforementioned construction according to the present invention drives and controls a variety of systems with the random (or irregular) changes, which numerously exist in the natural world, i.e., the random fluctuations. Therefore, the senses of human beings become neither familiar nor dull to the new condition even as the time elapses, as is different from the steady control, the monotonous control or the regularly fluctuating control, thereby to enjoy the advantages that the freshness is eternally maintained and that neither the comfortableness nor the amusement decline.

Here, the random fluctuations are defined as the phenomena, in which at least one of the period or amplitude of the fluctuations is irregularly varied.

In addition to the aforementioned advantages, the fluctuating drive system of the present invention can enjoy the advantage that it can eternally maintain the functions and effects intrinsic in the various systems.

The fluctuating drive system of the present invention is operative to liberate a variety of energies which change at random, i.e., which fluctuate at random (or irregularly). The random fluctuations will be examined hereinafter.

The random fluctuations in time series are composed, if they are subjected to the statistical processing and to the frequency analysis, of the following three representatives. FIG. 30(a) shows the so-called "white noise fluctuations", as shown in FIG. 29(a), which have their power spectral density (or power spectrum) taking a predetermined value independent of a frequency f, which fluctuations will be hereinafter referred to as "random fluctuations having $1/f^0$ characteristics". FIG. 30(b) shows the fluctuations of 1/f noise characteristics, as shown in FIG. 29(b), which have their power spectral density inversely proportional to the frequency f, which fluctuations will be hereinafter referred to as "random fluctuations having 1/f characteristics". FIG. 30(c) shows the fluctuations of $1/f^2$ noise characteristics, as shown in FIG. 29(c), which have their power spectral density inversely proportional to the square of the frequency f, which fluctuations will be hereinafter referred to as "random fluctuations having $1/f^2$ characteristics". In FIG. 30, the frequency is taken on the abscissa, and the power spectral density is taken on the ordinate, both being logarithmically scaled.

The aforementioned three representatives are classifications of the random fluctuations from the points of view of frequency components. Since the aforementioned power spectral density and a self-correlation function are coupled through the Fourier transform, the three representatives may also be discussed as follows from the point of view of the correlation with the past and future in time.

The random fluctuations having $1/f^0$ characteristics (or the fluctuations of $1/f^0$ noise characteristics) have such properties that the present condition has no relationship with the past condition and the present condition exerts no influence upon the future condition.

The random fluctuations having $1/f$ characteristics (or the fluctuations of $1/f$ noise characteristics) have such properties that the present condition has relationship with the near past condition but not with the long past condition and the present condition exerts the influence upon the short future condition but not upon the far future condition. In short, with regard to the random fluctuations of this kind one can predict a little the future condition, but the hitting percentage of the prediction is not so high.

The random fluctuations having $1/f^2$ characteristics (or the fluctuations of $1/f^2$ noise characteristics) have a wider time width of the past or future having relationship with the present condition so that the hitting percentage of the future prediction is higher than that of the fluctuations having $1/f$ characteristics.

Therefore, if the environment or the stimulus to the human beings is controlled in accordance with the random fluctuations having $1/f^0$ characteristics, nothing but the unexpectable changes occur so that the human beings feel restless and become nervous. Consequently, the random fluctuations of this kind are effective if they are applied to the amusement machines, sport training machines for advanced courses, and machines for repelling insects or animals. If the environment or the stimulus to the human beings is controlled in accordance with the random fluctuations having $1/f$ characteristics, changes suitably answering the expectations occur so that a fresh feeling can always be obtained, as preferred. The fact that the sound power of the music liked by the majority has the fluctuations of this kind provides a good example for the fact that the human beings feel comfortable in the presence of such fluctuations. Therefore, these fluctuations are effective if they are applied to either such systems as directly stimulate and make comfortable the human beings or insect or animal catching devices.

If the environment or the stimuls to the human beings is controlled in accordance with the random fluctuations having $1/f^2$ characteristics, changes answering the expectations are mostly felt so that such random fluctuations are preferred because they offer not high abruptness but suitable stimulus and comfortableness. If the flow rate of air conditioners or the like is controlled in accordance with the fluctuations of that kind in view of the fact that the natural wind makes changes resembling those fluctuations, an artificial wind like the natural wind can be generated so that comfortable residences and working environments can be provided. Therefore, those fluctuations are effective if they are applied to systems in which abruptness is not desirable.

The present invention can adopt, when it is to be practised, a variety of aspects in accordance with the applied fields and the requirements for the systems. Representative aspects will be described hereinafter.

According to a first aspect, the random generating means I is made operative to generate the physical quantity, in which the power spectral density for each frequency has a relationship of $1/f^k$ k (wherein k can take an arbitrary value) to the frequency f and which varies at random. The value k can take values such as 0, 0.1, 0.5, 1, 1.5, 2, 3 and other arbitrary values.

According to a second aspect, the random generating means I is made operative to generate the physical quantity, in which the power spectral density for each frequency f becomes identical (i.e. $1/f^0$) and which varies at random. This second aspect is effective if it is applied to systems requiring high abruptness, amusing machines, sport training machines for advanced courses, or machines for repelling insects or animals.

According to a third aspect, the random generating means I is made operative to generate the physical quantity, in which the power spectral density for each frequency has an inversely proportional relationship to the frequency f (i.e. $1/f$) and which varies at random. This third aspect is effective if it is applied to systems requiring suitable abruptness, systems for directly stimulating human beings or animals, insect or animal catching devices or the like.

According to a fourth aspect, the random generating means I is made operative to generate the physical quantity, in which the power spectral density for each frequency has an inversely proportional relationship to the square of the frequency f (i.e. $1/f^2$) and which varies at random. This fourth aspect is effective if it is applied to systems in which abruptness is not preferred or to air conditioners.

A fifth aspect of the present invention comprises random generating means I for generating a randomly varying electric quantity, control means II for controlling the randomly varying electric quantity, amplifying means III for amplifying the controlled electric quantity, and driving means IV for driving energy generating means in accordance with the amplified electric quantity, whereby the randomly varying energy is liberated. This fifth aspect forms an electric system in accordance with the present invention so that it can enjoy advantages that complex and accurate controls can be made and that the system can have its size reduced as a whole.

A sixth aspect of the present invention comprises random generating means I for generating a randomly varying mechanical quantity, control means II for controlling the randomly varying mechanical quantity, amplifying means III for amplifying the controlled mechanical quantity, and driving means IV for driving energy generating means in accordance with the amplified mechanical quantity, whereby the randomly varying energy is liberated. This sixth aspect forms a mechanical system in accordance with the present invention so that it can enjoy advantages that the system can be simplified, have high reliability and be produced at a low cost.

BRIEF DESCRIPTION OF THE DRAWINGS

Various other objects, features and attendant advantages of the present invention will be more fully appreciated as the same becomes better understood from the following detailed description when considered in connection with the accompanying drawings in which:

FIGS. 29(a) to 29(c) are charts showing the random signal;

FIGS. 30(a) to 30(c) are charts showing the frequency-power spectral density of the random signal.

DETAILED DESCRIPTION

Figure 1:
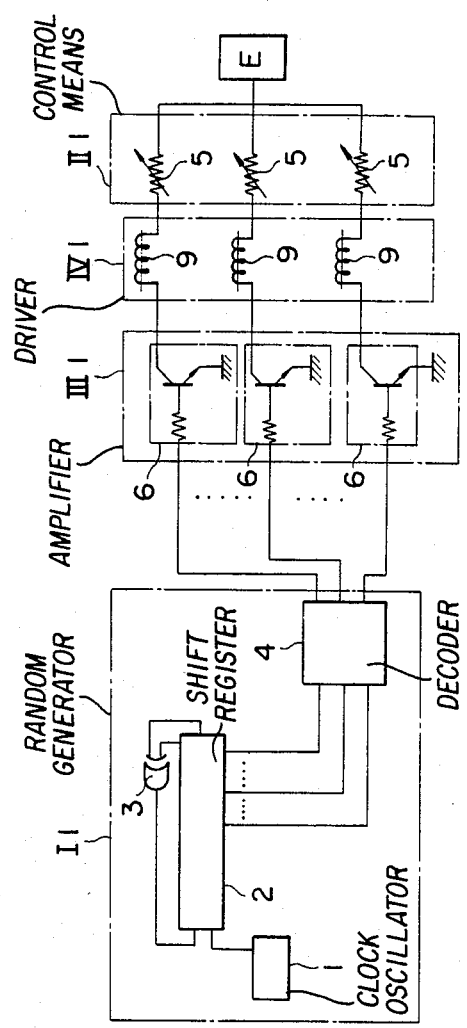
FIG. 1 is a block diagram showing a first embodiment of the present invention.

The present invention will now be described in detail in conjunction with the embodiments thereof.

The system according to a first embodiment is made by applying the present invention to a fragrance emitter for deodorizing a bad smell or giving a pleasant scent in the indoor or outdoor space partitioned or not partitioned.

The fluctuating fragrance emitter of the first embodiment is characterized in that the smells of a plurality of fragrant materials are selected at random and in that the smelling time periods are controlled at random.

The fluctuating fragrance emitter of the first embodiment is constructed as shown in FIG. 1 and FIGS. 2(A) to 2(D), to comprise random generating means I1 for generating a random signal, control means II1 for controlling the driving quantity of later-described driving means in accordance with the signal of the random generating means I1, amplifying means III1 for obtaining such an electric output in accordance with the signal of the random generating means I1 as is sufficient to drive the driving means, and the driving means IV1 for opening and closing covers in accordance with the signal from the amplifying means thereby to spread the scent.

The random generating means I1 comprises a clock oscillator 1 for feeding out predetermined clock pulses, a shift register 2 connected with the clock oscillator and having such a sufficient number of steps M for generating a quasi-random pattern signal, an exclusive OR gate circuit 3 connected between the output and input terminals of the shift register 2 for effecting the feedback of the shift register 2, and a decoder 4 connected with the shift register 2.

Since the shift register 2 connected in the afore-mentioned manner and since the binary pattern exhibited by each step can be deemed as binary digits, the shift register 2 feeds out random digits upon reception of each clock pulse, and the random digits can be practically deemed as white noises because the step number is sufficiently large. The shift register 2 to be used has a sufficiently large step number M than the input bit number n of the decoder 4 and has its n bits connected with the decoder 4. This decoder 4 can take a $2^n$ number of different output lines at the maximum but has its N number (e.g. eight in the present embodiment) of output lines selected at random in a manner to correspond to the number N of the fragrant materials in the later-described driving means IV1 and connected with the amplifying means III1. Only three output lines are shown as representatives in the drawing.

Consequently, in the random generating means I1, the shift register 2 has random bit patterns, of which the bit patterns of n bits may change for each clock pulse or exhibit an identical bit pattern over several clocks. As a result, if the bit patterns are decoded by means of the decoder 4, different output lines are selected for each clock pulse, or the identical output line is continuously selected over the several clocks.

The control means II1 is constructed to include N number (=8) of variable resistors 5, which are connected with a power source E, and can adjust the intensities of the scents in accordance with the fragrant materials.

The amplifying means III1 is contructed of N number (=8) of electronic switches 6, each of which includes a transistor having its base connected with each resistor connected with each of the N number of the output lines of the decoder 4 and having its emitter connected with the earth. The amplifying means III1 serves to amplify the output of the decoder 4 to such an electric output as is sufficient to drive the driving means IV1.

The driving means IV1 comprises, as shown in FIG. 1 and FIGS. 2(A) to 2(D), a container 7 having eight independent compartments for accommodating eight kinds of fragrant materials, covers 8 attached to the respective compartments of the container 7, and solenoids 9 arranged in the respective compartments and each having its one terminal connected with the collector of the corresponding transistor of the amplifying means III1 and its other terminal connected with the corresponding variable resistor 5 of the control means II1. The solenoids 9 open the covers 8 of the compartments at random according to the setting by the control means II1 and in accordance with the output of the amplifying means III1 and maintain those conditions at random.

Figure 2A:
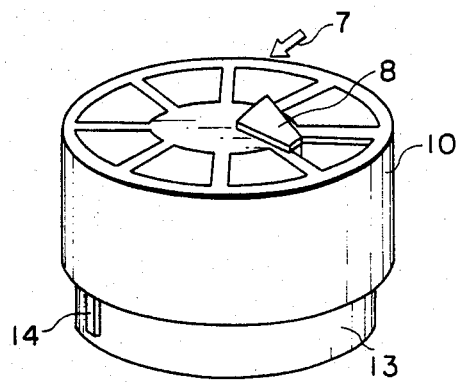
FIG. 2(A) to 2(D) are views showing the container and driving means of the first embodiment.
Figure 2B:
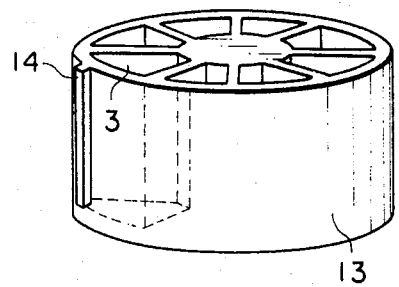

The container 7 comprises, as shown in FIGS. 2(A) and (B), a cover member 10, which is formed into a cylinder having the shape of the cap of a tea-container and having its top covered and which is equipped with the eight hermetical sector covers 8 to open and hermetically close the top of the cylinder, and a container body 13 which has its inside formed with eight independent compartments 12 partitioned by means of walls, respectively. The sector covers 8 are sized to be smaller than the upper openings of the compartments and to have such an area as can give a predetermined quantity of scent in accordance with the opened extent. By opening and closing the covers 8, moreover, one of the compartments 12 is vented to the atmosphere. A ridge 14 for fixing the covers 8 in position is formed on the outer side wall of the container body 13, and a corresponding groove (although not shown) is formed in the inner side wall of the cover member 10. In the independent compartments 12, there are accommodated different kinds of liquid or solid fragrant materials 16, respectively.

Figure 2C:
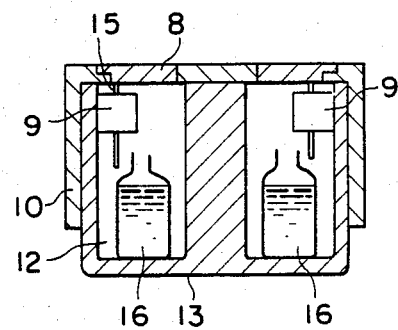
Figure 2D:
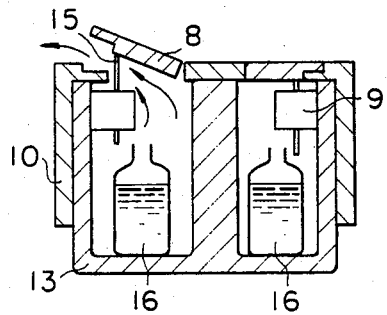

At upper portions of the inner side walls of the compartments 12 of the container 7, respectively, as shown in FIGS. 2(C) and (D), there are arranged the solenoids 9 which are equipped with movable members 15 made of a magnetic material so that the movable members 15 are driven axially upward to lift and open the covers 8, as shown in FIG. 2(D).

In the fluctuating fragrance emitter of the first embodiment having the construction thus far described, the random bit pattern indicated by the shift register 2 of the random generating means I1 can be deemed as binary digits so that one of the electronic switches 6 of the amplifying means III1 is brought into its "ON" state in accordance with the output of the decoder 4. In accordance with the randomly varying binary digit indicated by the shift register 2, more specifically, one of the eight solenoids 9 of the driving means IV1 is selected and driven at random. Moreover, the duration of driving is varied at random between a long and a short period of time. That is to say, if the grouped solenoids 9 are driven, one of the plural covers 8 of FIG. 2(A) is opened and closed at random, and the time periods for which the cover is opened becomes random. As a result, the various kinds of scents can be spread in fluctuating intensities corresponding to the time periods for which the covers are opened. On the other hand, if the variable resistors 5 of the control means II1 are adjusted, the amount of the currents to flow through the solenoids, i.e., the forces to be generated by the solenoids (i.e., the openings of the covers 8) can be adjusted so that the intensities of the scents can be adjusted, as desired.

In this case, since the number of the output lines is N (=8), which is far smaller than $2^n$ although the inputs to the decoder 4 is a binary digit of n bits, most of the random bit patterns generated by the shift register 2 cannot find their mating solenoids even if they are to be decoded by the decoder 4. As a result, all of the covers 8 of FIG. 2(A) are usually closed, and arbitrary one of them is sometimes opened and closed at random. Since all of the covers 8 are usually closed in the aforementioned manner, the scent having spead previously dissipates during that period. As a result, when another cover 8 is then opened, only the new scent can be enjoyed without being mixed with the old scent.

Therefore, the fluctuating fragrance emitter of the first embodiment spreads the scents of the randomly different fragrant materials 16 for randomly different time periods so that the kinds and intensities of the scents are controlled at random. As a result, the fluctuating fragrance emitter of the first embodiment prevents the decay of the comfortableness due to the familiarity of senses when a predetermined scent is continuously spread, the uncomfortableness in case the scent is excessively intense, and the headache in the worst case thereby to provide an advantage that an always fresh scent can be enjoyed in a proper intensity. On the other hand, if the eight compartments are equipped with different fragrant materials such as those of roses or citrus fruits in accordance with the tastes of the user, he can enjoy different kinds of always comfortable scents at random.

Moreover, if the respective compartments are equipped in advance with the same kind of fragrant materials having different fragrant intensities, not only the spreading time periods but also the intensities of the scents can be varied at random over a wide range.

Modifications of the fluctuating fragrance emitter according to the first embodiment will be described below.

Figure 3:
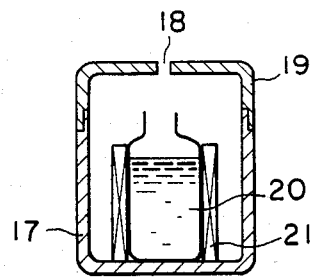
FIG. 3 is a sectional view showing a first modification of the first embodiment.

In a first modification, as shown in FIG. 3, there are provided a cylindrical container 17 and a cover 19 which has its top formed with a sufficienlty small pin hole 18, and a fragrant material 20 is accommodated in the cylindrical container 17 and is heated by means of an electric heater 21. This electric heater 21 is connected in place of the solenoids 9 of the driving means IV1 of the first embodiment. The fragrant material usually has such properties as are reluctant to spread the scent at a low temperature but are liable to spread the scent the more as the temperature is raised to the higher level. With the construction of FIG. 3, therefore, the fragrant material 20 is heated at random so that it may spread its scent through the pin hole, only when it is heated, to spread the scent in a similar manner to the first embodiment. In this modification, too, by adjusting the variable resistors 5, it is possible to adjust the amount of currents to flow through the heaters and accordingly to adjust the temperatures of the fragrant material 20, i.e., the intensities of the scents, as desired.

On the other hand, it is also possible to arrange the heaters according to the first modification in the respective compartments of the aforementioned first embodiment so that the heating time periods of the fragrant materials 16 may also be controlled together with the opening and closing operations of the covers 8. With this construction, it becomes possible to positively fluctuate at random not only the opening and closing controls of the covers 8 but also the heating time period, i.e., the heating temperature.

According to a second modification, the driving means IV1 of the fluctuating fragrance emitter of the first embodiment is modified.

Figure 4:
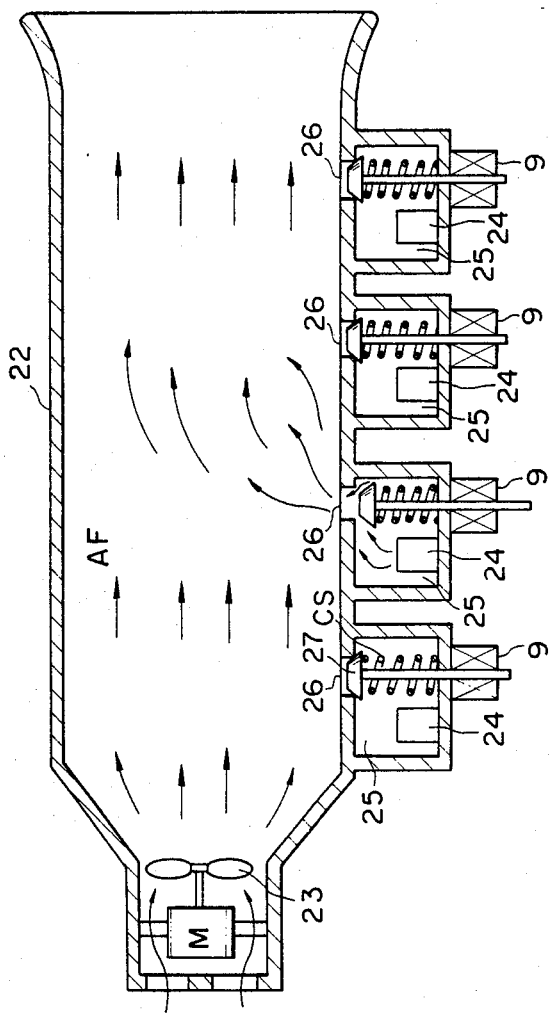
FIG. 4 is a longitudinal section showing a second modification of the first embodiment.

In the second modification, as shown in FIG. 4, a cylinder 22 having its one end so closed as to allow the passage of air is made to have its other end opened, and a fan 23 driven by a motor M is arranged in the closed end thereby to establish an axial air flow AF inside of the cylinder. At a lower portion of the cylinder, there are arranged in a row a plurality of (e.g. four in FIG. 4) compartments 25 which have an identical construction for accommodating a plurality of solid fragrant materials 24. In order to provide communications between the compartments 25 and the inside of the cylinder 22, this cylinder 22 has its lower portion formed with circular holes 26 assigned to the respective compartments 25. The valve members 27 having valves of a frusto-conical shape for closing the circular holes 26 are mounted in the respective compartments 25. The valve members 27 are urged by coil springs CS and attracted downward, as viewed in FIG. 4, by the actions of the solenoids 9 of the driving means IV1 of the first embodment, thereby to control at random the establishment and block of the communications between the compartments 25, in which the fragrant materials 24 are accommodated and the inside of the cylinder in which the air flow AF is established.

According to the second modification having the construction thus far described, the air flow AF, as directed from the left to the right in FIG. 4, is generated in the cylinder 22 by the action of the fan 23, and an arbitrary solenoid 9 (i.e., the second one from the left in FIG. 4) is driven in accordance with the output from the amplifying means III1. As a result, the corresponding valve member 27 is moved down so that the scent of the fragrant material in the corresponding compartment 25 is spread through the circular hole 26 into the cylinder 22 until it is carried and supplied by the air flow AF.

The second modification has an advantage that the scent of the fragrant material is carried and supplied by the air flow so that it can be spread without delay and over a wide range.

According to the second modification, all the valve members 27 are closed for a predetermined time period, after one scent has been spread, and the scent of another fragrant material is then allowed to come out at random. Therefore, the second modification has an advantage that the fluctuations of the scent can be enjoyed.

According to the second modification, moreover, the respective compartments 25 may additionally be equipped with heaters to heat the fragrant materials in synchronism with the solenoids 9, so that the time period of heating the fragrant materials can be controlled. Thus, the heating time period, i.e., the heating temperature can be fluctuated at random in addition to the opening and closing controls of the circular holes 26 so that the fluctuating effects of the scent can be further promoted.

According to the second modification, still moreover, although the fan for establishing the air flow AF in the cylinder 22 is driven in the foregoing description at a predetermined r.p.m. by means of the d.c. motor, it can also be driven in place thereof by the current which fluctuates with the 1/f characteristics. Then, the velocity of the air flow AF in the cylinder 22 is fluctuated with the 1/f characteristics so that the scent having the 1/f characteristics can be enjoyed.

The system according to a second embodiment is provided by applying the present invention to a fluctuating fragrance emitter likewise the system of the first embodiment.

The fluctuating fragrance emitter of the second embodiment is characterized in that it regularly selects a plurality of fragrant materials and randomly controls their fragrance intensities with the 1/f characteristics and in that these drives and controls are performed purely mechanically.

Figure 5:
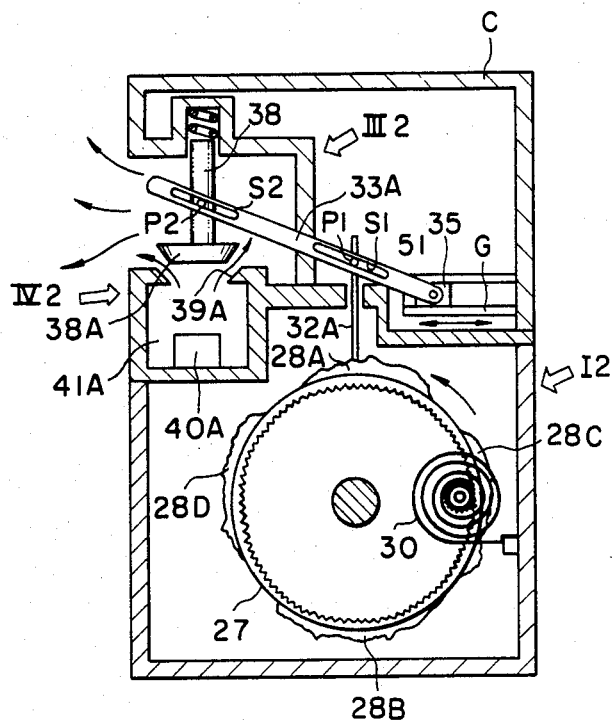
FIGS. 5 and 6 are sectional views showing a second embodiment of the present invention.
Figure 6:
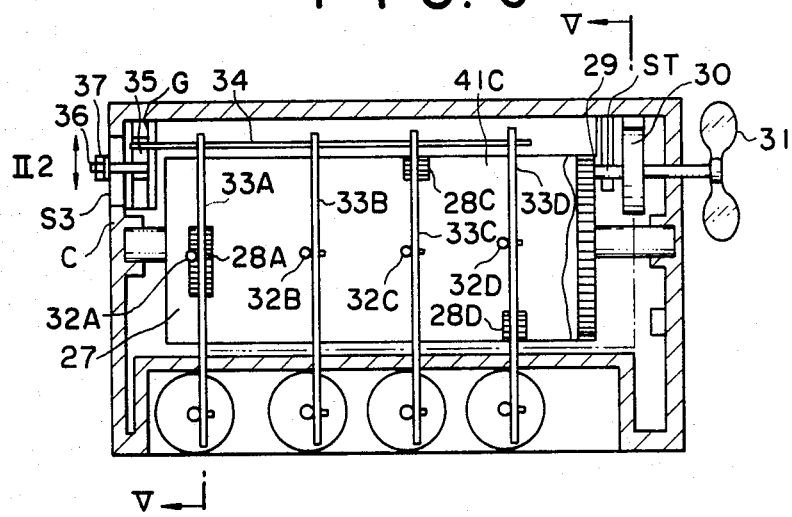

The fluctuating fragrance emitter of the second embodiment is constructed, as shown in FIGS. 5 and 6, to comprise random generating means I2 for feeding the mechanical displacement which fluctuates at random with the 1/f characteristics, control means II2 for controlling the driving quantity of drive means in a manner to correspond to the mechanical displacement which is fed out of the random generating means I2, amplifying means III2 for generating such a mechanical displacement in accordance with the mechanical output of the random generating means I2 as is sufficient to drive the drive means, and the drive means IV2 for opening and closing covers in a manner to correspond to the mechanical displacement from the amplifying means III2 and for controlling the openings of the covers at random with the 1/f characteristics so that the scents may be spread at random in intensities of the 1/f characteristics.

The random generating means I2 is constructed to include a hollow drum 27 having both its end rotatably journaled in a casing C, four projections 28A to 28D arranged on the outer side of the drum 27 equidistantly in the axial direction and at an angular spacing of a right angle from each other in the circumferential direction and having their heights varying with the 1/f characteristics, four rod members 32A to 32D abutting against the projections 28A to 28D, respectively, and made movable in the axial direction, a gear 29 fixed to one end of the shaft ST, which is rotatably journaled in the casing C, and meshing with the internal teeth which are formed at the axial end portion of the inner side wall of the hollow drum 27, a spiral spring 30 made of a spring material and having its one end fixed to the shaft ST and its other end fixed to the inner wall of the casing C, and a knob 31 fixed to the end portion of the shaft ST, which protrudes to the outside of the casing C.

If the knob 31 is turned clockwise a predetermined number of turns thereby to bias the spiral spring 30, the gear 29 is rotated counter-clockwise due to the recovering force of the spring so that the hollow drum 27 meshing with the gear 29 rotated counter-clockwise at a predetermined velocity. As the hollow drum 27 is rotated, the rod members 32A to 32D abutting against the projections 28A to 28D are moved up and down at random with the 1/f characteristics in accordance with the fluctuations in the height of the projections. FIG. 5 shows the condition under which the rod member 32A is moving up and down.

The amplifying means III2 comprises four rod-shaped arm members 33A to 33D each of which is supported in a rocking manner about its one end acting as a fulcrum. Each of the arm members 33A to 33D is formed with a first slit S1, which is arranged in the vicinity of the fulcrum thereby to retain a pin P1 embedded in the corresponding one of the aforementioned rod members 32A to 32D, and a second slit S2 which is positioned at a distance from the fulcrum thereby to retain a pin P2 embedded in the stem of the corresponding valve member, as will be described later. As a result, the arm members 33A to 33D are operative to enlarge the mechanical displacement of the rod members 32A to 32D at a ratio (i.e., the arm ratio) between the distances from the fulcrum to the two pins P1 and P2.

The control means II2 comprises a rod member 34 constructing the fulcrums of the respective arm members 33A to 33D, a sliding member 35 fixing one end of the rod member 34 and made slidable on a guide G to the right and left as viewed in FIG. 5, a lever 36 having its one end fixed to the sliding member and its other end protruding to the outside of the casing C through a slit S3 formed in the casing C, and a fastening member 37 having a nut engaging with the thread which is formed at the other end of the lever 36. If the lever 36 is moved along the S3, the rod member 34 providing the fulcrums of the respective arm members is moved through the sliding member 35 so that the fixing member 37 is rotated, when the position for the most proper arm ratio is reached, until it is thrusted onto the outer side wall of the casing C thereby to fix the position. In this way, the arm ratio is controlled by changing the fulcrum position thereby to control the openings of the valve members so that the presettings are made to attain the intensity of the scent according to the taste.

The drive means IV2 comprises valve member 38 having its embedded pin P2 retained in the second slit S2 of the arm members 33A to 33D of the amplifying means III2 and having its one stem end abutting against a coil spring mounted in a recess and its other stem end urged downward as viewed in FIG. 5, and fixedly carrying a frusto-conical valve 38A, and a compartment 41A formed at its top with a circular hole 39A, which is positioned and shaped to correspond to the valve 38A, thereby to accommodate a solid fragrant material 40A. In response to the rocking motions of the arm member 33A, the opening and closing operations of the valve member 38. are controlled, and at the same time the degree of opening is controlled with the 1/f characteristics so that the intensity of the scent to spread may fluctuate at random with the 1/f characteristics. The remaining compartments 41B to 41D are similarly constructed.

In the fluctuating fragrance emitter of the second embodiment having the construction thus far described, when the hollow drum 27 is rotated to bring its projection (as indicated at 28A in FIG. 5) into engagement with the rod member 32A, the arm member 33A is rocked upward to lift the valve member thereby to spread the scent of the fragrant material 40A to the outside from the compartment 41A. Moreover, since the height of the projection 28A is fluctuated at random with the 1/f characteristics in accordance with the rotations of the hollow drum 27, the rod member 32A is moved up and down so that the arm member 33A is accordingly rocked to move the valve member 38 up and down thereby to vary the opening degree (i.e., the area) of the circular hole 39A of the compartment 41A, whereby the intensity of the scent to spread out through the circular hole 39A is fluctuated at random with the 1/f characteristics.

When the projection 28A and the rod member 32A are released from their engaging relationship, the circular holes of all the compartments are closed for a predetermined time period thereby to establish a scentless condition. After that, the projection 28C and the rod member 32C engage with each other to allow the scent of another fragrant material to spread out of the second compartment 41C from the righthand side of FIG. 6 so that the intensity of the scent is fluctuated at random with the 1/f characteristics in accordance with the fluctuations in the height of the projection 28C. The scents of the remaining fragrant materials are spread out in a similar manner.

According to the fluctuating fragrance emitter of the second embodiment, therefore, the scent of a different fragrant material is regularly selected one by one in accordance with the arranged position of each projection so that the intensity of the scent of the fragrant material selected is fluctuated at random with the 1/f characteristics in accordance with the fluctuations in the opening of the valve. As a result, the fluctuating fragrance emitter of the second embodiment prevents the decay of the comfortableness due to the familiarity of senses when one kind of scent is continuously spread in a predetermined intensity, the umcomfortableness in case the scent is excessively intense, and the headache in the worst case thereby to provide an advantage that an always fresh scent can be enjoyed. Moreover, if fragrant materials according to one's tastes are accommodated in the four compartments 41A to 41D, one can orderly enjoy the scents of different kinds.

The fluctuating fragrance emitter according to the second embodiment thus far described can be driven by a d.c. motor, which is driven by a dry cell, in place of the spiral spring 30. If this modification is adopted, it is possible to omit the trouble of winding the spiral spring. Moreover, if a fan is mounted on the shaft of the d.c. motor so that an air flow may be established in the casing, the scent is positively spread in a similar manner to the afore-mentioned second modification of the first embodiment.

The system according to a third embodiment is provided by applying the present invention to the blower of the heater, cooler or air-conditioner of an automobile and is intended to automatically control the r.p.m. of the blower at random with the 1/f characteristics.

The automotive blower according to the prior art is operative to supply a predetermined constant wind so that the senses of human beings become familiar to the wind until they become unconscious of the wind. However, if the wind has its intensity fluctuating at random, the familiarity of the senses of the human beings is eliminated so that the fresh senses can be maintained at all times. Moreover, since the senses of the human beings are sensitive to the fluctuations, there can be attained an advantage that the human being are always conscious of the wind so that their senses to coolness and warmness by the wind is enhanced. Since the preset flow rate of the wind can be resultantly lowered, there can be attained another advantage in the reduction in the power consumption, i.e., in the contribution to sparing the energy consumption.

Figure 7:
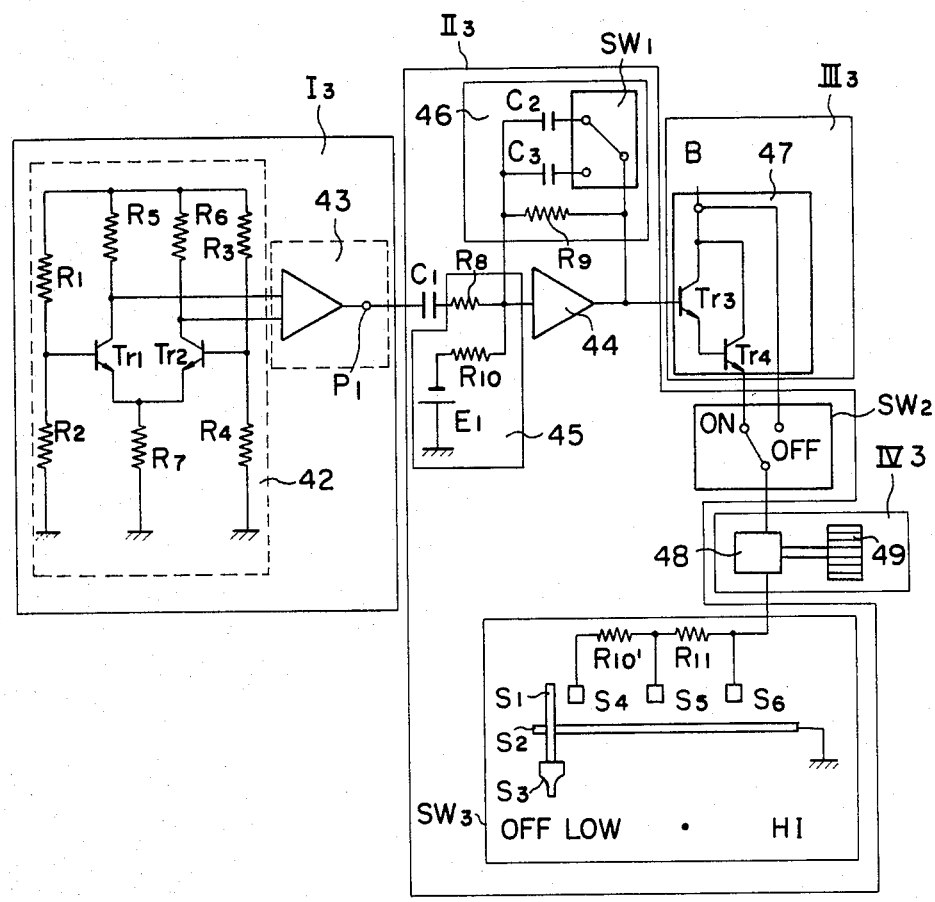
FIG. 7 is a circuit diagram showing a third embodiment of the present invention.

An automotive blower according to the third embodiment is constructed, as shown in FIG. 7, to comprise random generating means I3 for generating the electric signal, which fluctuates at random with the 1/f characteristics by the use of the noise characteristics of a transistor, control means II3 for controlling the fluctuating frequency range, the fluctuating factor, and the flow rate of the blower, amplifying means III3 for amplifying the controlled electric signal from the control means II3 into an electric current signal sufficient to drive the blower, and drive means IV3 for rotating a motor having a fan fixed thereto at random in response to the current signal from the amplifying means III3 thereby to change the flow rate of the wind at random with the 1/f characteristics.

The random generating means I3 is constructed to include a transistor circuit 42 and a differential amplifier 43.

The transistor circuit 42 is so constructed that the load resistors $R_5$ and $R_6$ are connected with the collectors of transistors $Tr_1$ and $Tr_2$, respectively, which are biased to predetermined respective values by bias resistors $R_1$ and $R_2$, and $R_3$ and $R_4$, and the emitters of the transistors $Tr_1$ and $Tr_2$ are connected with each other so that an emitter resistor $R_7$ is connected with that connecting point. With this construction, the transistor circuit 42 stabilizes the operating point between the collectors of the afore-mentioned two transistors and generates the so-called "1/f noises" inherent in a transistor.

Moreover, two input terminals of the differential amplifier 43, which are made of ICs, are connected with the collectors of the transistors $Tr_1$ and $Tr_2$, respectively, so that the fluctuation signal having its d.c. potential generally at zero and composed majorly of the aforementioned 1/f noises is generated at the output terminal $P_1$ of the differential amplifier 43. In other words, the random generating means I3 generates the 1/f fluctuation signal.

Here, the 1/f fluctuation signal is a signal in which its power spectral density is increased in inverse proportion to the frequency and which momently varies, and varies at a ratio of $-3$ db/oct in terms of a voltage. A transistor generally generates the noises, which have such property in the region lower than several hundred hertz, that is, the fluctuation signal. In order that the fluctuation signal may be generated highly accurately, i.e., that the 1/f fluctuation signal having the frequency-voltage characteristics of $-3$ db/oct may be generated, the operating points of the two transistors $Tr_1$ and $Tr_2$ are suitably selected by selecting the resistances of the resistors $R_1$ to $R_7$ at preset values.

The control means II3 comprises an adder 44, a fluctuation factor setting circuit 45, and a fluctuation frequency range setting circuit 46.

The adder 44 is made of an operational amplifier, which is constructed by connecting in series a condenser $C_1$ and a resistor $R_8$, which are operative to determine the input impedance and the lower cut-off frequency, with the input terminal and by connecting a feedback resistor $R_9$ between the output terminal and the input terminal. The condenser $C_1$ is connected with the output terminal $P_1$ of the random generating means I3.

The fluctuation factor setting circuit 45 is composed of the aforementioned input resistor $R_8$, a resistor $R_{10}$ connected with the input terminal of the adder 44 in parallel with the input resistor $R_8$, and a d.c. power source $E_1$ having a predetermined voltage and having its minus electrode connected with the resistor $R_{10}$ and its plus electrode grounded to the earth. The circuit 45 thus composed adds the fluctuation signal of the random generaging means and the d.c. voltage of the d.c. power source $E_1$ at a ratio, which is determined by the resistances of the resistors $R_8$ and $R_{10}$, and imparts a predetermined d.c. bias to the output terminal of the adder 44 thereby to set the ratio of the amplitude of the fluctuation signal to the d.c. voltage, i.e., the fluctuation factor.

The fluctuation frequency range setting circuit 46 is made of a filter which is composed of the aforementioned feedback resistor $R_9$, and two condensers $C_2$ and $C_3$ having different capacities and connected in parallel with the feedback resistor $R_9$ through a changeover switch $SW_1$. By switching the change-over switch $SW_1$, the upper cut-off frequency is changed to set the fluctuating frequency range so that the rhythms of the fluctuations are set slow and fast.

At the output terminal of the adder 44, consequently there is generated a voltage signal which is the summation of the d.c. voltage and the 1/f fluctuation noises (or signal) fluctuating in such a frequency range as is set by the afore-mentioned lower and upper cut-off frequencies.

The amplifying means III3 is made of a power amplifier 47 which is composed of two transistors $Tr_3$ and $Tr_4$ connected in Darlington connection. The transistor $Tr_3$ has its base connected with the output terminal of the adder 44 of the control means II3 and its collector connected with the battery B of an automobile so that the 1/f fluctuation current signal corresponding to the voltage at the base of the transistor $Tr_3$ is fed to the driving means IV3 at a downstream stage through a change-over switch $SW_2$.

This change-over switch $SW_2$ is one element of the control means II3 and has its first input electrode (ON) connected with the emitter of the transistor $Tr_4$, its second input electrode (OFF) connected with the battery B and its output electrode connected with the d.c. motor 48 of the driving means IV3 so that the 1/f fluctuation current or a predetermined d.c. current is supplied to the d.c. motor 48 by switching the input electrodes.

The driving means IV3 comprises the d.c. motor 48, and a Sirocco fan 49 which is fixed to the rotating shaft of the d.c. motor 48 and which is arranged at a suitable position in the blower duct of the automobile. Thus, the driving means IV3 is operative to blow the wind such that it rotates at a varying r.p.m. with the 1/f fluctuations or at a constant speed in accordance with the current supplied.

With the other terminal of the d.c. motor 48, moreover, there is connected a flow rate control switch $SW_3$ which is operative to start and stop the blowing operation and to control the flow rate. This flow rate control switch $SW_3$ is one element of the control means II3 and is connected between the terminal of the motor 48 and the earth so that any of its switch electrodes $S_4$, $S_5$ and $S_6$ and a common electrode $S_2$ having its one end grounded to the earth are short-circuited by slecting the position of a slide bar $S_1$, which is mechanically coupled to a manually actuated knob $S_3$. Thus, the intensity of the current to flow through the d.c. motor 48 can be selected without any change in the fluctuation factor in accordance with the resistances of the resistors $R_{10}'$ and $R_{11}$ which are connected between the eletrodes $S_4$ and $S_5$ and between the electrodes $S_5$ and $S_6$, respectively.

As a result, when the aforementioned fluctuation change-over switch $SW_2$ is selected to its "ON" side and when the knob $S_3$ of the flow rate control switch $SW_3$ is selected to any other than the "OFF" side, the output signal of the adder 44, i.e., the current corresponding to the voltage which is the summation of the d.c. potential and the fluctuation signal, is applied to the terminal of the d.c. motor 48. Thus, the motor 48 has its mean r.p.m. determined by the aforementioned d.c. voltage and its fluctuation in the r.p.m. determined by the aforementioned fluctuation signal so that the wind blown from the fan 49 has fluctuations.

In dependence upon the position of the slide bar $S_1$ of the aforementioned flow rate control switch $SW_3$, it is possible to select the overall flow rate of the blower, i.e., the mean wind intensity. On the other hand, it goes without saying that a predetermined flow speed can be attained if the change-over switch $SW_2$ is selected to its "OFF" side.

If human beings are exposed to the wind of the automotive blower having the construction thus far described, they more feel as if they are exposed to the natural wind outdoors, because of the fluctuations in the intensity of the wind than to the wind of the conventional blower in the predetermined constant intensity. Moreover, since the intensity of the wind is varied without interruption, the coolness sensed by the human beings is enhanced.

If the blower according to the third embodiment is applied to the air conditioner or cooler of the automobile, the passenger is sometimes made conscious that the passenger's compartment is cooled or warmed because of the fluctuations in the intensity of the wind or the breath of the wind so that the cool or warm feeling can be attained more effectively than the condition under which that compartment is steadily cooled or warmed. Moreover, since the fan is not rotated in a steady manner, the power consumption rate can be reduced. Still moreover, there can be obtained a merit that the capacity of the refrigerating system may be small.

On the other hand, if the human beings are exposed to the steady wind, their senses become familiar and dead to it so that the cooling or warming operation is continued for a longer period than necessary, which may be undesired from the standpoint of health.

Moreover, even the wind having simple and regular fluctuations is satisfactory at first, but the senses of the human beings become familiar and dead to that wind before long. This wind also raises a problem similar to the steady wind.

The blower according to the present embodiment solves the aforementioned problem because it fluctuates the flow rate and speed of the wind at random with the $1/f$ fluctuation characteristics.

It is known in the art that a transistor intrinsically generates the $1/f$ noises in the random generating means I3. However, since the use of these noises in a low frequency range raises a defect for reasons to be described hereinafter, and there is found no example for positively using those noises.

More specifically, the transistor has its intrinsic property to have its operating point fluctuated by the influence of the change in temperature thereby to establish a drift. For example, in case the $1/f$ noises are to be taken out in an ultra-low frequency range of one several hundredth of thousandth, the d.c. coupling is generally convenient but it superposes the aforementioned drift due to the temperature change upon the $1/f$ noises, thereby causing a large error.

As another means for avoiding the aforementioned temperature drift, on the other hand, there is a method in which a condenser corresponding to the minimum frequency in the frequency range to be handled by the collector of the transistor, i.e, the lower cut-off frequency is used to effect the a.c. coupling thereby to avoid the change like a direct current. As a matter of fact, however, this method raises a disadvantage that, if the cut-off frequency is low, such component of the voltage change of the temperature drift of the transistor as belongs to a higher range than the aforementioned cut-off frequency is superposed upon the $1/f$ noises to be intrinsically taken out, thereby to invite an error.

That method has another defect that it takes a long time for the normal operating range to be reached after a power source switch is turned on. On the other hand, it has also been tried to maintain the trasistor at a constant temperature thereby to avoid the temperature drift. However, this trial is disadvantageous in cost, and a long time is required before a constant temperature oven or the like is stabilized, thus lacking the quick response. The random generating means I3 is advantageous in that the $1/f$ noises can be used as the fluctuation signal stably without being influenced by the drift in the operating point up to sufficient low frequency range by means of a small number of parts and by the use of simple connections.

On the other hand, the change-over switch $SW_1$ of the control means II3 is provided to determine the upper cut-off frequency of the frequency to be handled by the fluctuation signal, as has been described hereinbefore. If the aforementioned switch $SW_1$ is selected to the side providing connection with the condenser $C_2$ having a relatively low capacity, the fluctuation signal containing the higher frequency component is transmitted so that the wind having rhythmical fluctuations of high frequency can be generated. On the contrary, if the aforementioned switch $SW_1$ is selected to the side providing connection with the condenser $C_3$ having a relatively large capacity, the fluctuation signal having the lower frequency component is transmitted so that it has nothing but a remarkably slow change. As a result, the fluctuations in the wind become soft. Therefore, the user can select the wind in accordance with his taste.

A system according to a fourth embodiment is provided by applying the present invention to an automatic air conditioner for a vehicle such as an automobile and will be described with reference to FIGS. 8 and 9.

The automatic air conditioner conventionally combines the heater function to heat the air in a passenger's compartment or the ventilated fresh air thereby to effect the warming or dehumified warming of the compartment and the cooler function to cool or dehumidify the air in the compartment or the ventilated air so that the air dehumidified through the cooler may be partially guided through the heater thereby to control the air-conditioning of the vehicular compartment.

Figure 8:
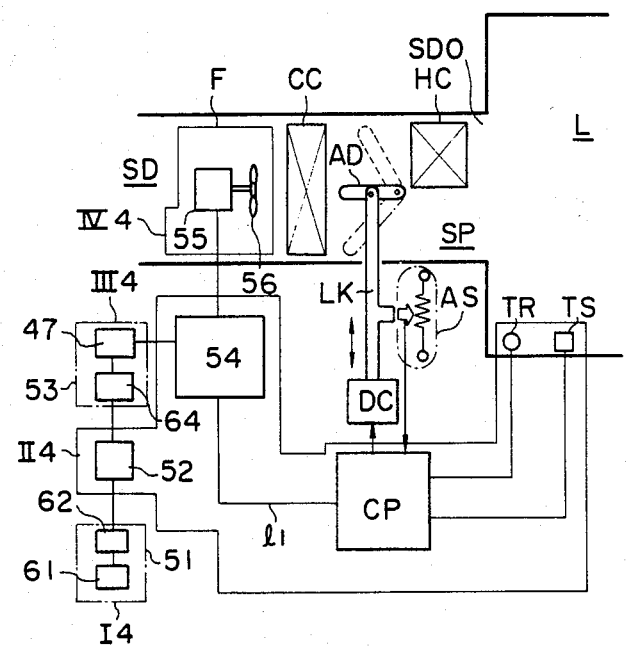
FIG. 8 is a block diagram showing a fourth embodiment of the present invention.

More specifically, the automatic air conditioner of this kind according to the prior art has such a construction as is shown in FIG. 8, in which the air introduced into a ventilating duct SD is blown therethrough by the action of a blower F so that it is first cooled by a cooler core CC having a refrigerator evaporator of refrigerating cycle and is then heated by a heater core HC using the cooling (hot) water of an automotive engine. In this instance, the flow rate of the air to be heated by the heater core HC is controlled by the opening of an air mixing damper AD so that the cooling air, which has passed through the cooler core CC at a rate corresponding to the opening of that damper AD, flows through the heater core HC whereas the remaining cooling air bypasses the heater core HC and flows through a bypass passage SP thereby not to be heated. The air having been heated by the heater core HC and the cool air having passed through the bypass passage are mixed at the outlet SDO of the ventilating duct SD so that the mixed air is blown into a passenger's compartment L so as to adjust the air temperature in the compartment L to a preset level.

The mechanism for maintaining the temperature in the compartment L at the preset level is constructed as follows. An operation unit CP is provided to administer the measurements, judgements and commands so that the deviation voltage $\epsilon$ between the voltage of a temperature setter TR for generating a voltage corresponding to the temperature and the output voltage of a temperature sensor TS having a function to generate the voltage corresponding to the compartment temperature is always made minimum. A link LK is so movably attached as to control the opening of the aforementioned air mixing damper AD in accordance with the amplitude and polarity of the aforementioned deviation voltage $\epsilon$. A damper controller DC includes an actuator for driving the link LK in the directions of arrows of FIG. 8 in accordance with the aforementioned deviation voltage $\epsilon$ which is fed out of the operation unit CP. An angle detector AS includes a movable electrode mechanically fixed to a portion of the link LK for detecting and feeding back to the operation unit CP the quantity which corresponds to the movements of the link LK, i.e., the rotational angle of the damper AD, so that the opening of the damper AD accurately coincides with the deviation $\epsilon$, thereby to detect the displacement corresponding to the angle. Thus, a servo loop is constructed so that the temperature set by the temperature setter TR and the air temperature in the compartment L, i.e., the temperature detected by the temperature sensor TS coincides with each other.

On the other hand, the blower F is supplied with an electric power in relation to the level of the aboslute value $|\epsilon|$ of the deviation $\epsilon$ so that, when the aboslute value $|\epsilon|$ is large, its motor is supplied with a high power and has its r.p.m. increased to increase the flow rate and so that, if the absolute value $|\epsilon|$ is small, on the contrary, its motor is supplied with a low power and has its r.p.m. decreased to reduce the flow rate.

This serves to provide a mechanism for effecting quickly responsive and stable temperature control by raising the capacity of the cooling or heating operation, when the difference between the set temperature and the actual compartment temperature is large, and by reducing the flow rate and accordingly the operation capacity when the set temperature is approximately reached.

The automatic air conditioner, to which the fourth embodiment is applied, serves to fluctuate the electric power to be supplied to the blower thereby to further enhance the senses to the coolness or warmness, to satisfy the passenger more promtly with less energy and to prevent the health from being troubled due to the excessive coolness or warmness.

The automatic air conditioner according to the fourth embodiment is characterized, as has been described hereinbefore, in that the intensity of the fluctuations is automatically varied in accordance with the cooling or warming condition, in that the ratio between the steady wind and the fluctuating wind is manually controlled in accordance with the taste of the user, and in that the 1/f fluctuation signal generator including the digital type white noise generator, which is stable and has a small number of parts, and the RC filter circuit, the power spectrum of which has the 1/f frequency characteristics, is used as the random generating means I4.

The fourth embodiment will now be described in detail with reference to FIG. 9.

The system according to the fourth embodiment comprises: a 1/f frequency signal generator 51 acting as the random generating means I4; a signal processing unit 52, the operation unit CP for controlling the flow rate of the wind in accordance with the deviation between the set temperature and the room temperature, and a power control unit 54, all of which construct control means II4; a power amplifier 53 acting as amplifier means III 4; and a d.c. motor 55 and a fan 56 both acting as drive means IV4.

The 1/f fluctuation signal generator 51 comprises a white noise signal generator 61 and a polarity inverting type filter circuit 62. The white noise signal generator 61 comprises: a shift register 57 in which shift register elements are connected in cascade in n steps; one or more exclusive OR circuit 58, which has its two input terminals connected with the arbitrary two steps of the n-step shift register 57 and has its output terminal connected with the input terminal of the shift register 57 with a feedback loop; a clock oscillator 59 for feeding the shift register 57 with clock signals; and a polarity inverting type adder 60 made of an operational amplifier having a feedback resistor $R_{12}$. The arrangement of the levels of "0" and "1" at each step of the shift register is absolutely arbitrarily varied for each clock. The resistors in the total number of m ($m \leq n$) are connected with arbitrary steps of the shift register 57 and the respective other terminals of the resistors are connected with the input terminal of the adder 60. At the output terminal r of the adder 60 (i.e., at the output terminal r of the white noise signal generator 61) there is generated an analog white noise signal having the minimum output voltage of 0[V], the maximum output voltage of $-E[V]$ and an average output potential of $-E/2[V]$ and having its voltage varying absolutely at random. The polarity inverting type filter circuit 62 comprises: a circuit in which there are connected, in parallel, a first RC circuit composed of resistors $R_{13}$ and $R_{14}$ connected in series with the output terminal r of the white noise signal generator 61 and a condenser $C_4$ having its one terminal grounded to the earth, and a second RC circuit composed of condenser $C_5$ and resistor $R_{15}$ connected in series; and operational amplifier having a feedback resistor $R_{16}$, the first and second RC circuits acting as an input impedance to the operational amplifier.

Figure 10:
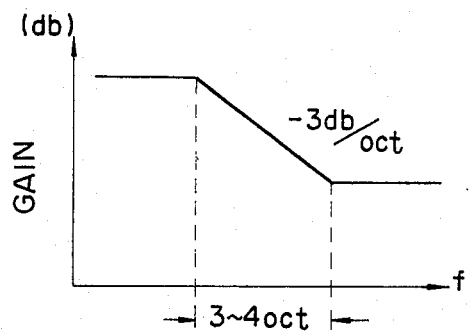
FIG. 10 is a view showing the characteristics of the circuit of the random generating means of the fourth embodiment.

The filter circuit 62 has transmission characteristics of 1 for a low frequency and $-6$ db/oct for a high frequency, if the ratio of the sum of the resistances of the resistors $R_{13}$ and $R_{14}$ to the resistance of the resistor $R_{16}$ is selected at 1, and has such a first order lag property that its upper cut-off frequency is determined by the product of the resistances of the resistors $R_{13}$ and $R_{14}$ connected in parallel and the capacity of the condenser $C_4$ and such a first order lead property that its lower cut-off frequency is determined by the product of the capacity of the condenser $C_5$ and the resistance of the resistor $R_{15}$. The overall frequency characteristics are set at $-3$ db/oct by selecting the ratio of the resistances of the registors $R_{16}$ and $R_{15}$ at about 0.25 to 0.3. Since this property of $-3$ db/oct can be obtained for a period of 3 to 4 oct (octaves), as shown in FIG. 10, that circuit can be adapted to a wider frequency range if similar circuits are connected in cascade, if necessary. At the output terminal of that filter circuit 62, i.e., at the output terminal of the operation amplifier, there is generated the 1/f fluctuation signal which has its voltage changing from 0[V] to $+E[V]$ while haivng a mean potential of E/2[V] and which has its power spectral density proportional to 1/f.

Now, the aforementioned fluctuation signal is fed to such one stationary electrode $P_2$ of a slide potentiometer $R_{17}$ as acts as the input terminal of the signal processing unit 52. And, the other stationary electrode $P_3$ is connected with a d.c. voltage source of E/2[V]. On the other hand, a collector electrode PC, which is in contact with a slide electrode PS equipped with a knob for eay manipulation, is connected with the input resistor $R_{19}$ of an amplifier 63 which is made of an operational amplifier having a feedback resistor $R_{18}$. The slide potentiometer $R_{17}$ controls the ratio of the fluctuation in the flow rate of the wind due to the fluctuating rotation of the fan to the steady flow rate of the wind, i.e., the ratio of the fluctuation to the steady value (i.e., the fluctuation factor).

More specifically, one stationary electrode $P_2$ of the slide potentiometer $R_{17}$ is fed with the 1/f fluctuation signal which has its d.c. potential at E/2[V] and its fluctuation, i.e., its fluctuation voltage changing from O[V] to E[V], whereas the other stationary electrode $P_3$ is fed with the d.c. voltage of E/2[V].

As a result, the voltage of the collector electrode PC, which is obtained through the slide electrode PS, is determined by the position of the slide electrode PS.

Figure 9:
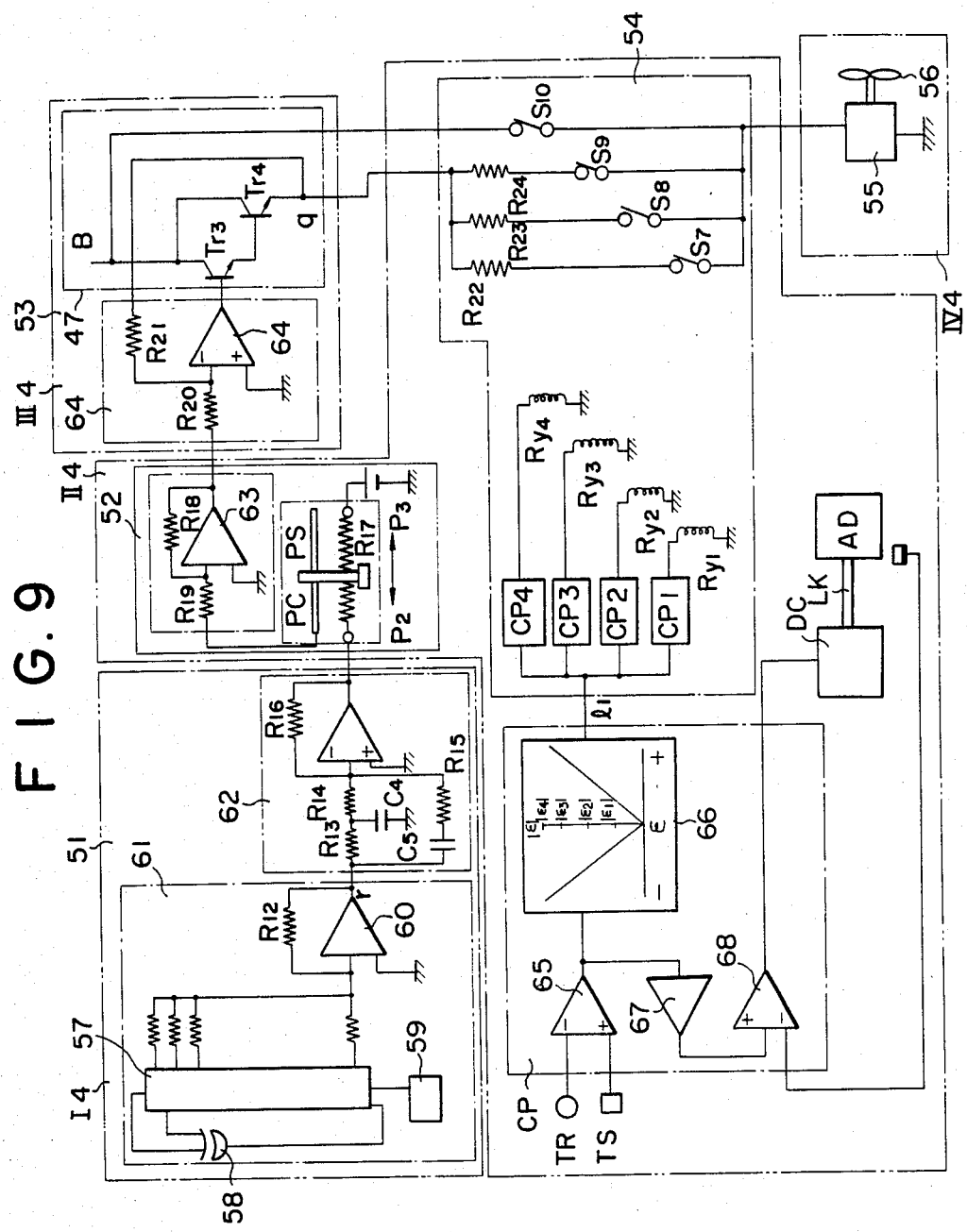
FIG. 9 is a circuit diagram showing the fourth embodiment.

For example, if the slide electrode PS is slid fully to the left, as viewed in FIG. 9, i.e., to the position of the stationary electrode $P_2$, it is possible to obtain a signal which fluctuates 100% to the positive and negative, respectively, for the d.c. potential of E/2[V]. If, on the contrary, the slide electrode PS is slid to the right, i.e., to the position of the stationary electrode $P_3$, the fluctuating component is reduced to zero thereby to leave only the d.c. potential. If, on the other hand, the slide electrode PS is slid to an intermediate position, it is possible to obtain a fluctuation signal which is the fluctuating signal component having a level according to that position while having the d.c. potential of E/2[V]. As a result, by manually operating the slide electrode PS, it is possible to control the ratio of the fluctuation ocmponent to the steady value, i.e., the fluctuation factor.

Thus, by manually shifting the position of the slide electrode PS, the signal which has the d.c. potential of E/2[V] and which has its fluctuating component selected between 0 to 100% is fed to the amplifier 63, in which it is amplified to a predetermined level while having its polarity inverted, so that it is fed out as a voltage signal having a negative polarity. This output voltage is fed to the input register $R_{20}$ of an operational amplifier 64 constructing the power amplifier 53.

The output terminal of the operational amplifier 64 is connected with the base of the exitter-follower transistor $Tr_3$ of the power amplifier 47 similar to the third embodiment, and the feedback resistor $R_{21}$ of the operational amplifier 64 is connected with the emitter q of the transistor $Tr_4$. As a result, the aforementioned input voltage has its polarity inverted and is generated as a positive voltage at the output terminal q of the power amplifier 53. This output voltage is fed to the power controller 54 which is operative to control the power to be fed to the blower F thereby to control the capacity of the blower F. The power controller 54 is operated when it receives a command from the operation unit CP appearing in FIG. 8. The operation of the operation unit CP for giving the command to the power controller 54 will be described in the following.

The operation unit CP is fed with the two pieces of information, which are fed out of the temperature setter TR for setting the temperature in the passenger's compartment and the temperature sensor TS for detecting the air temperature in the compartment, as shown in FIGS. 8 and 9.

In FIG. 9, the two pieces of information of the temperature setter TR and the temperature sensor TS are calculated by a differential amplifier 65 so that the deviation $\epsilon$ inbetween is fed out.

This deviation $\epsilon$ is divided to take two ways, one of which is fed through an amplifier 67 and a deviation amplifier 68 to the damper controller DC including an actuator for controlling the angle of the damper AD. The damper AD rotates through the link LK and together with the angle detector AS in such a direction as to minimize the aforementioned deviation $\epsilon$ so that it controls the flow rates of the cool and warm winds thereby to automatically control the temperature in the compartment 12.

The deviation $\epsilon$ is fed out through the other way to an absolute value circuit 66, in which its absolute value $|\epsilon|$ is calculated. This absolute value $|\epsilon|$ is fed to the command input portion of the power control unit 54 through the lead line indicated at $l_1$ in FIG. 9. This absolute value $|\epsilon|$ of the deviation becomes large, if there is a large difference, i.e., deviation between the temperature setter TR and the detected air temperature in the compartment, i.e., the temperature of the temperature sensor TS, and becomes small or zero if the deviation inbetween is small.

As a result, for example, when the engine of the automobile is started to operate the air-conditioner for the first time, the aforementioned value $|\epsilon|$ is large. As the temperature in the compartment is controlled to approach the set level before long, the value $|\epsilon|$ is gradually reduced. Therefore, when that deviation takes the maximum, the maximum steady d.c. voltage is applied to the blower F so that the capacity of the blower F may be fully utilized so as to make the air temperature in the compartment approach the set level as soon as possible. Moreover, in order to reduce the power to be fed to the blower F as the air temperature approaches the set level, i.e., as the value $|\epsilon|$ becomes smaller, a resistor is connected in series with the d.c. motor 55 of the blower F thereby to reduce the power so that the blowing capacity may be reduced, and the aforementioned fluctuation signal is additionally applied.

More specifically, the power control unit 54 devides the value of the aforementioned deviation $|\epsilon|$ into the steps of 0 to $|\epsilon_1|$, $|\epsilon_1|$ to $|\epsilon_2|$, $|\epsilon_2|$ to $|\epsilon_3|$, and $|\epsilon_3|$ to $|\epsilon_4|$, and the step of the deviation $|\epsilon|$ is judged by means of wind comparators $CP_1$ to $CP_4$ so that relays $Ry_1$ to $Ry_4$ corresponding thereto and contacts $S_7$ to $S_{10}$ connected with control resistors $R_{22}$ to $R_{24}$ are turned "ON".

Now, if the air-conditioner is started, it is anticipated that the deviation between the set temperature and the compartment air temperature is the maximum at first. At this time, the value of the aforementioned deviation $|\epsilon|$ is at the step of $|\epsilon_3|$ to $|\epsilon_4|$, and the aforementioned comparator $CP_4$ takes the state of "1" so that the relay $Ry_4$ is operated to have its contact $S_{10}$ "closed". As a result, the steady d.c. voltage source such as the car battery B and the motor 55 of the blower F are directly connected so that the blower F is driven at the maximum wind flow rate, whereby the compartment air temperature is controlled to the set temperature, When the deviation $|\epsilon|$ is reduced before long to reach the step of $|\epsilon_2|$ to $|\epsilon_3|$, the comparator $CP_3$ takes the state of "1". Then, the relay $Ry_3$ is operated so that only the corresponding contact $S_9$ is "closed".

In this case, the output terminal q of the power amplifier 53 is connected through the control resistor $R_{24}$ with the motor 55 of the blower F so that the summed power of the steady d.c. component and the fluctuating component is fed to the blower in accordance with the resistance of of the control resistor $R_{24}$, as has been described in the above. As a result, the wind blown out of the blower F becomes weaker than that at the step of $|\epsilon_3|$ to $|\epsilon_4|$ and fluctuates in intensity. Since the resistances of the control resistors are so selected to be $R_{22}>R_{23}>R_{24}$, the wind coming out of the blower becomes the weaker are the deviation $|\epsilon|$ becomes the smaller.

In the automatic air conditioner according to the fourth embodiment, therefore, when the compartment temperature is highly different from the set level, the blower F blows out the maximum steady wind so that the set level may be approached promptly, and the capacity (i.e., the flow rate) of the blower F is reduced to control the fluctuating wind as the set level is approached, i.e., the deviation $|\epsilon|$ is reduced.

The automatic air conditioner of the fourth embodiment varies the flow rate and the fluctuating amplitude in accordance with the deviation between the compartment temperature and the set level so that the fluctuating amplitude may continue from that of the previous step. As a result, the automatic air conditioner of the fourth embodiment has an advantage that the temperature can be controlled continuously and quite naturally to the target without making the passenger conscious of the step, as is different from the case of the steady wind.

A first modification of the fourth embodiment will be described below.

In the fourth embodiment, there is adopted at the power control unit 54 of FIG. 8, i.e., at the means for controlling the power and fluctuation signal to be fed to the blower F in accordance with the deviation $|\epsilon|$ between the set temperature and the compartment temperature, a method in which the absolute value of the deviation is detected on the basis of the signal from the operation unit CP thereby to stepwise determine the absolute value $|\epsilon|$ of the deviation so that the control resistors are interchanged by the use of the multi-step comparators and relays. In this modification, however, none of the absolute value of the deviation, the comparators and the relays are used, but mechanical means is used to interchange the aforementioned control resistors in accordance with the angle of the damper AD thereby to attain the effects similar to the fourth embodiment.

The following description will be made with reference to FIG. 11 while stressing the differences from the fourth embodiment, and identical parts are indicated at identical reference characters so that their repeated explanations are omitted.

The power control unit 54' of the first modification comprises: a slide switch $SW_4$ composed of a slide electrode $PS_1$, which is fixed to the link LK or the power and displacement transmitting means for controlling the angle of the air damper AD the most properly by the actuator of the damper controller DC, and seven contacts $P_4$ to $P_{10}$; and three control resistors $R_{25}$ to $R_{27}$.

Figure 11:
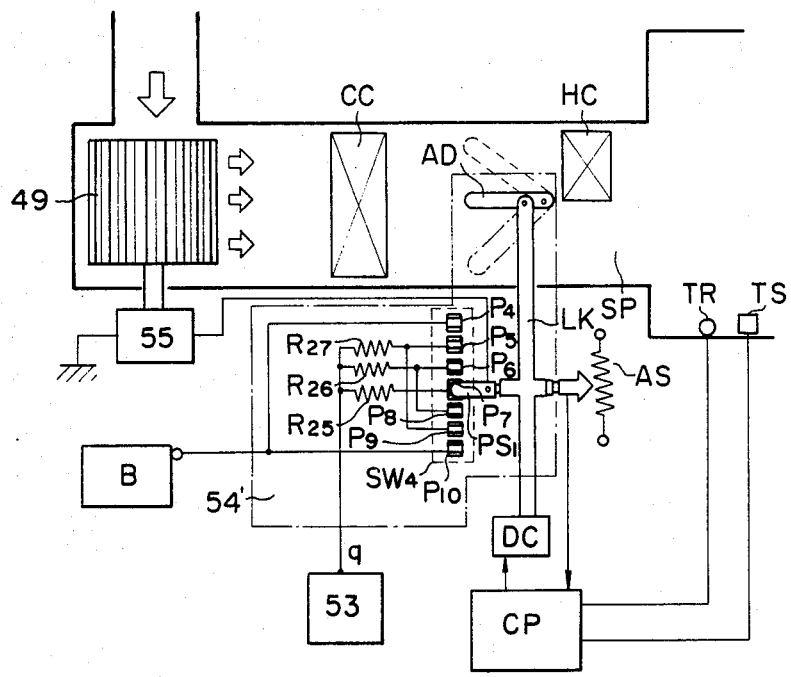
FIG. 11 is a block diagram showing a first modification of the fourth embodiment.

The slide electrode $PS_1$ is made operative to slide up and down, as viewed in FIG. 11, together with the link LK for determining the angular displacement of the air damper AD. The contacts $P_4$ and $P_{10}$ are connected with the car battery B. The contacts $P_5$ and $P_9$ are connected through the control resistor $R_{27}$ with the output terminal q of the power amplifier 53. The contacts $P_6$ and $P_8$ and the contact $P_7$ are connected through the control resistor $R_{26}$ and through the control resistor $R_{25}$, respectively, with the output terminal q of the power amplifier 53. The slide electrode PS1 is connected with the d.c. motor 55 for driving the Sirocco fan 49 of the driving means IV4.

In FIG. 11, the damper AD shown in solid lines holds a horizontal position so that the air flow blown from the fan 49 is divided into two flows, which pass at a ratio of about 1 through the heater core HC and the bypass passage SP- until they are blown into the passenger's compartment L. This position of the damper AD is indicated by an angle 0. The angle when the damper AD is swung upward to the position indicated at broken lines in FIG. 11, i.e., the position in which no air flows into the heater core HC is indicated by $+\theta m$. The angle when the damper AD is swung in the opposite direction to the position in which no air flows through the bypass passage SP, i.e., the position indicated at single-dotted lines in FIG. 11 is indicated by $-\theta m$.

In the slide switch $SW_4$, on the other hand, the slide electrode PS1 contacts with the contact $P_7$, when the angle of the damper AD is 0, and with the contact $P_4$ or $P_{10}$ at both ends when the angle of the damper AD becomes $+\theta m$ or $-\theta m$. In case the angle of the damper AD is an intermediate one, the slide electrode PS1 contacts with any of the contacts $P_5$, $P_6$, $P_8$ and $P_9$ located at the positions corresponding to the respective angles of the damper.

Next, the operating principles, on which the damper controller DC controls the damper AD in response to the signal of the operation unit CP thereby to make the temperature in the compartment L approach the set level, will be briefly described. Specifically, in case the value of the temperature setter TR is far higher than that of the temperature sensor TS, the condition is that the air temperature in the compartment L is lower than the set level. In order to raise the compartment temperature, therefore, the operation unit CP instructs the damper controller DC so that the angle of the damper AD is shifted downward, as viewed in FIG. 11, thereby to increase the flow rate of the air passing through the heater core HC and to reduce the flow rate of the air passing through the bypass passage SP. In case, on the contrary, the air temperature in the compartment L is higher than the set level, the damper AD is swung upward, as viewed in FIG. 11, so as to lower the compartment temperature thereby to reduce the the flow rate of the air passing through the heater core HC so that most of the air, which has been cooled by the cooler core CC, is allowed to pass through the by-pass passage SP.

The operations of the first modification having the construction thus far described will be explained below.

As has been described in the above, the damper AD has its angle varied by the damper controller DC in accordance with the difference between the set level of the air temperature and the temperature of the compartment. More specifically, as the temperature difference is increased the more, the damper angle is increased the more. Here, the sign of the damper angle is related to that of the temperature difference and the angle of the damper AD becomes positive (i.e., the damper is moved in the upward direction) when the compartment temperature is higher than the set level, but becomes negative when the compartment temperature is lower than the set level.

In other words, when the difference between the set level and the compartment temperature is large, the angle of the damper takes a large value for the case of either the positive or negative value. The plus and minus signs are determined by the difference whether the air-conditioning direction is to cool or warm. In case this angle is large, therefore, it is necessary to enhance the air-conditioning capacity so that the fan 49 is required to have a large r.p.m.

When the damper AD has it angle reaching or coming close to $+\theta m$ or $-\theta m$, it is necessary for the fan 49 to blow at its maximum r.p.m.

In the first modification, therefore, the slide electrode PS1 made movable together with the damper AD comes into contact, as shown in FIG. 11, with the contact $P_4$ or $P_{10}$, when the angle of the damper AD is in the vicinity of $+\theta m$ or $-\theta m$, so that the voltage of the battery is fed directly to the fan 49 thereby to attain the maximum flow rate.

Next, when the compartment temperature resultantly reaches the set level, the angle of the damper AD is shifted to 0. In this case, the slide electrode PS1 stepwise changes the contact point in the order of the contacts $P_4 \to P_5 \to P_6 \to P_7$ $P_{10}$-$P_9$-$P_8$-$P_7$ in accordance with angles of the damper AD.

Since the resistances of the control resistors are selected to be $R_{27} < R_{26} < R_{25}$, the voltage which is prepared by superposing the fluctuation signal upon the steady d.c. potential, is fed, as has been described in the fourth embodiment, from the output terminal q of the power amplifier 53 through the respective control resistors to the fan 49, as the slide electrode PS1 changes the contact point in the order of the contacts $P_5 \to P_6 \to P_7$ or the contacts $P_9 \to P_8 \to P_7$. The power to be supplied to the d.c. motor 55 is reduced as the angle of the damper AD approaches 0. Thus, the amplitude of the changes in the intensity of the fluctuations is controlled by the damper angle.

In other words, according to the first modification, under the condition in which it is necessary to perform the cooling or warming operation at the maximum capacity, the steady wind is blown to enhance the capacity of the fan. As the target air temperature is approached, the capacity of the fan is lowered in accordance with the damper angle, i.e., the approaching degree thereof, and the intensity of the wind is fluctuated so that human beings may effectively sense coolness or warmness. In the first modification, moreover, the switch made operative in relation to the damper angle is used as the means for effecting the stable and prompt air-conditioning operation so that the control resistors may be interchanged to control the power to be supplied to the d.c. motor 55.

A system according to a fifth embodiment is provided by applying the present invention to an automotive automatic air conditioner similarly to the system of the fourth embodiment and is characterized in that the r.p.m. of the fan is automatically controlled at random with the $1/f^2$ characteristics and in that the fluctuation factor is automatically controlled in accordance with the deviation of the compartment temperature from the set temperature.

Figure 12:
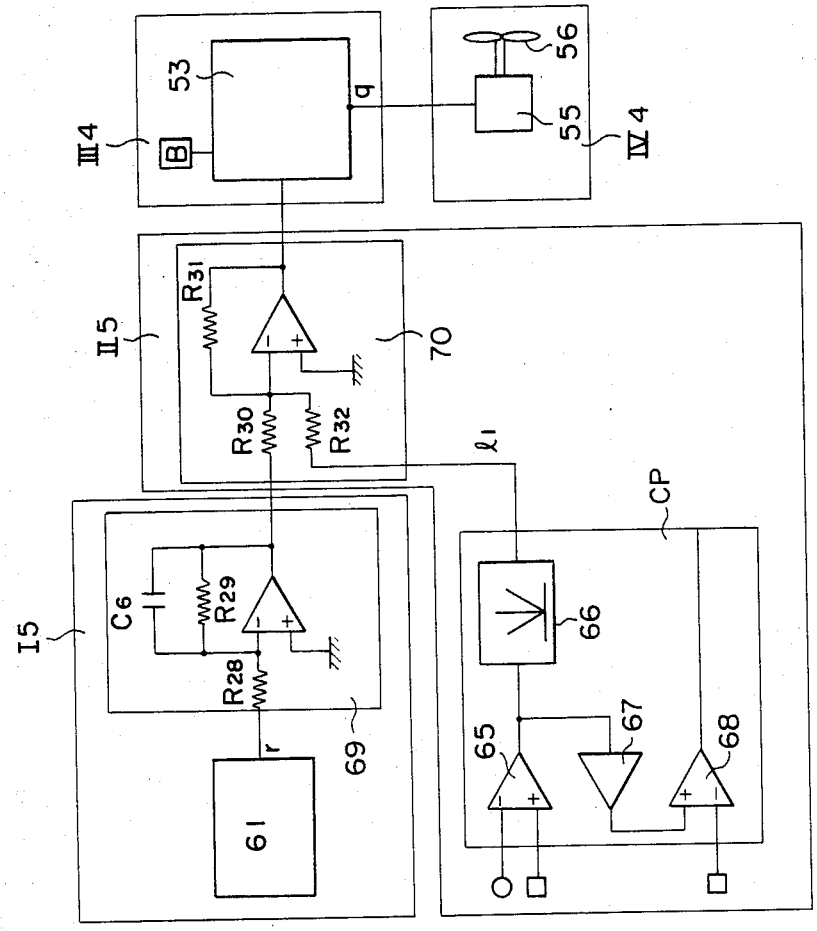
FIG. 12 is a block circuit diagram showing a fifth embodiment of the present invention.

The system of the fifth embodiment will now be described with reference to FIG. 12 while stressing the differences from the system of the fourth embodiment. Identical parts are indicated at identical reference characters, and their repeated explanations are omitted.

Random generating means 15 has the modified filter circuit to be connected with the white noise generator 61 so that the fluctuations to be obtained may have the power spectral density proportional to $1/f^2$.

A filter circuit 69 of the present embodiment comprises an operational amplifier of polarity inverting type, which has one input terminal connected through an input resistor $R_{28}$ with the output terminal r of the white noise generator 61, and has the other input terminal grounded to the earth, and a resistor $R_{29}$ and a condenser $C_6$ as a feedback impedance connected in parallel between the input and output terminals of the operational amplifier. The filter circuit 69 has such characteristics that the power spectral density is proportional to $1/f^2$ in the frequency range higher than the cut-off frequency fc which is determined by the product of the resistance of the feedback resistor $R_{29}$ and the capacitance of the condenser $C_6$.

Since there is generated at the output terminal r of the white noise generator 61 the white noise signal which has the d.c. potential of $-(E/2)$ [V] and the maximum amplitude of $0[V]$ to $-E[V]$, as has been described in connection with the fourth embodiment, the filter circuit 69 generates at its output terminal the $1/f^2$ fluctuation signal, which has the d.c. potential of $E/2$ [V] and which has its power spectral density proportional to $1/f^2$, due to the aforementioned filter characteristics. The fluctuation signal is fed to one input resistor $R_{30}$ of the polarity inverting type adder having a feedback resistor $R_{31}$, which belongs to a signal processing unit 70 of control means II5.

The other input resistor $R_{32}$ of the adder 70 is connected through the lead line $l_1$, as is used in the foregoing fourth embodiment, with the output terminal of the absolute value circuit 66 of the operation unit CP, which is operative to generate the absolute value $|\epsilon|$ of the deviation between the set temperature and the air temperature.

As a result, the output signal $e_0$ of the signal processing unit 70 is the addition of the signals, which are fed to the two input resistors $R_{30}$ and $R_{32}$, while having their polarities inverted, and is expressed by the following Equation (1).

$$e_0 = -K_1\left\{ \frac{E}{2} + f(t) \right\} - K_2|\epsilon| = \\ -K_1 f(t) - \left( \frac{K_1}{2} E + K_2|\epsilon| \right) \tag{1}$$

In the Equation 1: $K_1$ denotes the gain determined by the ratio $R_{31}/R_{30}$; $K_2$ denotes the gain determined by the ratio $R_{31}/R_{32}$ and f(t) denotes the $1/f^2$ fluctuation signal which has the maximum amplitude of 0 to E [V].

As a result, the output signal $e_0$ is fed to the polarity inverting type power amplifier 53.

The output terminal q of the power amplifier 53 is connected with the d.c. motor 55 of the fan 56. As a result, the d.c. motor 55 is fed with the voltage defined by the Equation 1 thereby to blow the wind which is the mixture of the fluctuating wind of $1/f^2$ and the steady wind.

The operations of the fifth embodiment will be described in the following.

In case the deviation between the set level and the air temperature is large, the absolute value $|\epsilon|$ of the deviation is large. As the iar temperature is thereafter controlled to approach the set level, the absolute value $|\epsilon|$ of the deviation becomes small.

The voltage ef to be supplied to the d.c. motor 55 is expressed by the multiplication of the voltage, which is expressed by the Equation (1), by the voltage gain $K_p$ of the power amplifier 53:

$$ef = K_p \cdot K_1 f(t) + K_p \left( \frac{K_1}{2} E + K_2 |\epsilon| \right) \qquad (2)$$

In this Equation 2, $K_p$ denotes the voltage gain of the power amplifier 53.

Here, the first term $K_p \cdot K_1 f(t)$ of the Equation (2) expresses the signal voltage for imparting the $1/f^2$ fluctuations to the fan 56, and the second term $$K_p \left( \frac{K_1}{2} E + K_2 |\epsilon| \right)$$

expresses the signal voltage for imparting the steady wind to the fan 56.

Hence, the ratio L of the amplitude of the fluctuations to the steady value (i.e., fluctuation factor) is expressed by the following Equation (3)

$$L = \frac{K_p \cdot K_1 f(t)}{K_p \left( \frac{K_1}{2} E + K_2 |\epsilon| \right)} = \frac{K_1 \cdot f(t)}{\frac{K_1}{2} E + K_2 |\epsilon|} \qquad (3)$$

Hence, when the absolute value $|\epsilon|$ of the deviation is large, the voltage ef to be fed to the blower is high, as expressed by the Equation (2) and the ratio L of the fluctuations to the steady value is small, as expressed by the Equation (3).

More specifically, when the deviation is large, the total power (or voltage) to be supplied to the d.c. motor 55 is high, and the ratio of the fluctuating wind to the steady wind is small. When the deviation is small, on the contrary, the total power to be supplied to the blower is low, and the ratio of the fluctuating wind to the steady wind is large.

Consequently, the fifth embodiment has advantages that the compartment can be promptly cooled or warmed because the ratio of the steady wind is large when the deviation is large and that the cooling or warmed effect can be really sensed because the $1/f^2$ fluctuating wind exists when the deviation is small.

The fifth embodiment has another advantage that it can provide the most proper fluctuating wind for the user being fond of slow fluctuations because it provides the $1/f^2$ fluctuating wind.

A system according to a sixth embodiment is provided by applying the present invention to the automotive automatic air-conditioner similarly to the system of the fourth embodiment and is characterized in that the fluctuating manner is automatically changed in accordance with the temperature in the passenger's compartment and in that the fluctuation factor is automatically controlled in accordance with the deviation of the temperature in the compartment from the set temperature.

Figure 13:
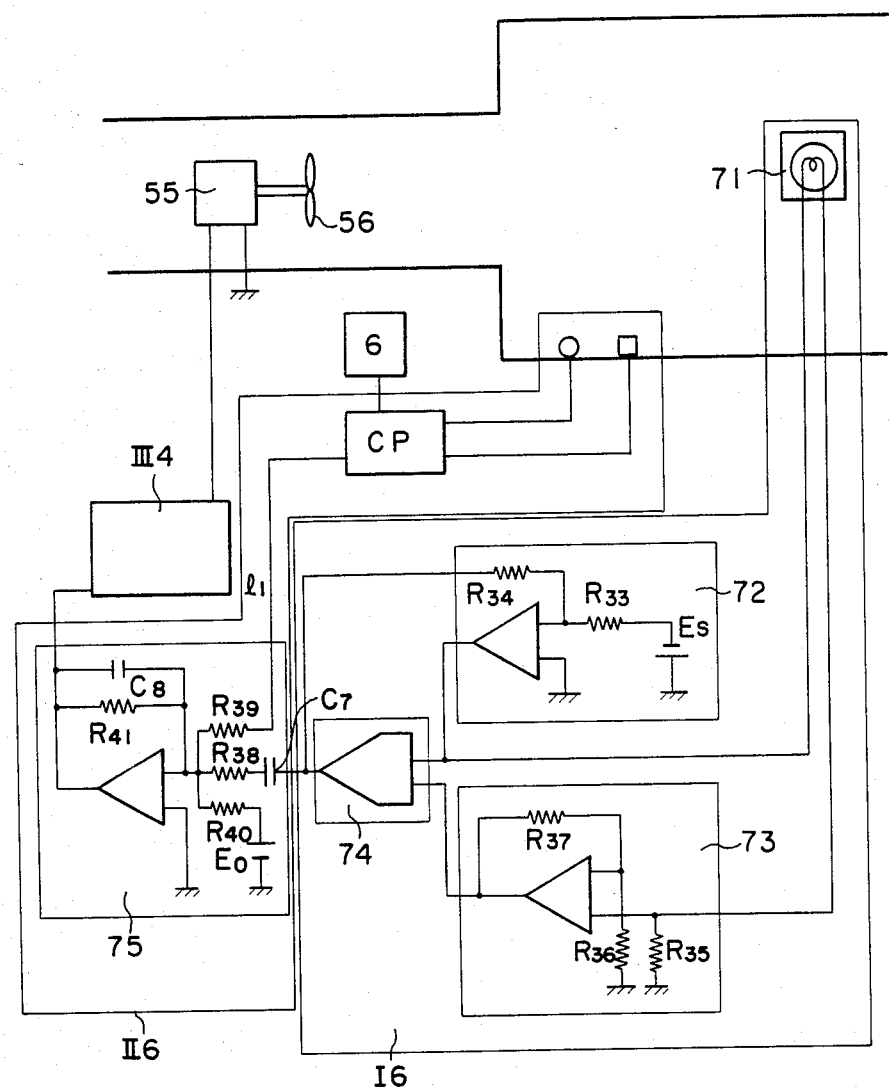
FIG. 13 is a block circuit diagram showing a sixth embodiment of the present invention.

The automatic air-conditioner according to the sixth embodiment is different from the system of the fourth embodiment in the following points. Random generating means I6 is operative to feed a fluctuation signal according to the characteristics of an electric lamp or a resistor, which is arranged in the passenger's compartment and which has a positive temperature coefficient, and control means II6 is operative to change the fluctuation factor in accordance with the deviation between the set temperature and the temperature in the compartment. The differences will be described hereinafter with reference to FIG. 13.

The random generating means I6 comprises an electric lamp 71, which is arranged at a suitable position in the compartment, and an operational amplifier 72, a non-inverting amplifier 73 and a multiplier 74, all of which act as the power source for the electric lamp 71.

The electric lamp 71 is a resistor having a positive temperature coefficient and detects the temperature information in the compartment so that is thermal characteristics resultantly feed the current signal having phase advancing characteristics.

The operational amplifier 72 has its inverting input terminal connected through a resistor $R_{33}$ with a d.c. voltage source $E_S$ for feeding out a predetermined voltage and with a feedback resistor $R_{34}$, its non-inverting input terminal grounded to the earth and its output terminal connected with the electric lamp 71.

The non-inverting amplifier 73 is made of a differential amplifier which has its non-inverting input terminal connected both with a resistor $R_{35}$ having a low resistance and having one terminal grounded to the earth and with the other terminal of the electric lamp 71 and its inverting input terminal connected both with a resistor $R_{36}$ having one terminal grounded to the earth and with a feedback resistor $R_{37}$ connected with the output terminal. Thus, the non-inverting amplifier 73 converts the current signal, which is fed out of the electric lamp 71 in accordance with the temperature in the compartment, into the voltage signal between the low resistor $R_{35}$ and the earth and amplifies and feeds out that voltage signal.

The multiplier 74 has its two input terminals connected with the output terminals of the operational amplifier 72 and the non-inverting amplifier 73, respectively, thereby to multiply and feed out the two input signals.

The control means II6 includes an inverting type adder 75. This inverting type adder 75 is made of an operational amplifier, which has its inverting input terminal grounded to the earth and its non-inverting input terminal connected with the output terminal of the multiplier 74 through a resistor $R_{38}$ and a condenser $C_7$ connected in series for determining the input impedance, connected through a resistor $R_{39}$ and the lead line $l_1$ with the aforementioned absolute value circuit of the operation unit CP, and through a resistor $R_{40}$ with the d.c. power source $E_0$ having its minus electrode grounded to the earth for feeding out a predetermined d.c. voltage. The operational amplifier of the adder 75 has its output terminal and non-inverting input terminal interconnecting a feedback resistor $R_{41}$ and a condenser $C_8$.

The input resistor $R_{38}$ and the condenser $C_7$ are set at such predetermined values as to determine the lower limit of the frequency range allowing the voltage signal fed out of the multiplier 74 to pass therethrough. Likewise, the feedback resistor $R_{41}$ and the condenser $C_8$ are set at such predetermined values as to determine the upper limit of that frequency range.

As a result, the adder 75 adds the fluctuation signal within a predetermined frequency range, the absolute value |ε| of the deviation between the set temperature and the compartment temperature, and the d.c. voltage and feeds out the voltage signal of negative polarity to the power amplifier 53 similarly to the fourth embodiment.

The sixth embodiment having the construction thus far described includes at a suitable position in the compartment the electric lamp 71 which forms one element of the random generating means I6, feeds out the random noises, i.e., the fluctuation signal having its fluctuations varying as a result that the operating point of the electric lamp 71 is influenced by the compartment temperature, adds the absolute value |ε| of the deviation and the d.c. voltage $E_0$ to that fluctuation signal, inverts and amplifies the added voltage by means of the power amplifier 53, and feeds the amplified voltage to the d.c. motor 55 for driving the fan 56. As a result, the terminal voltage of the d.c. motor 55 of the fan 56 has a positive polarity and is the addition of the aforementioned value |ε|, voltage $E_0$ and fluctuation signal. Here, since the value |ε| is a quantity corresponding to the difference between the set level and the compartment temperature, the power of the d.c. motor 55 is so varied in accordance with that deviation. Namely, it becomes high, when the deviation |ε| is large, and low when the deviation |ε| is small. On the other hand, the fan 56 continues its rotations at the minimum r.p.m. by the predetermined voltage $E_0$ of the d.c. power source even when the deviation |ε| becomes zero.

The automatic air conditioner according to the sixth embodiment has an advantage that the fluctuating manner of the flow rate of the fan can be automatically changed in accordance with the compartment temperature without any troublesome control, and it enhances the function as the automatic air conditioner so that it is the most suitable for aplication to a high-grade air conditioner.

Moreover, since the fluctuation factor of the flow rate of the fan is changed in accordance with the deviation between the set temperature and the compartment temperature, the sixth embodiment has another advantage that the temperature is gradually controlled with a natural feeling to a set target thereby to augment the comfortableness.

A system according to a seventh embodiment is provided by applying the present invention to the automotive automatic air-conditioner similarly to the system of the fourth embodiment and is characterized in that a microcomputer is used to automatically reduce the r.p.m. of the fan in a stepwise manner as the difference of the temperature in the passenger's compartment from the set temperature is reduced. It is also characterized in that the r.p.m. of the fan is automatically fluctuated to blow the wind having such breathes as frequently vary with a small fluctuation factor when the aforementioned difference becomes equal to or smaller than a predetermined value, and in that the r.p.m. of the fan is automatically fluctuated to blow the wind having such breathes as slowly vary with a large fluctuation factor when the aforementioned difference becomes equal to or smaller than a predetermined smaller value.

Figure 14:
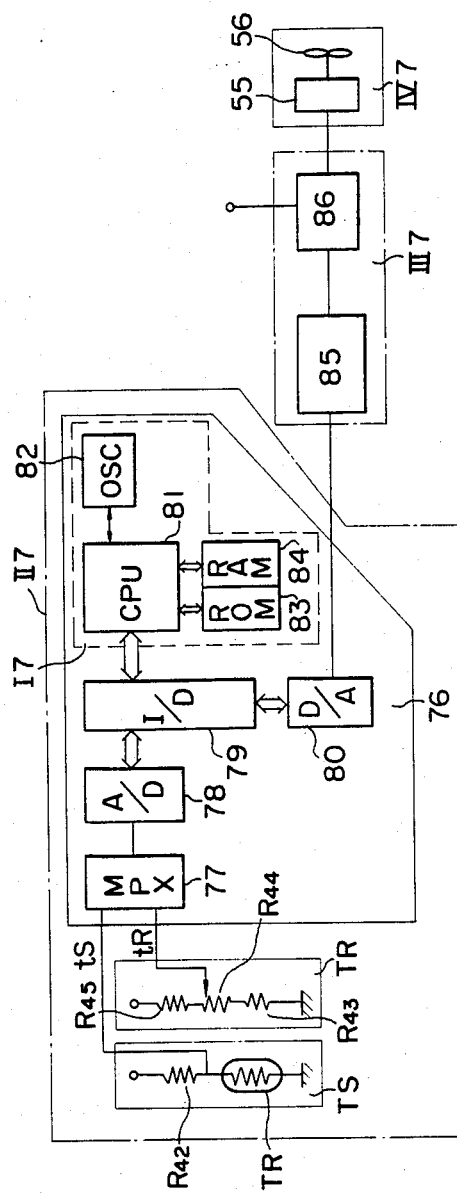
FIG. 14 is a block circuit diagram showing a seventh embodiment of the present invention.
Figure 15:
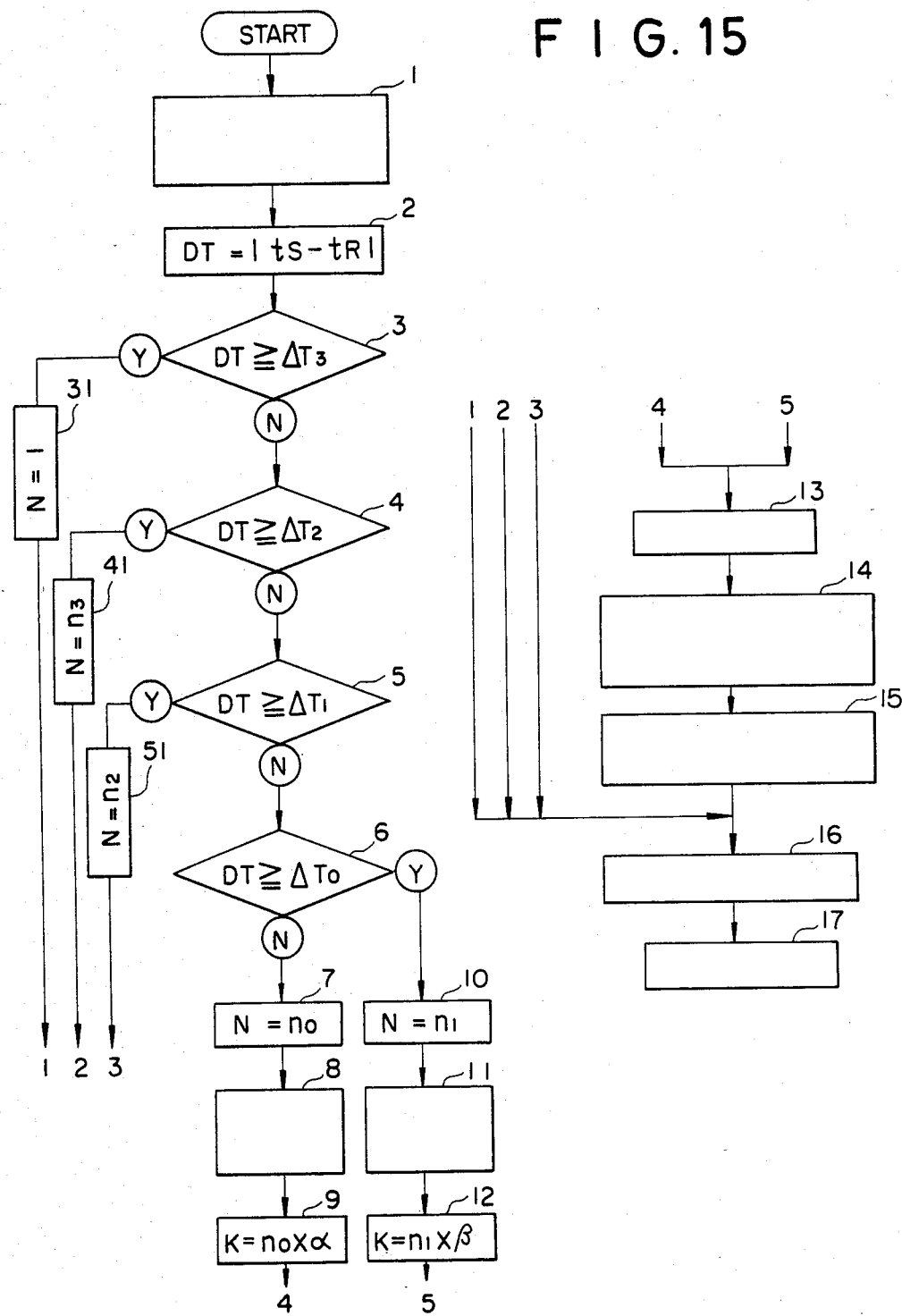
FIG. 15 is a view showing the program of the microcomputer of the seventh embodiment.
Figure 16:
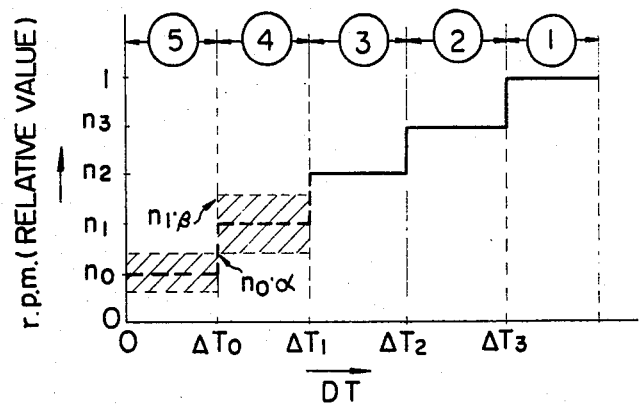
FIG. 16 is a chart explaining the operations of the seventh embodiment.

The automatic air-conditioner according to the seventh embodiment comprises: random generating means I7 including a memory ROM 83, a memory RAM 84, a clock oscillator 82, and a central processing unit 81; control means II7 including the compartment temperature detecting sensor TS, the temperature setter TR and an operation control unit 76; amplifying means III7 including a PWM circuit 85 and a switching element 86; and drive means IV7 including the d.c. motor 55 and the fan 56, and will now be described in detail with reference to FIGS. 14 to 16.

The random generating means I7 is constructed to include the clock oscillator 82 for feeding out clock pulses, the memory ROM 83 storing the program, as shown in FIG. 15, for producing fluctuation signal data, the memory RAM 84 for temporarily storing the computation midway result or the like when the computation is executed in accordance with the program, and the central processing unit 81 connected with the clock oscillator 82, the memory ROM 83, RAM 84 for feeding out the fluctuation signal data.

The control means II7 is constructed to include the compartment temperature detecting sensor TS, the temperature setter TR and the operation control unit 76, all of which are so constructed as follows.

The compartment temperature detecting sensor TS is connected with a resistor $R_{42}$ and the thermistor TR in series, to which a voltage $V_c$ is supplied upon their series connection, thereby to feed out an output voltage in accordance with the compartment temperature TS.

The temperature setter TR is connected with resistors $R_{43}$ and $R_{45}$ and a temperature setting volume $R_{44}$ in series, to which the voltage $V_c$ is fed upon their series connection, thereby to feed out an output voltage corresponding to the set temperature value $t_R$ which is determined by the set position of the volume $R_{44}$.

The operation control unit 76 is constructed to include: a multiplexer 77 connected with the output terminals of the compartment temperature detecting sensor TS and the temperature setter TR thereby to switch the two inputs for the outputs; an AD converter 78 connected with the multiplexer 77 for converting the output voltage of the multiplexer 77 into a numerical value; an input/output control unit 79 connected with both the AD converter 78 and the central processing unit 81 for controlling both the input of the data to the central processing unit 81 and the output of the data from the same unit; the central processing unit 81 connected with the input/output control unit 79, the clock oscillator 82, the memory ROM 83 and RAM 84 and adapted to be driven by the clock pulses which are generated by the clock oscillator 82, thereby to generate the revolution control signal data of the blower motor through computation of the compartment temperature read out and the set temperature value in accordance with the program, as shown in FIG. 15, which is stored in advance in the memory ROM 83; and a DA converter 80 connected with the input/output control unit 79 for converting that revolution control signal data of the blower motor, which are generated by the central processing unit 81, into a voltage. The memory RAM 84 is used to temporarily store the computation midway result or the like when the computation is executed in accordance with the program.

The motor control circuit constructing the amplifying means III7 comprises the RWM circuit 85 connected with the DA converter 80 for generating pulses having a time width proportional to the output voltage of the DA converter 80, and the switching element 86 connected with the PWM circuit 85 for interrupting the power supply from the power source to the d.c. motor 55 in accordance with the output pulses of the PWM circuit 85.

The drive means IV7 comprises, similarly to the fourth embodiment, the d.c. motor 55 and the fan 56 fixed to the rotating shaft of the motor 55.

The operations of the rotations of the fan by the system having the construction thus far described according to the seventh embodiment will be described below. For simplicity of explanation, it is assumed that the absolute value DT (DT= |tS−tR|) of the difference between a compartment temperature tS and a set temperature level tR is large and that the air-conditioner is started from the state shown to be in the range 1 in FIG. 16.

The operations of the system are controlled by the program which is stored in advance in the memory ROM 83. At the first step of the program, i.e., the step 1 of FIG. 15, the compartment temperature tS and the set level tR, which are the outputs of the compartment temperature detecting sensor TS and the temperature setter TR, are read through the multiplexer 77 and the AD converter 78. At the step 2, the absolute value DT (DT= |tS−tR|) of the difference between the compartment temperature tS and the set temperature level tR is calculated. At the step 3, the absolute value DT is compared with a predetermined value $\Delta T_3$. Since, in this case, the value DT is equal to or larger than the value $\Delta T_3$, the program proceeds to the step 31. At this step 31, a relative value N indicating the r.p.m. of the motor is set at 1, and the program proceeds to the step 16. That value N is fed out to the DA converter 80. This DA converter 80 used feeds out the maximum voltage for the input 1, and the PWM 85 feeds out the pulses having the maximum time width for the maximum input voltage so that the switching element 86 takes approximately steady "ON" state. More specifically, if the value N is set at 1 at the step 31, the motor 55 revolves at the maximum r.p.m. Then, the program proceeds to the step 17 and returns to the start. From this start, the operations similar to the aforementioned ones are repeated, and the motor 55 revolves at the maximum r.p.m. The value DT is reduced as the time elapses, and the r.p.m. comes to the range 2 of FIG. 16 before long so that the program proceeds from the step 3 to the step 4. At this step 4, the value DT and a predetermined value $\Delta T_2$ are compared. Since, in this case, the value DT is larger than $\Delta T_2$, the program advances to the step 41. At this step 41, the value N is set at such a predetermined value $n_3$ as is slightly smaller than the value 1, which indicates a slightly lower r.p.m. than the maximum value of the motor 55, as shown in FIG. 16. Subsequently, the motor 55 revolves at a slightly lower r.p.m. than the maximum value similarly to the foregoing description. Although the value DT is reduced as the time elapses, the motor 55 revolves at the same r.p.m. In this meanwhile, the value DT becomes smaller than $\Delta T_2$, and the r.p.m. comes to the range 3 in FIG. 16 so that the program proceeds to the step 5. Subsequently, the value N is set at a smaller value $n_2$ than the value $n_3$ absolutely similarly to the foregoing description so that the motor 55 revolves at the r.p.m. corresponding thereto. Although the value DT is reduced as the time elapses, the motor 55 revolves at the same r.p.m. until the value DT becomes smaller than $\Delta T_1$. When the value DT becomes smaller than $\Delta T_1$, the r.p.m. comes to the range 4 of FIG. 16 so that the program proceeds to the step 6. The program is so prepared that the motor 55 blows out the breathing wind at the step 6 but is different depending on the value DT. More specifically, the properties of the winds to be blown by the fan 56 are different for the ranges 4 and 5 shown in FIG. 16. Since the value DT is minute for the range 5 of FIG. 16, the wind having slow frequency breathes and a large fluctuation factor is blown, and the mean wind intensity is so weak as is determined by the r.p.m. of the motor 55, which is indicated by the predetermined value $n_0$. Since, on the contrary, the value DT is slightly larger in the range 4 of FIG. 16, the wind having relatively frequently varying breathes is blown, and the mean wind intensity is determined at an intermediate value between the intensities in the ranges 3 and 5 of FIG. 16 by the r.p.m. of the motor 55, which is indicated by the predetermined value $n_1$. The following description will be consecutively made in accordance with the program.

At the step 6, the value DT is compared with the predetermined value $\Delta T_0$. At first, the value DT is larger so that the program proceeds to the step 10.

At the step 10, the value N is set at the value $n_1$, which is smaller than the predetermined value $n_2$, and the program proceeds to the step 11. At this step 11, in order to obtain the desired frequency component corresponding to the frequent breathes, the frequency characteristics of the digital filter, which are to be used at the step 14, are determined in advance. In other words, the value of a constant for regulating the characteristics of the filter is determined. At the step 12, as shown in FIG. 16, the value K is determined in accordance with the ratio $\beta$ of the r.p.m. of the blower motor corresponding to the ratio between the mean intensity of the breathing wind from the blower and the width of the variation of the intensity of the wind due to the breathes, i.e., the fluctuation factor. The value K determined here will be used at the subsequent step 15 thereby to give a small fluctuation factor. At the step 13, a random number is generated as the quantity which varies at random in time and which causes the breathes. At the step 14, the digital filter having its characteristics determined in advance at the step 11 is used to extract the desired frequency component from the random number which is generated at the step 13. At the step 15, the range of the value, which can be taken by the desired random number prepared at the step 14, is restricted in accordance with the value K predetermined at the step 12, and the value thus obtained is added to the value $n_1$, which implies the r.p.m. of the motor 55 determined in advance at the step 10 and corresponding to the mean wind intensity, thereby to store the added value as N. At the step 16, the relative value N is fed out to the DA converter 80. As a result, the motor 55 revolves at the r.p.m. corresponding to the value which is prepared by adding the fluctuation component to the value $n_1$. Then, the program proceeds to the step 17 and returns to the start. Subsequently, the steps are repeated absolutely similarly so that the value DT becomes smaller as the time elapses. Since, in this meanwhile, the random number generated at the step 13 exhibits a random value each time, the r.p.m. of the motor 55 is fluctuated at random in time so that the wind having breathes can be established. When the value DT becomes smaller than $\Delta T_0$, the r.p.m. comes to the range 5 of FIG. 16, and the program proceeds from the step 6 to the step 7. The operations after the step 7 are different from the case of the range 4 of FIG. 16 only as follows. The value implying the r.p.m. of the motor 55 corresponding to the mean wind intensity is set at $n_0$ at the step 7; the characteristics of the filter are set at the desired ones for obtaining the frequency component corresponding to the slow breathes at the step 8; and the value K is determined at the step 9 in accordance with the ratio α of the r.p.m. of the motor 55 corresponding to the ratio between the mean wind intensity and the width of the variation of the wind intensity due to the breathes. The remainder is the same as that in the case of the range 4 of FIG. 16. The ratio α gives the larger fluctuation factor. As a result, in the case of the range 5 of FIG. 16, the motor 55 also establishes the breathing wind, but the mean wind is weak and has slow breathes having a large fluctuation factor in comparison with the case of the range 4 of FIG. 16.

As has been described hereinbefore, there can be realized that the air-conditioning system, in which the r.p.m. of the fan is automatically reduced as the difference between the set temperature level and the compartment temperature becomes smaller, and automatically blows the breathing wind when the aforementioned difference becomes equal to or smaller than a predetermined value, and in which the fluctuating properties of the fan are changed when the aforementioned difference is further reduced until it becomes equal to or smaller than a predermined value, thereby to blow the slowly breathing wind having the large fluctuation factor.

The system according to the seventh embodiment is advantageous over the conventional air-conditioning system blowing the steady wind in that the air-conditioning system, which can continue the senses to the coolness for a long time and which is excellent in comfortableness and good for health, can be realized by blowing the approximately natural wind having breathes in such a weak wind range as is frequently used for a relatively long time period. Since the mean flow rate can be reduced while maintaining the coolness, the present system can spare the energy consumption more than the conventional air-conditioning system.

Moreover since, the microcomputer is used in the seventh embodiment, the system can enjoy high reliability. On the other hand, since the random number is generated by the program, the present system can generate fluctuations having arbitrary properties and it can enjoy high flexibility.

Although, in the seventh embodiment, there is prepared at the step 13 the random number, from which the desired fluctuation is extracted at the step 14, the air-conditioning system performing the similar operations can be provided by adopting a system in which the natural wind is observed in advance so that its breathes are stored as numerical data in the memory such as the ROM and in which the stored data are consecutively read out to control the r.p.m. of the blower motor. As a result, the seventh embodiment can enjoy advantages that the program can be shortened and that the control system can be simplified.

A system according to an eighth embodiment is provided by applying the present invention to an a.c. driven fan such as a home fan. The system of the eighth embodiment is different from the aforementioned system of the fourth embodiment in amplifying means III8 and in driving means IV8 as a result that the motor for driving the fan of the driving means IV8 is changed into an a.c. motor and will be described with reference to FIGS. 17 and 18 while stressing the differences inbetween.

Figure 17:
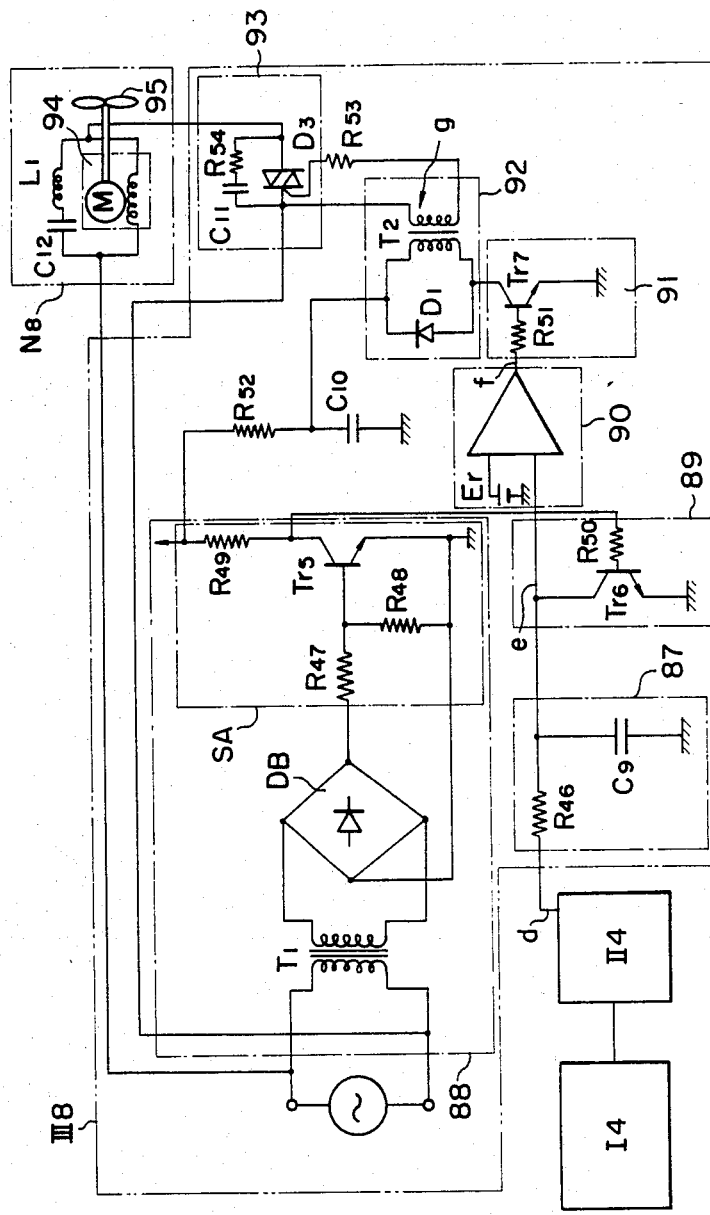
FIG. 17 is a circuit diagram showing an eighth embodiment of the present invention.

The amplifying means III8 comprises, as shown in FIG. 17, an integrator 87 connected with the output terminal of the control means II4, a trigger circuit 88 connected with an alternating current at 100 V, a switching circuit 89, a comparator 90, a transistor circuit 91, a pulse transformer 92, and a thyristor circuit 93.

The integrator 87 comprises a resistor $R_{46}$ connected with the amplifier 63 of the control means II4, and a condenser $C_9$ connected with the resistor $R_{46}$ and having its one terminal grounded to the earth, and to have their resistance and capacity so set as to feed out an integrated signal having a predetermined time constant.

The trigger circuit 88 comprises: a transformer $T_1$ having its primary side connected with the a.c. power source for feeding out the alternating current at 100 V (as indicated at a in FIG. 18): a rectifying circuit DB having four diodes forming a bridge and connected with the secondary side of the transformer $T_1$; and a saturation amplifier SA constructed of a transistor $Tr_5$ having its base connected with one output terminal of the rectifying circuit DB through a resistor $R_{47}$, its emitter connected with both the other output terminal of the rectifying circuit DB and a resistor $R_{48}$ which in turn is connected with the base thereof, and its collector connected through a resistor $R_{49}$ with the power source.

The switching circuit 89 comprises a switching transistor $Tr_6$ having its emitter grounded to the earth, its collector connected with the output terminal of the integrator 87, and its base connected through a base resistor $R_{50}$ with the trigger circuit 88.

The comparator 90 includes a differential amplifier, which has its inverting terminal connected with a d.c. power source Er having a predetermined voltage and its non-inverting input terminal connected with the collector of the switching transistor $Tr_6$ and compares the saw-tooth wave form signal, which is fed out of the switching transistor $Tr_6$, with a reference voltage thereby to feed out a square wave signal.

The transistor circuit 91 includes a transistor $Tr_7$ which has its base connected through a resistor $R_{51}$ with the output terminal of the comparator 90 and its emitter grounded to the earth.

The pulse transformer 92 has its primary side connected in parallel with a diode $D_1$, its one tap connected with the collector of the transistor $Tr_7$, and its other tap connected with the connecting point between a resistor $R_{52}$, which is connected with the power source, and a condenser $C_{10}$ which has its one terminal grounded to the earth.

The thyristor circuit 93 includes a two-way thyristor $D_3$, and an arc-suppressing condenser $C_{11}$ and a resistor $R_{54}$, which are connected in parallel with the thyristor $D_3$, and is constructed by connecting the control terminal of the thyristor $D_3$ through a resistor $R_{53}$ with one tap of the secondary side of the pulse transformer 92, and by connecting the connecting point between the condenser $C_{11}$ and the thyristor $D_3$ with one electrode of the a.c. power source and also with the other tap of the secondary side of the pulse transformer 92.

The driving means IV8 comprises: an induction motor 94, which is connected in parallel with such a condenser $C_{12}$ and a coil $L_1$ as are connected in series; and a fan 95 fixed to the rotating shaft of that motor. One tap of the motor 94 is connected with the other terminal of the a.c. power source, whereas the other tap is connected with the connecting point between the thyristor $D_3$ and the resistor $R_{54}$.

The operations of the present system having the construction thus far described according to the eighth embodiment will be described.

The signal (as indicated at d in FIG. 18), which is prepared by mixing the fluctuation signal fed out of the random generating means I4 and the d.c. signal at a suitable mixing ratio, is fed out of the amplifier 63 of the control means II4 and is integrated by the integrator 87. In other words, a signal having a steep gradient is fed out when the signal voltage is high, and a signal having a gentle gradient is fed out when the signal voltage is low.

Figure 18:
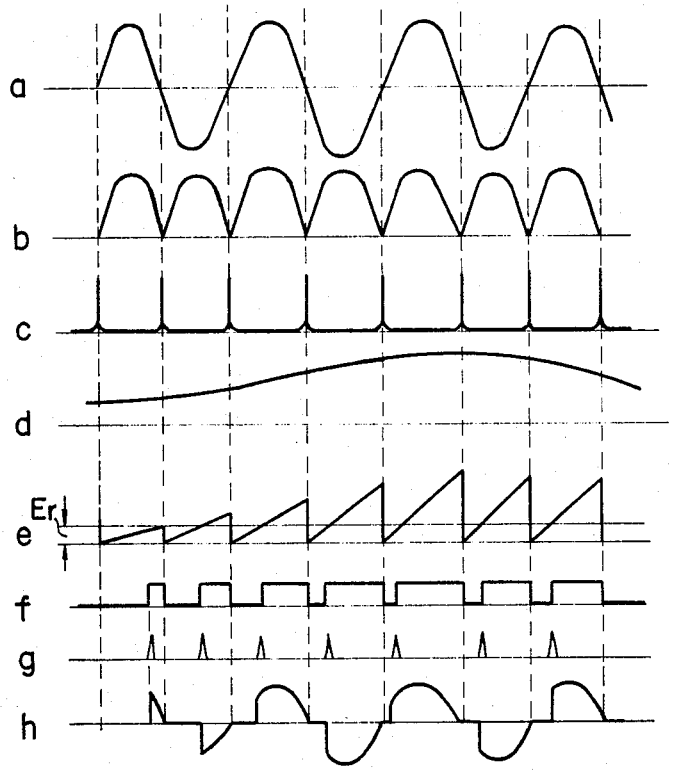
FIG. 18 is a chart showing the signal waveforms of the respective portions of the eighth embodiment.

In the trigger circuit 88, the full wave of the a.c. signal, which is prepared by converting the main voltage of the a.c. power source (as indicated at a in FIG. 18) into a predetermined voltage by means of the transformer $T_1$, is rectified by means of the rectifying circuit, to generate a voltage signal having atwice period, as indicated at b in FIG. 18. This signal is fed to the base of the transistor $Tr_5$ to generate the pulse signal through the inversion type saturation amplification, as indicated at c in FIG. 18. This signal is then fed to the base of the transistor $Tr_6$ of the switching circuit 89.

This switching circuit 89 resets the integrator 87 at each period twice the power source frequency and each time the a.c. voltage crosses a zero point so that the integrator 87 feeds out the saw-tooth wave form signal, as indicated at e in FIG. 18.

The comparator 90 compares that saw-tooth wave form signal and the reference signal (as indicated at Er in FIG. 18) so that it resultantly feeds out a square wave signal, as indicated at f in FIG. 18. As is apparent from FIG. 18, that square wave signal rises at a retarded phase with respect to the half cycle of the power source voltage (as indicated at a), when the fluctuating voltage (as indicated at d) is low, and at an advanced phase with respect to the half cycle of the power source voltage when the fluctuating voltage is high.

The square wave signal triggers the two-way thyristor $D_3$ through the pulse transformer 92 and the resistor $R_{53}$. The trigger signal is indicated at g in FIG. 18. The voltage (as indicated at h) which returns from the phase (e.g., the position or time), at which the trigger signal rises, to the normal power source voltage is fed to the induction motor 94 of the driving means IV8 thereby to effect the voltage control in accordance with the fluctuation signal.

The system according to the eighth embodiment can enjoy an advantage that such a wind as has breathes, as resembles the natural wind and as is comfortable and good for health can be blown by controlling the driving phase of the induction motor 94 thereby to control the power energy to be supplied.

The system of the eighth embodiment can enjoy another advantage that it makes unnecessary to take the trouble of swinging the fan so as to avoid the uncomfortableness of the steady wind.

A system according to a ninth embodiment is provided by applying the present invention to an air-conditioning machine and will be described with reference to FIGS. 19 and 20 while stressing the differences from the aforementioned embodiment systems.

The system of the ninth embodiment is characterized in that a microcomputer is used to read out the natural wind data, which are stored in advance in the memory ROM, and to prepare a fluctuation signal for controlling the flow rate of the wind so that the flow rate is fluctuated in the vicinity of a set temperature thereby to effect the fluctuation control both in the cooling and warming operations.

Figure 19:
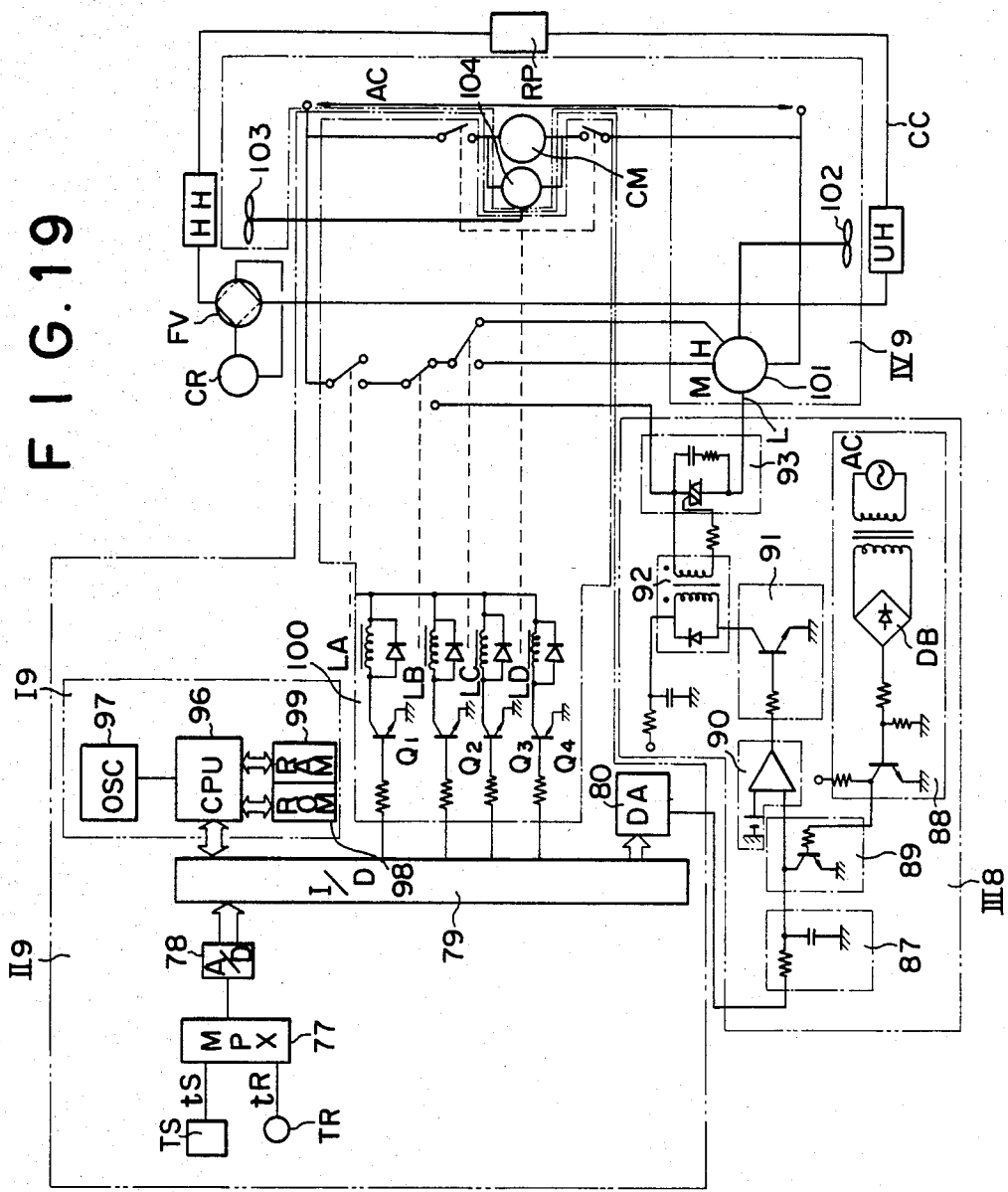
FIG. 19 is a circuit diagram showing a ninth embodiment of the present invention.
Figure 20:
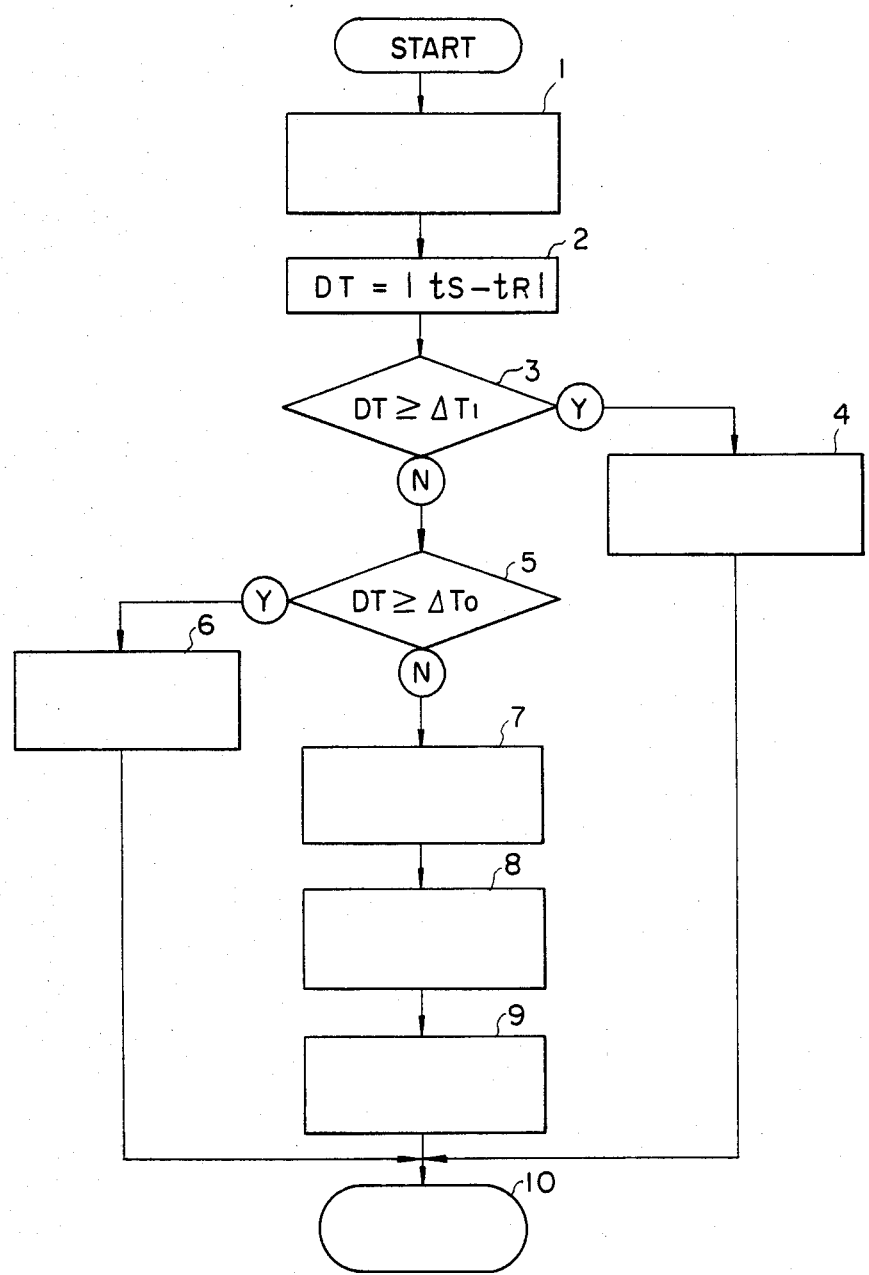
FIG. 20 is a chart showing the program of the microcomputer of the ninth embodiment.

The air-conditioning machine, to which the present invention is to be applied comprises as shown in FIG. 19, the coolant circuit CC having a compressor CR, a four-way valve FV, a user side heat exchanger UH, a pressure reducer RP and a heat source side heat exchanger HH connected in series; a user side fan 102 for promoting the heat exchange in the air between the heat exchanger UH and a room to be air-conditioned (not shown); and a heat source side fan 103 for promoting the heat exchange between the heat exchanger HH and the ambient air. It is possible to perform the cooling and warming operations by switching the four-way valve FV.

In the air conditioning machine thus far described, the compressor CR is turned on and off in accordance with the set temperature, which is usually set by a user, and the temperature of the room to be air-conditioned, and the user side fan 102 is controlled so that the flow rate of the wind to the room to be air-conditioned is controlled. Recently, the control system making the use of the so-called "microcomputer" has been developed and used so that the aforementioned control of the user side fan 102 is finely performed, whereby the most proper flow rate according to the refrigerating cycle can be attained. However, the aforementioned flow rate control has raised a problem that it is the most proper for the refrigerating cycle but not always for the residence in the air-cooled room.

The system according to the ninth embodiment solves that problem and is constructed to comprise: random generating means I9 including a clock oscillator 97, a central processing unit 96, a memory ROM 98 in which the fluctuating data of the natural wind is stored and a memory RAM; control means II9 including the room temperature detecting sensor TS, the temperature setter TR, the multiplexer 77, the AD converter 78, the input/out control unit 79, the clock oscillator 97, the central processing unit 96, the memory ROM 98, the memory RAM 99, the DA converter 80 and a relay driving circuit 100; the amplifying means III8 similar to that of the eighth embodiment; and driving means IV9 including induction motors 101 and 104, and the user and heat source side fans 102 and 103 driven by the motors, respectively.

The room temperature detecting sensor TS of the air-conditioned room and the temperature setter TR are operative to generate analog voltages corresponding to the room temperature and the set temperature, respectively, and have their outputs connected through the multiplexer 77 with the AD converter 78 so that the outputs are converted into digital quantities by the action of the AD converter 78. The temperature setter TR is enabled to set the desired temperature tR by the lever manipulating operation or the like. The output of the AD converter 78 is connected with the input/output control unit 79 for controlling the input to and the output from the central processing unit 96. This central processing unit 96 is connected with the input/output control unit 79, the clock oscillator 97, the memory RAM 99 and the memory ROM 98 so that it is driven by the clock pulses which are generated by the clock oscillator 97. It performs the calculation based on the room temperature of the air-conditioned room read out and the set level of the temperature in accordance with the program, as shown in FIG. 20, which is stored in advance in the memory ROM 98, thereby to generate the signal data for controlling the revolutions of the user side fan 102. With the input/output control unit 79, on the other hand, there are connected both the relay driving circuit 100 for driving relays LA, LB, LC and LD to switch the power source circuits of the motor 101 in accordance with the revolution control signal data of the motor 101 generated by the central processing unit 96, and the DA converter 80 for converting the fluctuation control signal data of the motor 101, which are ganerated by the central processing unit 96, into an analog voltage. The output of the DA converter 80 is connected with the amplifying means III8 so that the r.p.m. of the motor 101 is fluctuated in accordance with the output signal of the DA converter 80. The relay driving circuit 100 has its transistor switches $Q_1$, $Q_2$, $Q_3$ and $Q_4$ rendered conductive in accordance with the output signal of the input/output control unit 79 and has its relays LA, LB, LC and LD driven to switch the power source circuits of the motor 101. The relay LD is provided to turn on and off the power source of not the motor 101 but a compressor motor CM and the heat source side motor 103.

The memory RAM 99 is used to temporarily store the intermediate result of the calculation or the like when the calculation is performed in accordance with the program. On the other hand, the memory ROM 98 stores in advance the fluctuation data.

The revolution controlling operation of the user side fan 102 by the present system having the construction thus far described according to the ninth embodiment will be described below.

The operations of the system are controlled by the program which is stored in advance in the memory ROM 98. At the first step of the program, i.e., the step 1 of FIG. 20, the room temperature tS and the set level tR, which are the outputs of the room temperature detecting sensor TS and the temperature setter TR, are read through the multiplexer 77 and the AD converter 78. At the step 2, the absolute value DT of the difference between the room temperature tS and the set temperature level tR (namely, $DT = |tS - tR|$) is calculated. Merely for simplicity of explanation, it is assumed here that the difference DT is larger than the value $\Delta T_1$ which is predetermined. At the step 3, the difference DT and the value $\Delta T_1$ are compared, and the program proceeds to the step 4 because $DT > \Delta T_1$. At the step 4, a predetermined signal is fed out to the relay driving circuit 100 so as to raise the r.p.m. of the motor 101 to a high speed so that the relays LA, LB, LC and LD, are controlled to invite the high speed rotation H. As a result, the user side fan 102 is revolved at the high speed. Then, the program proceeds to the step 10 and returns to the start. The aforementioned operations are repeated until $DT < \Delta T_1$, and the fan 102 is revolved at the high speed. As the time elapses, the difference DT is reduced until $DT < \Delta T_1$, and the program proceeds to the step 5. At this step 5, the difference DT and the value $\Delta T_O$ are compared, and the program proceeds to the step 6 because $DT > \Delta T_O$. At the step 6, the r.p.m. of the motor 101 is set at a medium speed M similarly to the case of the step 4. Then, the program returns through the step 10 to the start. The aforementioned operations are repeated until $DT < \Delta T_O$, and the fan 102 is revolved at the medium speed. As the time elapses, the difference DT is reduced until $DT < \Delta T_O$, and the program proceeds to the step 7. At this step 7, the r.p.m. of the blower motor is set at a low speed L similarly to the cases of the steps 4 and 6. Then, at the step 8, the fluctuation data stored in advance in the ROM 98 are read out, and at the step 9 they are fed out to the DA converter 80. In accordance with the analog voltage which is the output of the DA converter 80, the amplifying means III8 controls the r.p.m. of the user side blower fan 102 so that the flow rate is fluctuated in time. The program returns through the step 10 to the start, and the aforementioned processes are repeated.

As has been described hereinbefore, there can be realized an air-conditioning system, in which the revolutions of the fan are automatically fluctuated in the range having a small difference between the set temperature level and the room temperature and having a low r.p.m. of the fan thereby to blow a breathing wind.

The system according to the ninth embodiment has advantages that the breathing wind can be generated in a low flow rate range during the cooling and warming operations and that is is excellent in confortableness and good for health, as is similar to the case of the system of the eighth embodiment.

A system according to a tenth embodiment is provided by applying the present invention to a shoulder patting machine and is characterized in that the shoulder patting intensity and rhythm are fluctuated at random. The shoulder patting machine according to the prior art can adjust the patting intensity and rhythm in accordance with the user's taste but pats the shoulder with the same intensity and rhythm adjusted. As a result, there arises a problem that, after shoulder patting operation for a while, the user is accustomed to the monotonous patting stimulus so that the patting effect is reduced and so that he is tired of using that machine.

Figure 21:
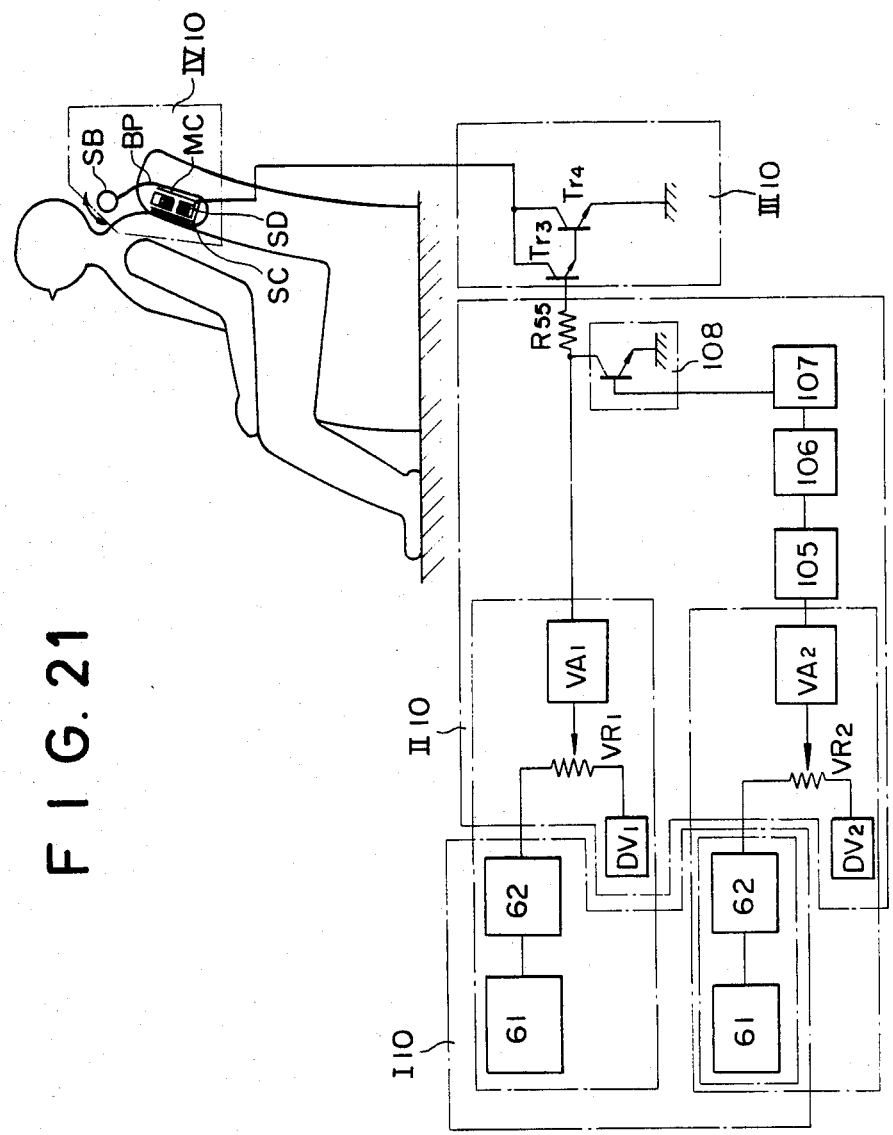
FIG. 21 is a block circuit diagram showing a tenth embodiment of the present invention.

The shoulder patting machine according to the tenth embodiment is constructed, as shown in FIG. 21, to comprise: random generating means I10 including two pairs of the white noise generators 61 and the filter circuits 62 similar to those of the fourth embodiment; control means II10 including two d.c. voltage sources $DV_1$ and $DV_2$, two variable resistors $VR_1$ and $VR_2$, two amplification variable amplifiers $VA_1$ and $VA_2$, a VF converter 105, a monostable multivibrator 106, an inverter 107, and a switching transistor 108; amplifying means III10 including the two transistors $TR_1$ and $Tr_2$ connected in the Darlington form; and driving means IV10 in which a movable core MC is arranged to face a stationary core SC embedded in the upper portion of the back of a chair and in which a patting ball is fixed through a spring member to the movable core MC.

The control means II10 comprises: the variable resistor $VR_1$ connected with the filter 62, which is connected with the white noise generator 61 of the random generating means I10 for generating the fluctuating voltage having a desired frequency component, and also with the d.c. voltage source $DV_1$ thereby to prepare the mixed voltage of the fluctuating voltage and the d.c. voltage and to change the mixing ratio; the amplification variable amplifier $VA_1$ connected with the variable resistor $VR_1$ for amplifying the mixed voltage of the fluctuating voltage and the d.c. voltage; the variable resistor $VR_2$ and the amplification variable amplifier $VA_2$ having absolutely the same constructions; the VF converter 105 connected with the amplification variable amplifier $VA_2$ for converting the input voltage into the frequency; the monostable multivibrator 106 connected with the VF converter 105 for generating square waves having a predetermined time width in accordance with the output pulses of the VF converter 105; the inverter 107 connected with the monostable multivibrator 106 for inverting the output square waves (as indicated at a in FIG. 22) of the multivibrator 106; and the switching transistor 108 having its collector connected with the output terminal of the amplification variable amplifier $VA_1$ and its base connected with the inverter 107 for performing switching operations in accordance with the output of the inverter 107.

The amplifying means III10 comprises the two transistors $Tr_3$ and $Tr_4$, which are connected in the Darlington form similarly to the third embodiment, and is connected with the output terminal of the control means III10 through a base resistor $R_{55}$.

The driving means IV10 has the following construction. The driving unit is embedded in the upper portion of the chair back such that the patting ball SB of the patting ball portion is positioned at the height near the shoulder when the user sits on the chair. The patting ball portion is constructed, as shown in FIG. 21, such that it is made of a spring plate BP which is made of a spring material and in which the patting ball SB made of a slightly hard material such as rubber is attached to the leading end portion and such that its other end portion is bent into a shape of letter "U" and is fixed to the stationary core SC which has a solenoid SD arranged in the inner portion constructing the driving unit. This driving unit is so constructed that the movable core MC is attached to the spring plate BP at the portion which faces the stationary core SC and that the movable core MC is attracted by driving the solenoid SD with the electric output from the aforementioned amplifying means III10 whereby the patting ball SB pats the shoulder.

The operations of the shoulder patting machine according to the tenth embodiment will be described.

Figure 22:
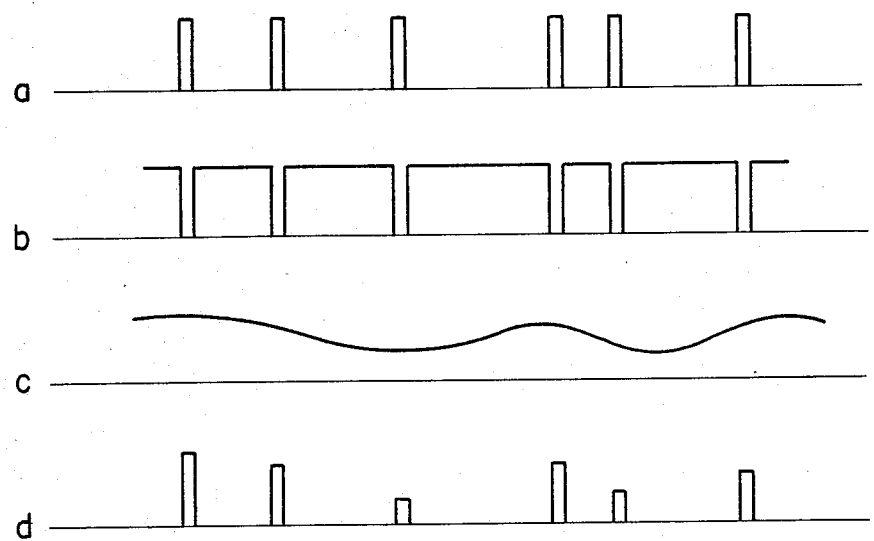
FIG. 22 is a chart showing the signal waveforms of the respective portions of the tenth embodiment.

The signal (as indicated at c in FIG. 22), which has been prepared by amplifying the mixture signal of the fluctuation signal fed out of the random generating means I10 and the d.c. component by means of the amplifier $VA_2$, is converted by means of the VF converter 105 into a pulse train having a fluctuating pulse interval and further by means of the monostable multivibrator 106 into square waves having a fluctuating interval, as indicated at a in FIG. 22. These square waves are converted by the action of the inverter 107 into the inverted signal (as indicated at b in FIG. 22) thereby to turn on and off the switching transistor 108. In other words, the switching transistor 108 is "OFF", when the output of the monostable multivibrator 106 is at a high level, and "ON" when that output is at a low level. When the switching transistor 108 is "ON", the output of the amplification variable amplifier $VA_1$ is grounded to the earth, and the amplifying means III10 is not driven so that no current flows through the solenoid SD of the driving means IV10. When the switching transistor 108 is "OFF", on the contrary, the output of the amplification variable amplifier $VA_1$ drives the amplifying means III10 through the resistor $R_{55}$ so that the amplifying means III10 controls in accordance with the output of the amplification variable amplifier $VA_1$ the current (as indicated at d in FIG. 22) which is to flow through the solenoid SD of the driving means IV10. In other words, when the output of the monostable multivibrator 106 is at the high level, the current to flow through the solenoid SD is controlled in accordance with the level of the output of the amplification variable amplifier $VA_1$. As a result, the patting ball SB is driven such that its patting force is fluctuated at each pat in accordance with the output of the aforementioned amplification variable amplifier $VA_1$. When the output of the monostable multivibrator 106 is at the low level, the solenoid SD is not driven. According to the system of the tenth embodiment, therefore, the shoulder patting rhythm and the patting intensity are fluctuated at random.

If the variable resistors $VR_1$ and $VR_2$ are adjusted in the present embodiment system, the amplitude of the fluctuations can be arbitrarily controlled, as desired. In an extreme case, only the patting force can be fluctuated while holding the rhythm constant, and vice versa. Moreover, if the amplification variable amplifiers $VA_1$ and $VA_2$ are adjusted, the level of the patting force and the speed of the patting rhythm can also be arbitrarily controlled.

As has been apparent from the foregoing description, the shoulder patting machine according to the present embodiment can enjoy an advantage that the shoulder patting intensity and rhythm are fluctuated at random and can be arbitrarily adjusted in accordance with the user's taste independently of each other. As a result, there are such advantages that: the fresh feeling can be always maintained; the shoulder patting effect can be made prominent; it is good for the health; and the user is not tired of his use.

A system according to an eleventh embodiment is provided by applying the present invention to a flashing light emitting system and is characterized in that the interval between flashes is constant for a predetermined time period but the interval is fluctuated at random for each group of flashes and, as a result, the time width for which the flashing interval is constant is fluctuated at random.

Figure 23:
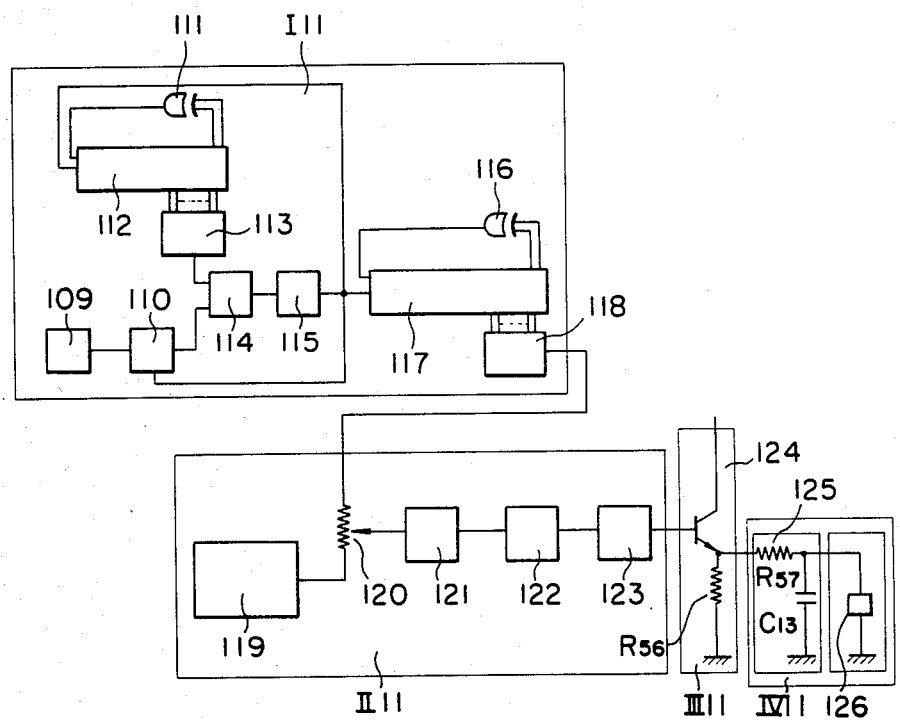
FIG. 23 is a block circuit diagram showing an eleventh embodiment of the present invention.

The random generating means I11 of the flashing light emitting system according to the eleventh embodiment comprises, as shown in FIG. 23, a d.c. voltage source 109, an integrator 110 connected with the voltage source 109, a shift register 112 having a feedback circuit including an exclusive OR gate 111, a DA converter 113 connected with a suitable stage of the shift register 112 for effecting the DA conversion of that output, a comparator 114 connected with the integrator 110 and the DA converter 113 for comparing the outputs of the two, a pulse shaping circuit 115 connected with the comparator 114 for generating pulses when the output level of the comparator 114 is varied, a shift register 117 connected with the pulse shaping circuit 115 so that it is driven by the output of the same circuit and having a feedback circuit including an exclusive OR gate 116, and a DA converter 118 for effecting the DA conversion of the output of a suitable stage of the shift register 117.

The output of the pulse shaping circuit 115 is connected with the shift register 112 so that the output pulses of the pulse shaping circuit 115 drive the shift register 112. On the other hand, the output of the pulse shaping circuit 115 is connected with the integrator 110, too, so that the integrator 110 clears its preceding integrated value in response to the output pulses of the pulse shaping circuit 115.

Control means III1 comprises a d.c. voltage source 119, a variable resistor 120 connected with the random generating means I11 and the d.c. voltage source 119 for mixing the outputs of the two and for changing the mixing ratio, an amplification variable amplifier 121 connected with the variable resistor 120 for amplifying the output of the same, a VF converter 122 connected with the amplification variable amplifier 121, and a monostable multivibrator 123 connected with the output of the VF converter 122.

Amplifying means III11 comprises an emitter-follower transistor 124 having its base connected with the output terminal of the monostable multivibrator 123 of the control means II11, its collector connected with the d.c. power source, and its emitter grounded to the earth through an emitter resistor $R_{56}$ and is made operative to effect the current amplification.

Driving means IV11 comprises: an RC circuit 125 including a resistor $R_{57}$ connected with the emitter of the transistor 124 of the amplifying means III11 and a condenser $C_{13}$ having its one terminal connected with that resistor $R_{57}$ and its other terminal grounded to the earth thereby to smoothen the square signal which is fed out of the transistor 124; and a light emitting element 126 connected between the RC circuit 125 and the earth.

The operations of the eleventh embodiment having the construction thus far described will be explained.

Figure 24:
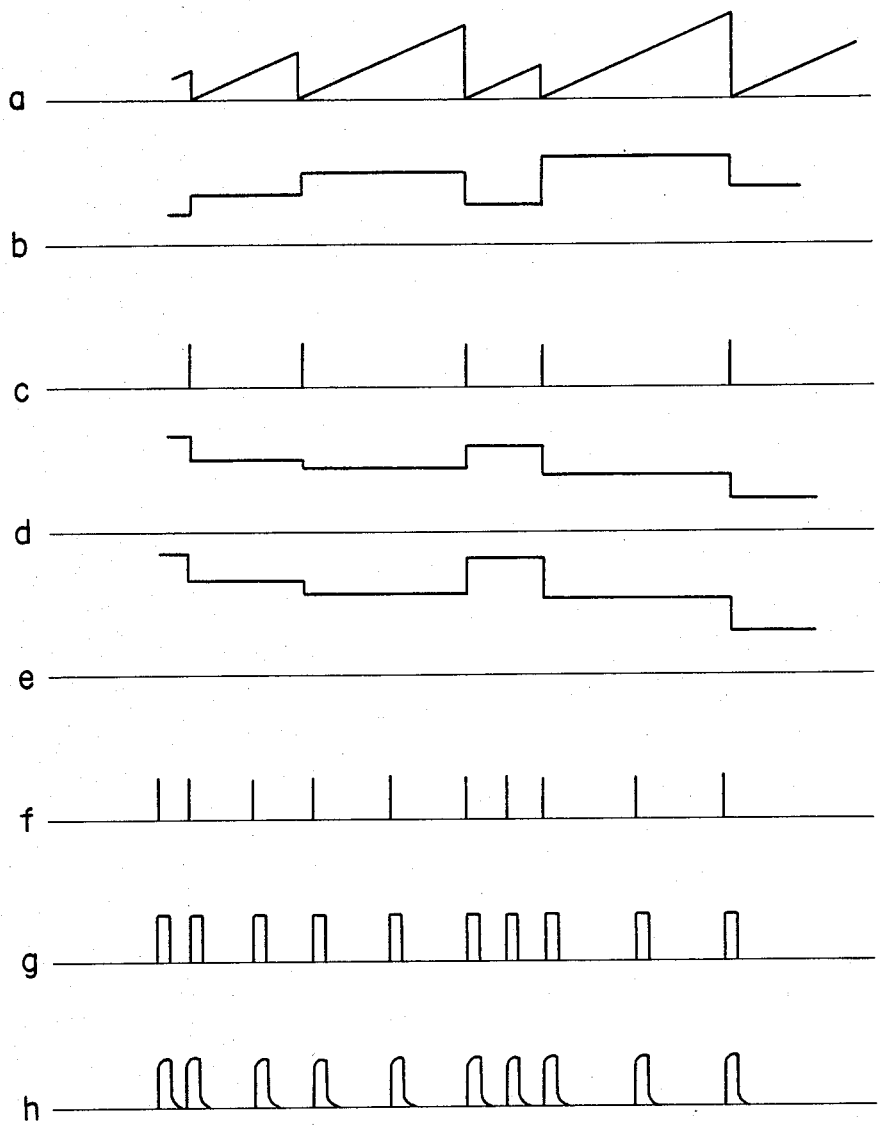
FIG. 24 is a chart showing the signal waveforms of the respective portions of the eleventh embodiment.

When the output voltage of the d.c. voltage source 109 is integrated by the integrator 110 so that its output signal (as indicated at a in FIG. 24) becomes identical to the output signal (as indicated at b in FIG. 24) of the DA converter 113, the output of the comparator 114 is inverted so that the pulse shaping circuit 115 feeds out pulse signals (as indicated at c in FIG. 24). By the output pulses of the pulse shaping circuit 115, the shift register 112 is driven to change the content of the register so that the output of the DA converter 113 is accordingly changed. By the output pulses of the pulse shaping circuit 115, on the other hand, the output value of the integrator 110 is cleared. After the clearance, the integrator 110 starts the integration of the output voltage of the d.c. voltage source 109 so that the aforementioned operations are repeated. The shift register 112 having the feedback circuit including the exclusive OR gate 111 has its content fluctuated at random in response to each drive pulse so that the output voltage of the DA converter 113 is fluctuated at random in response to each drive pulse, as indicated at b in FIG. 24. As a result, the comparator 114 compares the output of the integrator 110, which increases in proportion to the time, and the random voltage fed out of the DA converter 113 so that the interval of the output pulses of the pulse shaping circuit 115 is fluctuated at random, as indicated at c in FIG. 24.

Since the shift register 117 is driven by the pulse train, which is fed out of the pulse shaping circuit 115 and which has its interval fluctuated at random, the output of the DA converter 118 becomes the square waves, in which their voltage level and their level duration time period are fluctuated at random independently of each other, as indicated at d in FIG. 24.

The mixture of the square waves, which are fed out of the random generating means I11 and which fluctuate at random, and the predetermined voltage, which is fed out of the d.c. power source 119, at such a suitable mixing ratio as is determined by the set position of the variable resistor 120 is fed as the output (as indicated at e in FIG. 24) of the amplification variable amplifier 121. As a result, the VF converter 122 generates the pulse train (as indicated at f in FIG. 24), in which the pulse interval is constant for a certain time period but the interval is fluctuated at random for each group of pulses and therefore the time width for the constant interval is fluctuated at random. The pulse train thus prepared drives the monostable multivibrator 123 so that this monostable multivibrator 123 feeds out the signal which is indicated at g in FIG. 24.

Since the transistor 124 is turned "ON" if it has its base fed with the square wave signal which is fed out of the monostable multivibrator 123 of the control means II11, the amplifying means III11 performs the current amplification and feeds out the square wave signal which is similar to the output signal (as indicated at g in FIG. 24) of the monostable multivibrator 123.

The RC circuit 125 of the driving means IV11 smoothens the square wave signal, which is fed out of the amplifying means III11, and shapes the same into the signal, which has its rise and break gently varied not stepwise but exponentially as indicated at h in FIG. 24, so that it feeds out the shaped signal to the light emitting element 126. As a result, the light emitting time period of the light emitting element 126 becomes such a constant one as is determined by the monostable multivibrator 123. The rise and break of the light flashing operations of the light emitting element become so exponential that the light intensity is gradually increased or decreased. On the other hand, the flashing interval of the light emitting element is constant for a certain time period, but it is possible to effect the flashing operation similar to the so-called "firefly glimmer", in which the flashing interval is fluctuated at random for each group of flashes and therefore the time width for the constant flashing interval is fluctuated at random.

The flashing light emitting system according to the eleventh embodiment makes possible the randomly flashing light emissions similar to the glow of the firefly thereby to attract the attentions of human beings and to enjoy ample amusement so that it can be used not only as an advertising light and for a show window but also as an illumination for the place of amusement.

In the eleventh embodiment thus far described, the system is operated in such a relatively slow frequency range as allows the light emitting interval of the light emitting element 126 to be perceived as a flash by human beings. However, the human beings have a nature to perceive the light having a short flashing interval not as a flashing light but as a continuous light. Therefore, if a converter for generating higher-frequency pulses for the same input voltage than those in the case of the aforementioned embodiment is used as the VF converter 122, and if the monostable multivibrator 123 is of such a high speed type as can follow the input pulses, the light has its emitting interval so shortened that it can be perceived as a continuous one by human beings. If, in this case, an electric lamp is used as the light emitting element 126, the density of the output pulses of the monostable multivibrator 123 corresponds to the brightness, as will be easily understood, thereby to make it possible to provide a light emitting system which is so similar to the fire of a candle or torch as has its brightness fluctuated. If, in this case, the integration time constant of the integrator 110 is suitably adjusted, the operating speed of the random generating means I11 is varied so that the fluctuation rate can be made nearer to that of the candle or torch.

The candle-like illumination according to the present modification is liable to attract the attentions of human beings so that it is remarkably effective if it is applied to the show window or the like.

A system according to a twelfth embodiment is provided by applying the present invention to an air-cushioned chair and is characterized in that the air pressure at the seat portion of the chair is fluctuated at random with the 1/f characteristics and in that the fluctuation factor frequency range of the fluctuations in the air pressure and the air pressure itself can be varied in accordance with the taste of the user.

Figure 25:
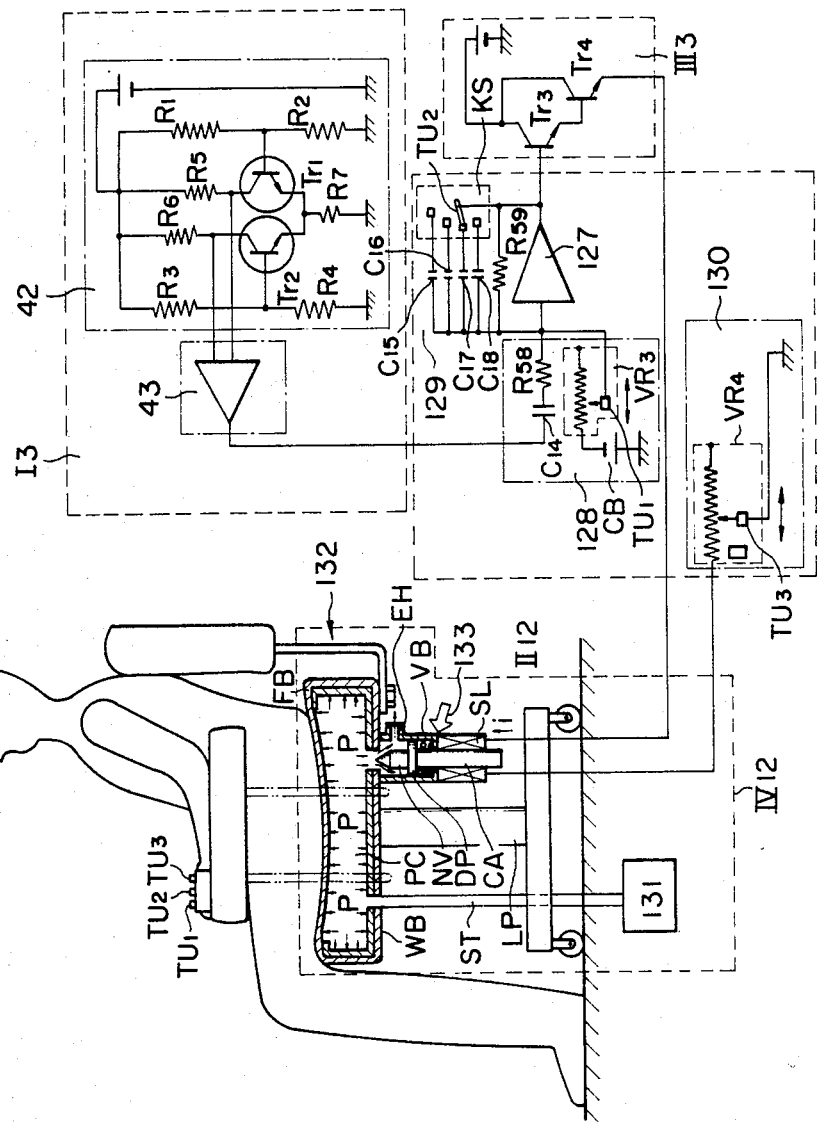
FIG. 25 is a circuit diagram showing a twelfth embodiment of the present invention.

The air-cushioned chair according to the twelfth embodiment is constructed, as shown in FIG. 25, to comprise: the random generating means I3 having the construction similar to that of the third embodiment; control means II12 which has the basic construction similar to that of the third embodiment and which is enabled to vary the fluctuation factor and frequency range of the fluctuation in the air pressure and the air pressure itself in accordance with the taste of the user; the amplification means III3 similar to that of the third embodiment; and driving means IV12 for fluctuating the air pressure at the seat portion of the chair at random with the 1/f characteristics. The identical portions are indicated at identical reference numbers, and their repeated explanations are omitted.

The control means II12 comprises an adder 127 having the operational amplifier similarly to the third embodiment, a fluctuation factor adjusting circuit 128, a fluctuation frequency change-over circuit 129, and an air pressure adjusting circuit 130.

The fluctuation factor adjusting circuit 128 comprises: a condenser $C_{14}$ connected with the output terminal of the random generating means I3: a resistor $R_{58}$ having a predetermined resistance and connected in series with the condenser $C_{14}$ and further with the input terminal of the adder 127; a d.c. power source CB having its plus electrode grounded to the earth for feeding out a predetermined voltage; and a variable resistor $VR_3$ having its one terminal connected with the minus elctrode of the d.c. power source CB and its control terminal $TU_1$ connected with the input terminal of the adder 127. As a result, by changing the position of the control terminal $TU_1$ of the variable resistor $VR_3$, as desired, the mixing ratio of the fluctuation signal and the d.c. voltage is varied so that the desired fluctuation factor of the fluctuation signal can be attained.

The fluctuation frequency change-over circuit 129 comprises: a resistor $R_{59}$, which is connected between the input and output terminals of the adder 127: condensers $C_{15}$, $C_{16}$, $C_{17}$ and $C_{18}$, each of which has its one terminal connected with the input terminal of the adder 127 and which have different capacities; and a change-over switch KS for selectively connecting those condensers $C_{15}$, $C_{16}$, $C_{17}$ and $C_{18}$ and the output terminal of the adder 127 through its change-over tap $TU_2$, and changes the interruption frequency of the hig-frequency component of the fluctuation signal so that it can change the frequency range in accordance with the taste of the user.

The air pressure adjusting circuit 130 includes a variable resistor $VR_4$ having its one terminal connected with the solenoid of the proportional electromagnetic valve of the driving means IV12, as will be described hereinafter, and its control terminal $TU_3$ grounded to the earth. By changing the position of the control terminal $TU_3$ of the variable resistor $VR_4$, as desired, the mean air pressure at the seat portion of the chair can be varied without any change in the fluctuation factor. The force F of a spring is so preset that the pressure in a pressure chamber PC may take an allowable value when the current is zero.

The driving means IV12 comprises: an air pump 131 for supplying a predetermined quantity of air per unit time to the pressure chamber PC in the chair seat through a supply tube ST; a seat 132 constructed of a frame WB fixed to a leg LP and having a bottom wall and a side wall, and a bag FB hermetically enclosing that frame WB and having suitable elasticity and strength; and a proportional electromagnetic valve 133 including a needle valve NV adapted to be freely inserted into a hole which is formed in the bottom wall of the seat 132, a flange DP formed integral with that needle valve, a valve body VB, in which both the spring SS having its one end fixed to that flange DP and the needle valve NV are mounted and which is formed with an exhaust hole EH for discharging the air in the pressure chamber PC therethrough, a core CA made integral with that needle valve, and a solenoid SL enclosing that core and made operative to move up and down the core CA by a magentic force such that the pressure P to be exerted upon the needle valve NV and [the force F of the spring—the supplied current i] may have a proportional relationship. The solenoid of the proportional electromagnetic valve 133 is connected with the output terminal of the amplifying means III3 so that, by controlling the discharge of the air out of the pressure chamber PC by the upward and downward movements of the needle valve NV with respect to the predetermined supply of the air to the pressure chamber PC by the air pump 131, it fluctuates the pressure in the pressure chamber PC of the seat 132 at random with the 1/f characteristics in a manner to correspond to the fluctuation current supplied.

If the fluctuation signal having the 1/f characteristics which is fed out of the random generating means I3, is set in advance through the control means II12, as desired, by means of the adjusting knobs $TU_1$, $TU_2$ and $TU_3$ which are mounted on the arm rest portion, the air-cushioned chair having the construction thus far described according to the twelfth embodiment controls the fluctuation signal according to that adjustment, performs the current amplification by means of the amplifying means III3 at the downstream stage, feeds out the current signal fluctuating with the 1/f characteristics at the solenoid SL of the driving means IV12, and controls the discharge of the air with respect to the supply by meansof the proportional electromagnetic valve 133 of the driving means IV12 thereby to fluctuate the pressure in the pressure chamber PC at random with the 1/f characteristics. Since the shape of the bag FB is changed in accordance with the supply and discharge of the air in the pressure chamber so that the contacting areas of the hips and the femoral region with the seat 132 are changed, the pressure, which is inversely proportional to the change in the contacting area of the bag FB supporting the body-weight, becomes necessary.

Since, in case the user seats himself upon the seat for work or operation, the contacting areas and pressures of the hips and the femoral region with the seat 132 are fluctuated at random with the 1/f characteristics, the air-cushioned chair according to the twelfth embodiment gives suitable stimulus at all times, as is different from the usual chair having the constant contacting area and pressure, so that it can enjoy advantages that it promotes circulation of the blood, reduces the sense of fatigue, enhances the working or operating efficiency and prevents the diseases caused by the insufficiency in the blood circulation.

Moreover, since the most proper condition liked by the user can be established by adjusting the adjusting knobs $TU_1$, $TU_2$ and $TU_3$ of the control means II12, the air-cushioned chair according to the twelfth embodiment can enjoy an advantage that it can be used in a comfortable manner.

In the twelfth embodiment, although the discharge of the air to the supply (in a constant quantity) of the air is controlled to realize the desired pressure fluctuation, the supply of the air with respect to the discharge (in a constant quantity) of the air may be controlled, on the contrary, to realize the desired pressure fluctuations.

In place of the controls of the supply and discharge of the air, the pressure chamber PC of the seat 132 may be sealed up and filled up with a safe gas or liquid, and this gas or liquid may be heated by means of a heater in accordance with the slowly fluctuating random signal so that it may be expanded, whereby the pressure can also be fluctuated slowly at random.

Figure 26:
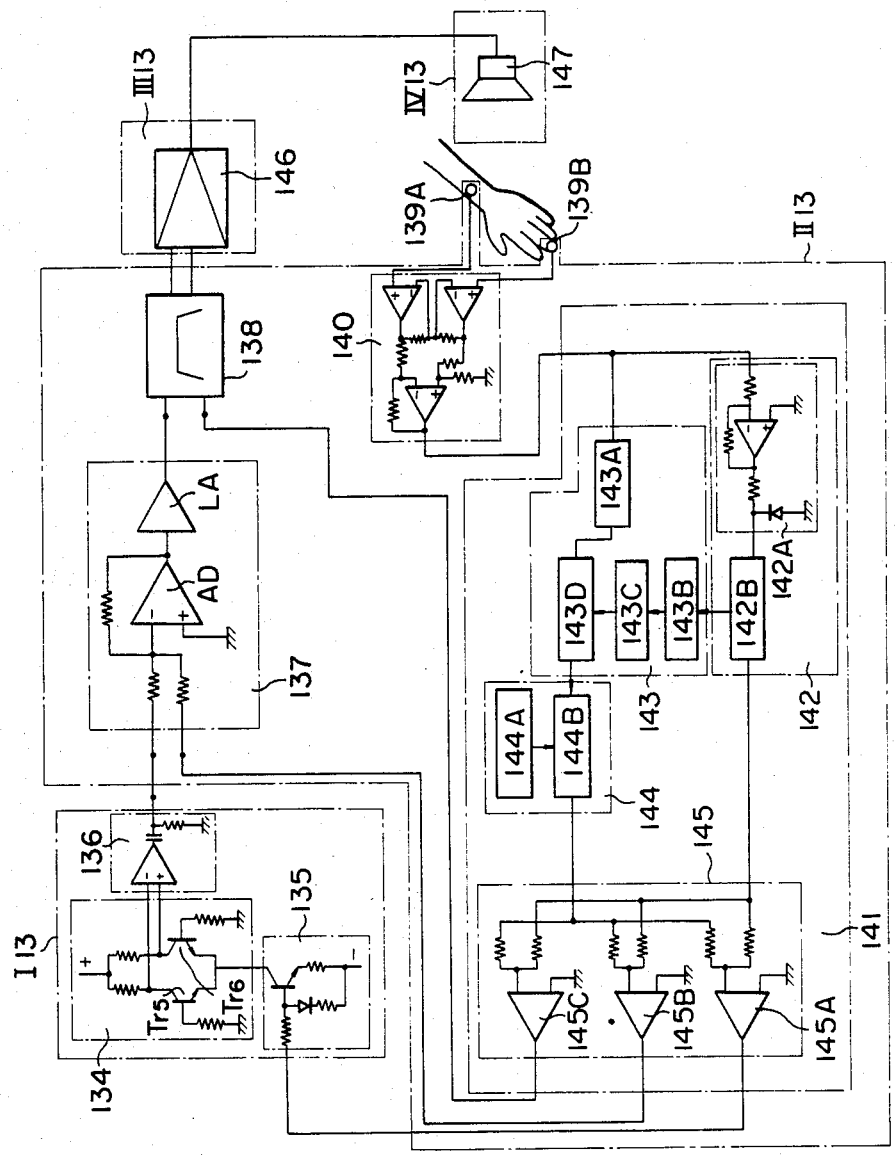
FIG. 26 is a block circuit diagram showing a thirteenth embodiment of the present invention.

A system according to a thirteenth embodiment is provided by applying the present invention to a sleep promoting system and will be described with reference to FIG. 26.

The sleep promoting system of the thirteenth embodiment is characterized in that the change in the skin potential (such as on the palmar surface) of a human body is detected so that both random generating means I13 and control means II13 are feedback-controlled by the control circuit of control means II13 thereby to control both the kind of the random signal, which is fed out of the random generating means I13, and the amplitude and frequency range of the random signal, which is fed out of the control means II13, whereby acoustic stimulus suitable for sleep is generated by driving means IV13. Since the characteristics (e.g. the tone) or quantity of the acoustic stimulus suitable for sleep are different in accordance with the individual difference of the human body and the physiological condition of the individual, the reaction of the human body to that stimulus has to be detected, in order to provide the most proper acoustic stimulus, thereby to know which acoustic stimulus promotes the sleep of that human body. In the thirteenth embodiment, the skin potential level indicating an excellent correspondence to the mental activity of the human body is detected so that the following control is performed.

More specifically, the skin potential indicates a level in the vicinity of zero potential under a rest or slept condition, but is raised to indicate a high negative potential (at about $-50$ mv) with an increase in arousal level. Therefore, the characteristics and quanity of the acoustic stimulus are changed about the initially preset reference thereby to search such characteristics and quantity of the stimulus as bring the skin potential to the zero potential and to change the initially preset reference value of the stimulus (or fluctuations) to the sought ones whereby the most suitable acoustic stimulus for the sleep of each individual is imparted.

The random generating means I13 comprises a transistor noise source 134 making use of the noises of a transistor, a constant current source 135 for varying the emitter currents of the transistors $Tr_3$ and $Tr_6$ acting as the noise source in accordance with the voltage fed to the external terminals thereof, and an operational amplifier 136 for amplifying the noise voltage which is generated by the transistor noise source 134. The transistors have their noise current Fourier spectra dominated in a low frequency lower than several Hz to 1 KHz by the portion in which they are varied with the inverse number $1/f$ of the frequency $f$ and have their power spectra PF expressed by $Pf \propto 1/f^k$. The value k is varied by varying the emitter current of the transistors (however, k is approximately 1). The constant current source 135, which is connected between the emitter of the transistors $Tr_5$ and $Tr_6$ and the negative power source, feeds the emitter of the transistors $Tr_5$ and $Tr_6$ with the current which is set by the voltage fed to the external terminals thereof.

The noise voltage, which is generated between the collectors of the transistors $Tr_5$ and $Tr_6$ acting as the noise source, is amplified by the operational amplifier 136 and is then fed out after having its d.c. component filtered off by the condenser.

The control means II13 comprises: an amplitude control circuit 137 connected with the random generating means I13; a filter 138 connected with the amplitude control circuit 137; skin potential detecting electrodes 139A and 139B; an amplifier 140 connected with the electrodes 139A and 139B; and a control circuit 141 connected with the amplifier 140 and with the respective control terminals of the constant current source 135 of the random generating means I13, and the amplitude control circuit 137 and the filter 138 of the control means II13.

In order to control the noise amplitude by the voltage fed to the control terminal thereof, the amplitude control circuit 137 comprises a logarithmic amplifier LA and the adder AD for applying a bias voltage.

The logarithmic amplifier LA feeds out the voltage in proportion to the logarithm of the input voltage so that its amplification for the minute a.c. voltage input is reduced the more as the d.c. potential to be fed becomes the higher. The adder AD varies the bias voltage, which is to be fed to the logarithmic amplifier LA, by the voltage fed to the control terminal, thereby to control the amplification factor of the logarithmic amplifier LA for the noise input signal.

The filter 138 is a band-pass filter for varying the lower cut-off frequency and the upper cut-off frequency in response to the voltage signal fed to the control terminal.

The skin potential detecting electrodes 139A and 139B are of silver-silver chloride type and are mounted such that the reference electrode 139A is mounted on the forearm portion which is inactivated, whereas the detecting electrode 139B is mounted on the palm at the tip of the middle finger.

The amplifier 140 comprises a high input impedance differential amplifier, in which the voltage between the electrodes 139A and 139B are amplified at a gain of about 100 times.

The control circuit 141 comprises: a sine-wave oscillator unit 142 for generating sine waves having an amplitude proportional to the level of the skin potential (of negative polarity) fed out of the amplifier 140; a detecting unit 143 for feeding out a value which is prepared by multiplying the time differentiated value of the skin potential by the polarity of the time differentiated value of the output signal of the sine-wave oscillator unit; a reference level control unit 144 for feeding a preset voltage at the start of the operation and then for integrating and feeding the voltage, which is fed out from the detecting unit 143, while using that preset voltage as an initial value; and an output unit 145 for adding the output voltages of the sine-wave oscillator unit 142 and reference level control unit 144 thereby to feed the control signal to the respective control terminals of the constant current source 135 of the transistor noise source 134, the amplitude control circuit 137 and the filter 138.

The sine-wave oscillator unit 142 includes an amplitude control circuit 142A and a sine-wave oscillating circuit 142B. The amplitude control circuit 142A is composed of a voltage amplifier, which is operative to amplify the voltage signal fed out of the amplifier 140, and a limitter circuit which is connected at the downstream stage thereof. The sine-wave oscillating cirucit 142B oscillates to feed out such sine waves of 0.02 Hz that have their amplitude controlled by the output voltage of the amplitude control circuit 142A. Since the latent (or delay) time of the skin potential response to a stimulus is about several seconds (although varying with the temperature), the condition for the stimulus has to be changed with a sufficiently longer period so that the period is set here at 50 seconds. The detecting unit 143 is composed of a differentiator 143A, a differentiator 143B, a comparator 143C and a multiplier 143D. The differentiator 143A determines the time varying rate of the input voltage and feeds the same to the multiplier 143D. The differentiator 143B feeds the time varying rate of the output voltage of the sine-wave oscillator unit 142 to the comparator 143C. This comparator 143C feeds voltages at levels +1V and −1V to the multiplier 143D when the output voltage of the differentiator 143B id equal to or higher than OV and lower than OV, respectively. The multiplier 143D feeds the reference level control unit, 144 with the voltage which is the product of the output voltages fed out of the differentiator 143A and the comparator 143C.

The reference level control unit 144 is composed of initial value setter 144A and an integrator 144B. The initial value setter 144A is composed of a push button switch, which is operative to start the operation of the system, and a constant voltage source which sets the output voltage of the integrator 144B at an initial value when that push button switch is pushed. The integrator 144B is set at the initial value by the initial value setter at the start of the operation and then feeds out that value to the output unit 145 while integrating the detector output. The output unit 145 is composed of three adders 145A, 145B and 145C and adds the outputs of sine-wave oscillating unit and the reference level control unit thereby to feed the control voltages to the control terminals of the constant current source 135, the amplitude control circuit 137 and the filter 138.

The amplifying means III13 comprises a power amplifier 146, which is made of a power amplifier connected with the output terminal of the filter 138 of the control means II13, and amplifies the power of the output signal of the filter 138 thereby to generate the power which is necessary for driving the driving means IV13.

The drive means IV13 comprises a speaker 147 including a magnetic circuit, which is connected with the output terminal of the power amplifier 146 of the amplifying means III13, and a cone which is made integral with the movable core of that magnetic circuit, and converts the electric signal fed out of the amplifying means III13 into an acoustic energy.

The operations of the system having the construction thus far described according to the thirteenth embodiment will be described. When the user is going to sleep, he puts on the hand the skin potential detecting electrodes 139A and 139B and pushes the push button switch of the initial value setter 144A. Then, the reference level control unit 144 and the sine-wave oscillating unit 142 of the control circuit 141 feed the output unit 145 with the preset initial value and the sine waves having the amplitude controlled by the absolute value of the skin potential, respectively. The control unit 145 adds those signals and feeds out the added signal to the control terminals of the constant current source 135 of the transistor noise source 134, the amplitude control circuit 137 and the filter 138. Thus, those control terminals are fed with the control voltages, in which the sine waves having the amplitude corresponding to the absolute value of the skin potential are superposed about their respective set values. The changes in the control signals cause to vary the power spectra of the noises, which are generated by the transistor noise source 134, the voltage amplification factor of the amplitude control circuit 137 relative to the noise input signal, and the lower and upper cut-off frequencies of the filter 138. As a result, the acoustic stimulus having its volume and tone changed in accordance with the change in the control signals is generated by the speaker 147. In case the skin potential detected from the acoustically stimulated human body changes toward the zero potential for the changes in those volume and tone, i.e., in case the sleep is promoted, the output voltage of the detecting unit 143 of the control circuit 141 takes the same polarity as the first order differentiation of the sine-wave oscillator 142B so that the output voltage of the reference level control unit 144 varies in the same direction as that of the output of the sine-wave oscillator 142.

On the contrary, in case the skin potential changes toward a negative potential, i.e., in case the sleep is suppressed (or the arousal level is increased), the output voltage of the detecting unit 143 of the control circuit 141 takes a polarity different from the first order differentiation of the sine-wave oscillator 142B so that the output voltage of the reference level control unit 144 varies in the opposite direction to the output of the sine-wave oscillator 142B. In either case, consequently, the output of the reference level control unit 144 changes in the direction to bring the skin potential to the zero potential. In other words, the mean level of the fluctuating acoustic stimulus to be given from the speaker 147 advances in the direction suitable for the sleep.

On the other hand, the amplitude of the output voltage of the sine-wave oscillator unit 142 of the control circuit 141 approaches zero, as the skin potential approaches the zero potential, so that the periodic fluctuations in the acoustic stimulus are also reduced to converge into the most proper value for the sleep.

As has been described hereinbefore, the system according to the thirteenth embodiment effects such a feedback control as gives the most proper acoustic stimulus for the difference among the individuals or for the physiological condition of each individual so that the user can fall into sleep comfortably and promptly without any harm and without having any feeling of resistance to the use of the system.

According to the present system of the thirteenth embodiment, the speaker 147 is used to effect the acoustic stimulus thereby to promote the sleep. Nevertheless, if the speaker 147 is replaced by a vibrator for vibrating a bed and if this vibrator is fluctuated by the signal fed out of the power amplifier 146, the vibratory stimulus can also be given by the fluctuating vibrations of the bed thereby to promote the sleep.

A system according to a fourteenth embodiment is provided by applying the present invention to a bicycle ergometer and is characterized in that the rotational load upon the pedals of the bicycle is fluctuated at random by a fluctuation signal thereby to impart a fresh feeling to a trainer at all times so the trainee can train his bodily strength without getting tired of the training.

Figure 27:
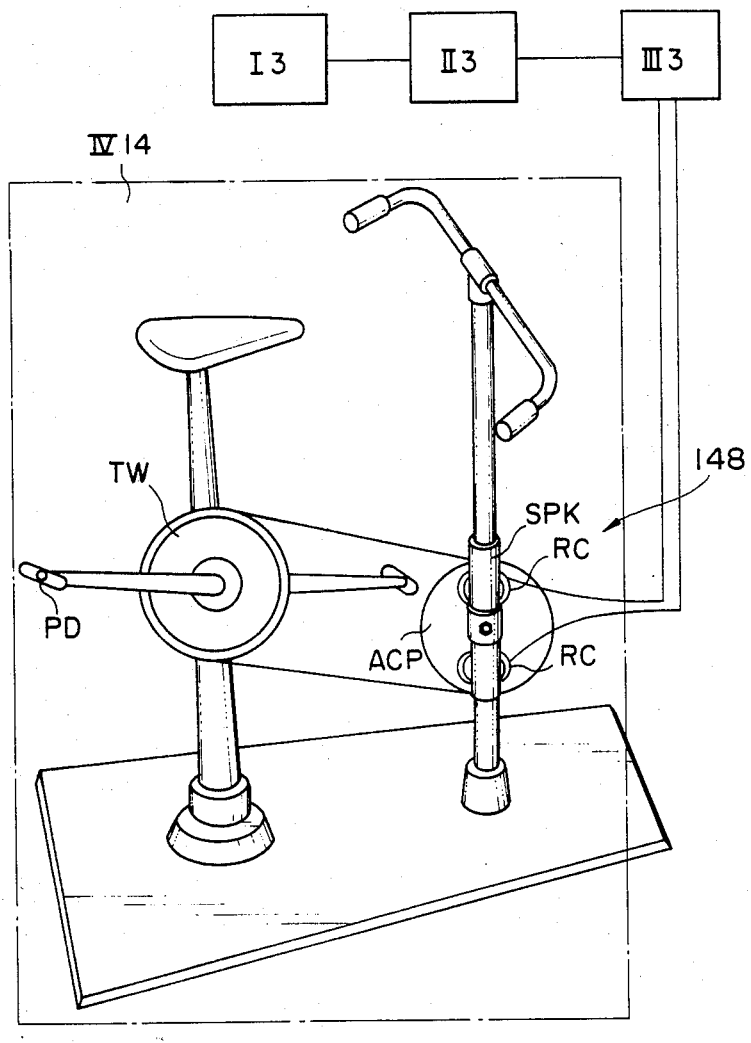
FIG. 27 is a block diagram showing a fourteenth embodiment of the present invention.
Figure 28:
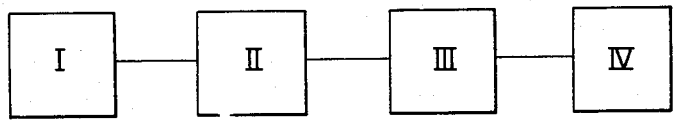
FIG. 28 is a block diagram showing the present invention.

The bicycle ergometer according to the fourteenth embodiment comprises: the random generating means I3, the control means II3 and the amplifying means III3, which are similar to those of the third embodiment, as shown in FIG. 7; and driving means III14 including an eddy current brake, as shown in FIG. 27, and will be described in the following while stressing the differences inbetween.

The driving means IV14 comprises the eddy current brake 148 including an aluminum disc ACP, which is resolved through a chain by the action of a sprocket wheel TW revolved by pedals PD, and two magnetizing coils RC which is fixed to a head tube SPK in a manner to hold the aluminum dics ACP inbetween.

More specifically, the eddy current brake 148 comprises the aluminum disc ACP, which is revolved by the rotational force of the pedals PD, and the magnetizing coils RC for generating d.c. magnetic fields extending through the aluminum disc ACP at a right angle. The braking torque T, which is established as a result of the rotations of the aluminum disc, is proportional to the square of the density of the magnetic flux of the d.c. magnetic field so that it can be controlled by the current which flows from the amplifying means III3 into the magnetic coils.

Since the braking torque of the eddy current brake 148 constituting the driving means IV14 is fluctuated at random on the basis of the fluctuation signal which is fed out of the amplifying means III3, the bicycle ergometer having the construction thus far described according to the fourteenth embodiment is advantageous over the bicycle ergometer having the adjusted constant braking torque according to the prior art in that the trainee can train his bodily strength for a long time without getting tired of the training thereby to enhance the training effect.

The present invention, which has been described in detail hereinbefore in connection with the first to fourteenth embodiments, has the following characteristics:

(1) The random generating means uses as its signal source the current noises, which are generated when a current is made to flow through a vacuum tube, a semiconductor such as a transistor or a diode, a thin metallic film and so on, and generates the electric quantity in which the power spectral density for each frequency has an inversely proportional relationship to the frequency and which varies at random. Since, with this construction, it is necessary to prepare by the signal processing the randomly fluctuating signal having the 1/f characteristics, there can be attained an advantage that the system is simplified.

(2) The random generating means stores in advance, as the fluctuation in the electric quantity, the phenomena which exist in the natural world and in which the power spectral density for each frequency has an inversely proportional relationship to the frequency and which varies at random, and uses the storage as a signal source to generate the electric quantity in which the power spectral density for each frequency has an inversely proportional relationship to the frequency and which varies at random. With this construction, there can be attained advantages that the most proper random fluctuation having the 1/f characteristics, that exists in the natural world, can be used, and that it is unnecessary to prepare that random fluctuation by the signal processing.

(3) The random generating means comprises: a white noise generator for generating the electic quantity in which the power spectral density for each frequency is identical and which varies at random; and a filter circuit for filtering the electric quantity generated by the white noise generator thereby to generate the electric quantity in which the power spectral density for each frequency has an inversely proportional relationship to the frequency and which varies at random. Since the random fluctuation signal having the 1/f characteristics is prepared by the signal processing, there can be attained not only advantages that the random generating means is not influenced by the temperature or other characteristics of the signal source such as the transistor and that the memory for storing the data of the natural world can be omitted but also an advantage that the signal having the 1/f characteristics necessary for the drive can be generated.

(4) The random generating means includes: a white noise generator for generating the electric quantity in which the power spectral density for each frequency is identical and which varies at random; and an integrator for integrating the electric quantity generated by the white noise generator thereby to generate the electric quantity in which the power spectral density for each frequency has an inversely proportional relationship to the square of each frequency and which varies at random. Since the random fluctuation signal having the $1/f^2$ characteristics is obtained by processing the white noise signal, there can be attained an advantage that the trouble and memory for storing the data of the natural world can be omitted.

(5) The control means controls the fluctuating amplitude of the randomly varying electric quantity. As a result, there can be attained an advantage that it is possible to generate the fluctuations having a fluctuation width according to the requirement and taste.

(6) The control means includes a filter circuit for controlling the fluctuating frequency range of the randomly varying electric quantity . As a result, there can be attained an advantage that it is possible to generate the fluctuations in a rhythm accordihg to the requirement and taste.

(7) The control means controls the mean level of the randomly varying electric quantity. As a result, there canbe attained an advantage that it is possible to generate the mean level of energy according to the requirement and taste.

(8) The control means controls the fluctuation factor, i.e., the ratio of the fluctuating amplitude to the mean level Of the randomly varying electric quantity. As a result, there can be attained an advantage that it is possible to generate the fluctuations having a fluctuation factor according to the requirement and taste.

(9) The control means feedback-controls the randomly varying electric quantity. There can be attained an advantage that it is possible to perform the control of high accuracy for a target value.

(10) The control means feedback-controls the random generating means thereby to control the randomly varying electric quantity generated by the random generating means. As a result, thdre can be attained an advantage that it is possible to generate the most proper random fluctuations.

(11) The random generating means includes an electric lamp and utilizes the fact that the operating point of the electric lamp is influenced by temperature thereby to vary the fluctuating manner of the randomly varying electric quantity. As a result there can be attained an advantage that it is possible to effect the change in the fluctuating manner according to the characteristics of the electric lamp.

(12) The drive means includes a movable member adapted to be driven by the randomly varying electric quantity supplied so that the movable member may liberate the randomly varying energy.

(13) The random generating means includes a rotatable member having a random radial length so that the randomly varying mechanical quantity may be generated as a mechanical displacement.

(14) The control means controls the fluctuating amplitude of the randomly varying mechanical displacement. As a result, there can be attained an advantage that it is possible to generate the varying width of the fluctuation according to the necessity and taste.

(15) The control means controls the mean level of the randomly varying mechanical displacement. As a result, there can be attained an advantage that it is possible to generate the mean level of energy according to the necessity and taste.

The present invention can adopt a number of modifications in addition to the embodiments thus far described.

In the foregoing embodiments applied to the automotive fan, the drive current of the d.c. motor for driving the fan is randomly fluctuated. It may be modified, however, such that the wind direction control system arranged in the air outlet into the passenger's compartment, as shown in FIG. 31, is controlled at random thereby to randomly fluctuate the direction of the air flow into the compartment.

Figure 31:
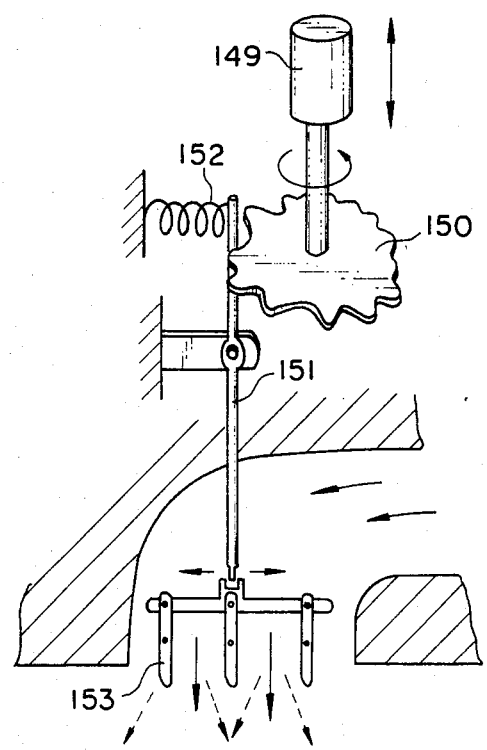
FIG. 31 is a perspective view showing another modification of the present invention.

Specifically, the present modification is constructed, as shown in FIG. 31, by forming the tooth shape of a gear 150, which is rotationally driven by a d.c. motor 149, such that its radial length is changed at random with the $1/f^2$ characteristics, by urging one end of an arm member 151, which is enabled to rock about a fulcrum, by means of a coil spring 152, by making that one end engage with the gear 150, and by making the other end, which has a predetermined length, engage with one end of a louver 153 which is arranged in the air outlet formed in a suitable portion of the dashboard and which is supported in a rocking manner thereby to control the wind direction.

According to the present modification, therefore, when the gear 150 is revolved by the motor 149, one end of the arm member 151 is rocked so that the other end is rocked in the opposite direction. Then, the louver 153 is swung about the fulcrum to change the blowing direction, at which the air flow supplied from the fan (not shown) is guided into the compartment. As a result, the air flow prevails all over the compartment, while having its direction fluctuating at random, whereby the wind resembling the natural wind is established in the compartment. Since the present modification fluctuate the wind direction but not the flow rate, there can be attained an advantage that the problem of noises during the high flow rate of the wind can be avoided.

On the other hand, if the air to be supplied to a plurality of divided compartments forming a bed is subjected to "ON" and "OFF" control by the grouped solenoids of the driving means IV of the first embodiment system, the divided respective compartments are supplied with the air at random so that the pressure of the bed at that particular portion is raised to effect stimulation, whereby the circulation of blood in a patient confined to his bed is promoted thereby to prevent the serious patient confined to his bed from having bedsore. Moreover, if the chain driven by the motor is driven by the gear reduction of the motor of a roller type finger-pressure treating machine having a finger-pressure roller retained with the system similar to that of the eighth embodiment, it is possible to provide a finger-pressure treating machine in which the moving velocity of the roller is fluctuated at random. With this construction, it is possible to provide a finger-pressure treating machine which can maintain a fresh feeling at all times while enhancing the finger-pressure effect and preventing the user from getting tired of the use, as is different from the conventional system in which the roller moves at a constant velocity.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluctuating drive system comprising:
random generating means for generating a randomly varying physical quantity in which the proper spectral density for each frequency has a relation ship of $1/f^k$ (wherein k is a non-zero arbitrary value) to the frequency f and varies at random;
control means for controlling the randomly varying physical quantity wherein said randomly varying physical quantity has a fluctuating amplitude, a fluctuating frequency range and a mean level;
control means for controlling the randomly varying physical quantity;
amplifying means for amplifying the controlled physical quantity;
energy generating means; and
driving means for driving said energy generating means in accordance with the amplified physical quantity,
whereby a randomly varying energy is generated from said energy generating means.

2. A fluctuating drive system according to claim 1, wherein said random generating means generates the physical quantity in which the power spectral density for each frequency has an inversely proportional relationship to the square of the frequency f (i.e. $1/f^2$) and which varies at random.

3. A fluctuating drive system according to claim 2, wherein said random generating means comprises: a white noise generator for generating the electric quantity in which the power spectral density for each frequency is identical and which varies at random; and an integrator for integrating the electric quantity generated by said white noise generator thereby to generate the electric quantity in which the power spectral density for each frequency has an inversely proportional relationship to the square of each frequency and which varies at random.

4. A fluctuating drive system according to claim 2, wherein
said random generating means comprises a white noise generator for generating the electric quantity in which the power spectral density for each frequency is identical and which varies at random, a filter circuit for filtering the electric signal generated by said white noise generator, in order to generate the electric signal with $1/f^2$ characteristics.

5. A fluctuating drive system according to claim 4, wherein
said control means comprises
an operation unit comprising a differential amplifier connected to temperature setter for setting the temperature in the passenger's compartment, and a temperature sensor for detecting the air temperature in the compartment, an amplifier connected to said differential amplifier, a deviation amplifier connected to said amplifier and a damper controller including an actuator for controlling a damper, and an absolute value circuit, connected to said differential amplifier, for calculating absolute value of a deviation, and
an adder having a first input resistor connected to said filter circuit of said random generating means,
a second input resistor connected to said absolute value circuit, and feedback resistor,
thereby automatically controlling the fluctuation factor with the $1/f^2$ characteristics in accordance with the deviation of the compartment temperature from the set temperature.

6. A fluctuating drive system according to claim 1, wherein said physical quantity is a electric quantity.

7. A fluctuating drive system according to claim 6, wherein a phenomena which exist in the natural world and in which the power spectral density for each frequency has an inversely proportional relationship to the frequency and which varies at random, is memorized in advance in said random generating means as the fluctuation in the electric quantity and is utilized as a signal source to generate the electric quantity in which the power spectral density for each frequency has an inversely proportional relationship to the frequency and which varies at random.

8. A fluctuating drive system according to claim 7, wherein
said random generating means comprises a clock oscillator for feeding out clock pulses, a memory ROM for storing in advance a fluctuation signal for controlling the flow rate of the wind, a memory RAM for temporarily storing the computation midway result and a central processing unit connected to said clock oscillator, memory ROM and memory RAM.

9. A fluctuating drive system according to claim 8, wherein
said controlled means comprises
a room temperature detecting sensor for detecting the temperature of the room,
a temperature setter comprising a variable resistor,
a multiplexer connected to said room temperature detecting sensor and temperature setter,
an AD converter connected to said multiplexer,
an input/output control unit connected to said AD converter and central processing unit,
a DA converter connected to said input/output control unit, and
a relay driving circuit connected to said input/output control unit, for driving four relays switching a power source circuit of a motor.

10. A fluctuating drive system according to claim 9, wherein
said amplifying means comprises
an integrator connected to said control means,
a trigger circuit comprising a transformer connected to the alternating current source at 100 V, a rectifying circuit connected to said transformer, and a saturation amplifier connected to said rectifying circuit,
a switching circuit comprising a switching transistor connected to said integrator,
a comparator of a differential amplifier connected to said switching circuit,
a transistor circuit connected to said comparator,
a pulse transformer connected to said trigger circuit and transistor circuit, and
a thyristor circuit comprising a two-way thyristor, an arc-suppressing condenser, and a resistor, connected to said pulse transformer.

11. A fluctuating drive system according to claim 6, wherein said random generating means comprises a white noise generator for generating the electric quantity in which the power spectral density for each frequency is identical and which varies at random; and a filter circuit for filtering the electric quantity generated by said white noise generator thereby to generate the electric quantity in which the power spectral density for each frequency has an inversely proportional relationship to the frequency and which varies at random.

12. A fluctuating drive system according to claim 11, wherein
said control means comprises
a signal processing unit comprising a slide potentiometer connected to said random generating means, a collector electrode, a slide electrode contacting with said slide potentiometer and collector electrode, and an amplifier comprising an operational amplifier having an input resistor connected to said collector electrode, and a feedback resistor, thereby to control the fluctuation factor,
an operation unit comprising a differential amplifier connected to temperature setter for setting the temperature in the passenger's compartment, and a temperature sensor for detecting the air temperature in the compartment, an amplifier connected to said differential amplifier, a deviation amplifier connected to said amplifier and a damper controller including an actuator for controlling a damper, and an absolute value circuit, connected to said differential amplifier, for calculating absolute value of a deviation, and
a power control unit, comprising four wind comparators connected to said absolute value circuit, and four relays respectively connected to said wind comparators and four contacts connected to a motor of a blower, for stepwise dividing the value of said deviation.

13. A fluctuating drive system according to claim 12, wherein
said amplifying means comprises
an integrator connected to said control means,
a trigger circuit comprising a transformer connected to the alternating current source at 100 V, a rectifying circuit connected to said transformer, and a saturation amplifier connected to said rectifying circuit, a switching circuit comprising a switching transistor connected to said integrator,
a comparator of a differential amplifier connected to said switching circuit,
a transistor circuit connected to said comparator,
a pulse transformer connected to said trigger circuit and transistor circuit, and
a thyristor circuit comprising a two-way thyristor, an arc-suppressing condenser, and a resistor, connected to said pulse transformer, and
said driving means comprises an induction motor for driving a fan connected to said thyristor and alternating current source, a condenser and a coil connected in parallel with said induction motor.

14. A fluctuating drive system according to claim 11, wherein
said control means comprises
a power control unit comprising a slide switch composed of a slide electrode fixed to a link for controlling the angle of an air damper by an actuator of a damper controller and a plurality of contacts, three control resistors connected to predetermined contacts and a power amplifier, thereby to interchange said control resistor in accordance with the angle of said damper.

15. A fluctuating drive system according to claim 11, wherein
said random generating means comprises a pair of random generating units comprising said white noise generator and filter circuit.

16. A fluctuating drive system according to claim 15, wherein
said amplifying means comprises: two d.c. voltage sources; two variable resistors, one of them being connected to each one of said filter circuits and two d.c. voltage sources and the other of them connected to each of the other of said filter circuits and two d.c. voltage sources; two amplification variable amplifiers, one of them being connected to one of two variable resistors and the other of them connected to the other of two variable resistors; a VF converter connected to the other of amplification variable amplifiers; a monostable multivibrator connected to said VF converter; an inverter connected to said monostable multivibrator; and a switching transistor the base of which is connected to said inverter and the collector of which is connected to said one of amplification variable amplifiers,
thereby generating pulse signals having different amplitudes and time intervals.

17. A fluctuating drive system according to claim 16, wherein
said drive means comprises a driving unit, embedded in the upper portion of a chair back, comprising a patting ball provided at the position of the shoulder of a user sitting on a chair, a spring plate of U shape at one end of which said patting ball is fixed, and the other end of which is fixed to an inner wall of a case member, and a solenoid means comprising stationary core having a solenoid provided in said case member and connected to said control means through an amplifying means of transistors connected in Darlington, and a movable core opposed to said stationary core and provided on said spring plate,
thereby driving said patting ball in rythm and intensity varying at random.

18. A fluctuating drive system according to claim 6, wherein said random generating means comprises an electric lamp and utilizes the fact that the operating point of said electric lamp is influenced by temperature thereby to vary the fluctuating manner of the randomly varying electric quantity.

19. A fluctuating drive system according to claim 18, wherein
said random generating means comprises an electric lamp having a positive temperature coefficient which is arranged in the passenger's compartment, an operational amplifier connected to said electric lamp, a non-inverting amplifier connected to said electric lamp and a multiplier connected to said electric lamp, operational amplifier and non-inverting amplifier.

20. A fluctuating drive system according to claim 19, wherein
said control means comprises
a signal processing unit comprising an inverting adder of an operation amplifier connected to said multiplier of said random generating means,
an operation unit comprising a differential amplifier connected to a temperature setter and a temperature sensor provided in the compartment, an amplifier connected to said differential amplifier, and a deviation amplifier connected to said amplifier and said adder of said signal processing unit thereby to calculate absolute value of the deviation.

21. A fluctuating drive system according to claim 6, wherein said drive means comprises a movable member adapted to be driven by the randomly varying electric quantity supplied so that said movable member may generate the randomly varying energy.

22. A fluctuating drive system according to claim 6, wherein
said random generating means comprises a transistor circuit and a differential amplifier, thereby to generate electric quantity in which the power spectral density for each frequency has an inversely proportional relationship to the frequency f (i.e. 1/f) and which varies at random, by using as a signal source the current noise when an electric current is made to flow through transistors of said transistor circuit.

23. A fluctuating drive system according to claim 22, wherein
said control means comprises a fluctuation factor setting circuit comprising an input resistor connected to said random generating means through a condenser, a resistor, and a d.c. power source connected to said resistor and the earth, an adder comprising an operational amplifier connected to said input resistor and resistor, and a fluctuation frequency range setting circuit comprising a filter which is composed of a feedback resistor connected between an input terminal and output terminal of said adder, and two condensers having different capacities connected in parallel with said feedback resistor and a switch connected to said output terminal of said adder and changed over said two condensers,
said amplifying means comprises a power amplifier comprising two power transistors connected in Darlington connection and to said control means, and said driving means comprises a d.c. motor connected to said amplifying means and a Sirocco fan driven by said d.c. motor, thereby to blow the wind with 1/f fluctuation.

24. A fluctuating drive system according to claim 23, wherein
said control means comprises
a fluctuation factor adjusting circuit comprising an input resistor connected to said random generating means through a condenser, a variable resistor a control terminal of which is connected to said input resistor, and a d.c. power source connected between said variable resistor and the earth,
an adder comprising an operational amplifier connected to said input resistor,
a fluctuation frequency change-over circuit comprising a filter which is composed of a feedback resistor connected between an input terminal and output terminal of said adder, four condensers having different capacities connected in parallel with said feedback resistor and a switch connected to said output terminal of said adder and changed over said four condensers, and
an air pressure adjusting circuit comprising a variable resistor.

25. A fluctuating drive system according to claim 24, wherein
said driving means comprises
an air pump for supplying a predetermined quantity of air to a pressure chamber in a chair seat through a supply tube,
a proportional electromagnetic valve comprising a needle valve adapted to be freely inserted into a hole formed in a wall of said chair seat, a valve body having a flange and spring suppressing said flange formed integral with said needle valve, a core formed integral with said needle valve and a solenoid surrounding said core and connecting to said adder of said control means through said amplifying means and said air pressure adjusting circuit of said control means,
thereby to fluctuate the pressure in the pressure chamber of said seat at random with the 1/f characteristics.

26. A fluctuating drive system according to claim 6, wherein
said random generating means comprises a clock oscillator for feeding out clock pulses, a memory ROM for storing the program and producing fluctuation signal data with the 1/f characteristics, a memory RAM for temporarily storing the computation midway result and a central processing unit connected to said clock oscillator, memory ROM and memory RAM.

27. A fluctuating drive system according to claim 26, wherein
said control means comprises
a compartment temperature detecting sensor of a thermistor provided in the compartment,
a temperature setter comprising a variable resistor, and
an operation control unit comprising a multiplexer connected to said compartment temperature detecting sensor and temperature setter, an AD converter connected to said multiplexer, an input/output control unit connected to said AD converter and central processing unit and a DA converter connected to said input/output unit.

28. A fluctuating drive system according to claim 27, wherein
said amplifying means comprises a motor control unit comprising a PWM circuit connected to said DA converter for generating pulses having a time width proportional to the output voltage of said DA converter and a switching device connected to said PWM circuit and a d.c. motor driving a fan for interrupting the power supply from the power source to said d.c. motor in accordance with the output pulses of said PWM circuit.

29. A fluctuating drive system according to claim 22, wherein
said random generating means further comprises a constant current source comprising a transistor circuit for varying the emitter current of said transistor as the noise source, and
said control means comprises:
skin potential detecting electrodes provided at predetermined portions of the finger;
a control unit comprising
an amplifier including operational amplifiers connected to said skin potential detecting electrodes,
a sine-wave oscillator unit connected to said amplifier for generating sine wave signals having amplitude proportional to the level of the skin level,
a detecting unit including multiplier for feeding out a value which is prepared by multiplying the time differentiated value of the skin potential by the polarity of the time differentiated value of the output signal of said sine-wave oscillator,
a reference level control unit connected to said detecting unit, and
an output unit including three differential amplifiers having input resistors connected to said reference level control unit and sine-wave oscillator, for adding the output voltages of said reference level control unit and sine wave oscillator, one amplifier being connected to said constant current source;
an amplitude control circuit including a logarithmic amplifier connected to the output terminal of another amplifier of said output unit and an adder connected to said logarithmic amplifier, for controlling the noise amplitude; and
a filter comprising a band pass filter connected to said adder and an output terminal of the other amplifier of said output unit, for varying lower and upper cut-off frequencies.

30. A fluctuating drive system according to claim 29, wherein
said amplifying means comprises a power amplifier connected to said filter of said control means, and
said driving means comprises a speaker including a magnetic circuit,
thereby to fluctuate acoustic stimulus suitable for sleep in response to the change in the skin potential of human body.

31. A fluctuating drive system according to claim 22, wherein
said driving means comprises an eddy current brake including an aluminum disc which is revolved through a chain by a pedal, and two magnetizing coil which is fixed to a head tube in a manner to hold aluminum disc inbetween, thereby to fluctuate the brake target at random on the basis of the fluctuation signal from said amplifying means.

32. A fluctuating drive system according to claim 1, wherein said physical quantity is a mechanical quantity.

33. A fluctuating drive system according to claim 32, wherein said random generating means comprises a rotatable member having a random radial length so that the randomly varying mechanical quantity may be generated as a mechanical displacement.

34. A fluctuating drive system according to claim 33, wherein said control means comprises means for controlling the fluctuating amplitude of the randomly varying mechanical displacement.

35. A fluctuating drive system according to claim 33, wherein said control means comprises means for controlling the mean level of the randomly varying mechanical displacement.

36. A fluctuating drive system according to claim 33, wherein said rotatable member of said random generating means has four projections having a random height, in which the power spectral density for each frequency has an inversely proportional relationship to the frequency and which varies at random.

37. A fluctuating drive system according to claim 36, wherein said amplifying means comprises four rod-shaped arm members rocking about one end thereof acting as a fulcrum, and four rod members engaged with said each projection on said rotatable member and each rod-shaped arm member, said control means comprises a rod member constructing the fulcrum of the respective arm member, a sliding member fixing one end of said rod member and made slidable on a guide provided in a casing, thereby to control the arm ratio of said rod-shaped arm members by changing the fulcrum position, and said drive means comprises valve body having its embedded pin retained in a slit of said rod-shaped arm member, thereby to control opening or closing of a circular hole provided on a compartment in which the fragrant material is inserted.

38. A fluctuating drive system according to claim 33, wherein said random generating means comprises a gear changing in radial length thereof at random with the $1/f^2$ characteristics, and a d.c. motor driving said gear through a shaft connected to said gear and motor, said amplifying means comprises an arm member pivotable about a fulcrum, one end of which is fitted to said gear and is suppressed by a coil spring, said driving means comprises a louver pivotably supported in an air outlet of a dashboard, and fitted to the other end of said arm member thereby to control the wind direction, and said control means comprises means for sliding the gear and motor of said random generating means in the axial direction of said arm member and for varying the fitting portion of said gear and arm member, thereby to control the changing range of angle of said louver.

39. A fluctuating drive system according to claim 1, wherein said random generating means uses as a signal source the current noises when an electric current is made to flow through a vacuum tube, a semiconductor such as a transistor or a diode, a thin metallic film and so on and generates the electric quantity in which the power spectral density for each frequency has an inversely proportional relationship to the frequency and which varies at random.

40. A fluctuating drive system according to claim 1, wherein said control means comprises means for controlling the fluctuating amplitude of the randomly varying physical quantity.

41. A fluctuating drive system according to claim 1, wherein said control means comprises a filter circuit for controlling the fluctuating frequency range of the randomly varying physical quantity.

42. A fluctuating drive system according to claim 1, wherein said control means comprises means for controlling the mean level of the randomly varying physical quantity.

43. A fluctuating drive system according to claim 1, wherein said control means comprises means for controlling the fluctuation factor, i.e., the ratio of the fluctuating amplitude to the mean level of the randomly varying physical quantity.

44. A fluctuating drive system according to claim 1, wherein said control means comprises means for feedback-controlling the randomly varying physical quantity.

45. A fluctuating drive system according to claim 1, wherein said control means comprises means for feedback-controlling said random generating means thereby to control the randomly varying physical quantity generated by said random generating means.

46. A fluctuating drive system according to claim 1, wherein said random generating means comprises a white noise generator comprising a clock oscillator, a shift register, a gate circuit and a decoder, for generating the electric signals at random from different output lines.

47. A fluctuating drive system according to claim 46, wherein said driving means comprises solenoid valves having a movable member to lift a sector cover of each compartment in a container within which the fragrant material is inserted thereby to spread the scents of the different fragrant materials at random through said different sector covers.

48. A fluctuating drive system according to claim 46, wherein said driving means comprises electric heaters provided within each compartment having a small pin hole in a container within which the fragrant material is inserted, thereby to spread the scents of the different fragrant materials at random through said different small pin holes.

49. A fluctuating drive system according to claim 46, wherein said driving means comprises solenoid valves having a movable member to open the valve normally fitted in a circular hole connected between a passage within a cylinder and a compartment in which the fragrant material is inserted, and further comprising a fan driven by a motor and provided at an end part of said passage in order to form the air flow within said passage, thereby to spread the scents of the different fragrant materials at random into the air flow in said passage through said different circular holes.

50. A fluctuating drive system according to claim 1, wherein said random generating means comprises a voltage source, an integrator connected to said voltage source, a first shift register having a feedback circuit including an exclusive OR gate, a DA converter connected to suitable stages of said first shift register, a comparator connected to said DA converter and integrator, a pulse shaping circuit connected to said comparator, a second shift register, connected to said pulse shaping circuit, having a feedback circuit including an exclusive OR gate, and a DA converter connected to suitable stages of said second shift register.

51. A fluctuating drive system according to claim 50, wherein said control means comprises a d.c. voltage source, a variable resistor connected to said d.c. voltage source and DA converter of said random generating means, an amplification variable amplifier connected to said variable resistor, a VF converter connected to said amplification variable amplifier, and a monostable multivibrator connected to said VF converter, said amplifying means comprises an emitter-follower transistor having its base connected to said monostable multivibrator, its collector connected to the d.c. source and its emitter grounded to the earth through an emitter resistor, and driving means comprises an RC circuit comprising a resistor connected to said emitter of said transistor and a condenser connected to said resistor and the earth, and light emitting element connected between said RC circuit and the earth, thereby to fluctuate the flashing interval of said light emitting element at random.

* * * * *

UNITED STATES PATENT AND TRADEMARK OFFICE
CERTIFICATE OF CORRECTION

PATENT NO. : 4,495,560
DATED : JANUARY 22, 1985
INVENTOR(S) : GUNJI SUGIMOTO ET AL

It is certified that error appears in the above-identified patent and that said Letters Patent is hereby corrected as shown below:

Claim 1, line 3, delete "proper" and insert therefor --power--.

Claim 6, line 2, delete "a" and insert therefor --an--.

Signed and Sealed this

Seventh Day of January 1986

[SEAL]

Attest:

DONALD J. QUIGG

Attesting Officer  Commissioner of Patents and Trademarks